United States Patent
Karlsson et al.

(10) Patent No.: US 11,314,402 B2
(45) Date of Patent: Apr. 26, 2022

(54) DISPLAYING ASSETS IN MULTIPLE ZOOM LEVELS OF A MEDIA LIBRARY

(71) Applicant: Apple Inc., Cupertino, CA (US)

(72) Inventors: Andreas J. Karlsson, San Jose, CA (US); Matthieu Lucas, San Francisco, CA (US); Serhii Tatarchuk, Sunnyvale, CA (US); Simon I. Bovet, Zurich (CH); Graham R. Clarke, Scotts Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/560,226

(22) Filed: Sep. 4, 2019

(65) Prior Publication Data

US 2020/0379631 A1 Dec. 3, 2020

Related U.S. Application Data

(60) Provisional application No. 62/855,972, filed on Jun. 1, 2019.

(51) Int. Cl.
*G06F 3/0484* (2013.01)
*G06F 3/0488* (2013.01)
*G06F 3/04845* (2022.01)
*G06F 3/04883* (2022.01)

(52) U.S. Cl.
CPC ...... *G06F 3/04845* (2013.01); *G06F 3/04883* (2013.01); *G06F 2203/04806* (2013.01)

(58) Field of Classification Search
CPC ............ G06F 3/04845; G06F 3/04883; G06F 2203/04806
See application file for complete search history.

(56) References Cited

U.S. PATENT DOCUMENTS

| | | | |
|---|---|---|---|
| 8,132,116 B1* | 3/2012 | Schendel | G06F 3/04817 715/764 |
| 2004/0155888 A1 | 8/2004 | Padgitt et al. | |
| 2009/0144642 A1* | 6/2009 | Crystal | G06F 3/04817 715/764 |
| 2012/0036466 A1* | 2/2012 | Venon | G06F 3/04886 715/772 |
| 2013/0021368 A1* | 1/2013 | Lee | H04N 1/00177 345/619 |
| 2013/0239049 A1* | 9/2013 | Perrodin | G06F 3/0481 715/800 |
| 2013/0332871 A1* | 12/2013 | Bucur | G06F 3/0481 715/768 |
| 2014/0164938 A1* | 6/2014 | Petterson | G06F 3/048 715/739 |
| 2014/0168272 A1* | 6/2014 | Chedeau | G06T 9/40 345/660 |

(Continued)

*Primary Examiner* — Matthew Ell
*Assistant Examiner* — Samuel Shen
(74) *Attorney, Agent, or Firm* — Invoke

(57) ABSTRACT

In some implementations, a user may zoom in on a particular asset to show an all assets view that displays larger assets in a grid, and zoom out to show multiple smaller assets in another grid at different zoom levels while maintaining focus on the particular asset. Particularly, a GUI may display cells of a grid at a first zoom level, receive zoom input to transition to a second zoom level, and display cells of a different size in a second grid while maintaining focus on and positioning of the particular asset across the zoom levels.

20 Claims, 28 Drawing Sheets

(56) References Cited

U.S. PATENT DOCUMENTS

| | | |
|---|---|---|
| 2015/0170333 A1 | 6/2015 | Jing et al. |
| 2015/0177979 A1* | 6/2015 | Johansson ............ G06F 3/04845 715/763 |
| 2015/0378555 A1 | 12/2015 | Ramanathan et al. |
| 2016/0062573 A1* | 3/2016 | Dascola ................ G06F 3/0482 715/810 |
| 2016/0110901 A1* | 4/2016 | Connolly ............ G06F 3/04842 345/661 |
| 2017/0269815 A1* | 9/2017 | Da Silva Ramos ......................... G06F 3/04817 |
| 2018/0004401 A1* | 1/2018 | Travis ................ G06F 3/04883 |
| 2018/0018754 A1 | 1/2018 | Leng et al. |

* cited by examiner

DISPLAYING ASSETS IN MULTIPLE ZOOM LEVELS OF A MEDIA LIBRARY

TECHNICAL FIELD

The disclosure generally relates to managing a media library, and more particularly, to curating, arranging, and displaying assets of the media library.

BACKGROUND

Conventional media libraries display all images and videos contained therein in one or more interfaces. The pictures and videos may be sorted according to a sorting parameter, such as a time of capture, alphabetically by filename, etc. However, for large media libraries that include hundreds or thousands of images and videos, such a presentation may be too cumbersome for a user to manage, too slow to load, and too burdensome for the user to navigate in order to view desired images and videos. These experiences may lead to the user choosing to not visit the media library or interact with images and videos stored to the media library, which may reduce the use of already-captured images and videos, along with a reduced desire to capture more pictures and videos in the future.

SUMMARY

In some implementations, a computing device may generate a day view, month views, and year view that show cards specific to each view. The cards include images, videos, and/or other assets from a media library that reflect a corresponding time frame of the card on which the assets are displayed. A selected view is presented in a graphical user interface (GUI) for interaction with a user of the media library. Upon selection of an asset displayed to the GUI, the view is switched to show more assets from a time frame similar to the selected asset while maintaining a focus on the selected asset.

Moreover, in some implementations, a user may zoom in to show individual assets in a grid of an all assets view and zoom out to show multiple assets in another grid of the all assets view at different zoom levels while maintaining focus on a particular asset. Particularly, a GUI may display cells of a grid at a first zoom level, receive zoom input to transition to a second zoom level, and display cells of a different size in a second grid while maintaining focus on and positioning of a particular asset across the zoom levels.

Particular implementations provide at least the following advantages. A large media library may include hundreds or thousands of distinct images, videos, and other assets. When a user attempts to navigate through a large media library, it may be difficult to locate desired assets in a timely and intuitive manner. The curated media library presents key assets that are most likely to be sought after by the user based on a variety of factors, and shows these key assets in a series of views that may be quickly and intuitively switched between by the user to show more assets like the key asset when desired, or allow a time frame to be changed quickly by the user to look for other assets at different time periods. Also, when a user zooms in and zooms out through different zoom levels of particular views, the media library may maintain clean edges and avoid showing empty spaces at a beginning of an asset display layout.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
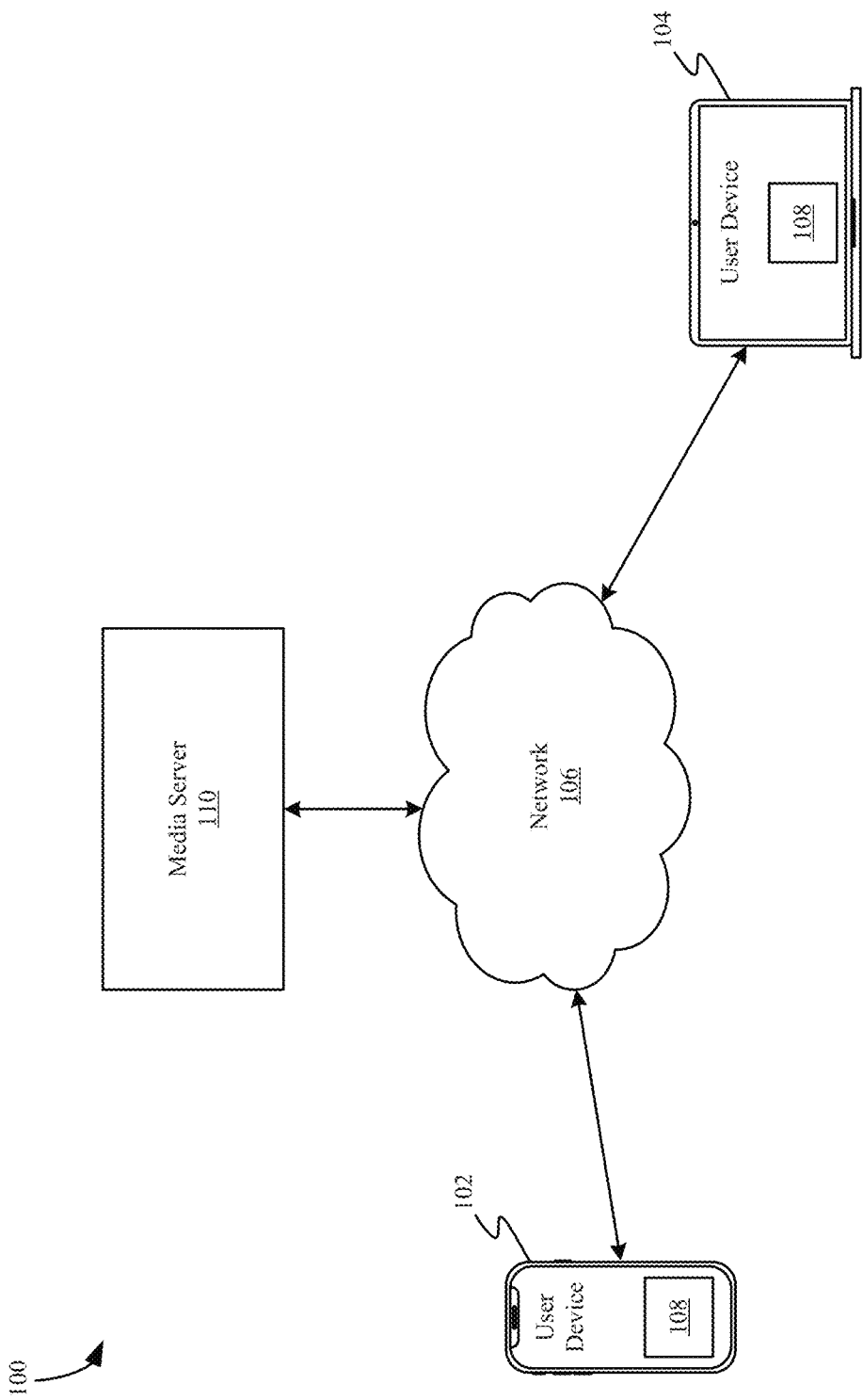
FIG. 1 is a block diagram of an example system for providing a curated media library.

Many users have accumulated large media libraries since the advent of digital cameras, and more particularly, the incorporation of digital cameras into mobile devices, such as smart phones and other electronic devices that are easily transportable by a user. Media assets include digital photos and images, videos, animated images, composite presentations and compilations, etc. A large media library may include multiple hundreds and even thousands of individual images and videos that have been collected over years by one or more users, and stored to one or more locations. When a user attempts to access and manage a large media library, there may be many issues associated with the vast quantity of images and videos included therein, such as difficulty in locating a desired image or video within the numerous assets stored to the media library, slow loading times for the individual assets, slow response times for user interactions with the media library (such as scrolling through the images and videos, selecting a particular image to display, transitioning between display types, etc.), etc.

Therefore, it is beneficial for the images, videos, and other assets within any size of media library to be curated such that the best images, videos, and other assets are more easily viewed and accessed by a user. Furthermore, in some approaches, images and videos which are not likely to be sought by the user may be filtered out from most views of the media library. Embodiments described herein provide an enhanced user experience to view and access the media library that promotes the best images, videos, and other assets.

In one example, assume that a user of a smartphone, named Mary, has pictures and videos of her children and family saved to her smartphone, along with even more images, videos, and composite presentations stored to a remote cloud server that are accessible on her smartphone. Assume that Trevor, Mary's son is celebrating his birthday tomorrow, and Mary wants to find a photo that she took of Trevor's third birthday party back in 2013. Further assume that at this birthday party, Mary captured three photos and a video from the party: one photo of kids playing that is blurry, one photo of Trevor smiling broadly next to his birthday cake, one photo of the receipt for the cake so that Mary could pay back her mother for buying the cake, and a video of Trevor opening gifts. Mary really likes the photo of Trevor smiling with his birthday cake, but is not interested in the blurry photo or the photo of the receipt for the cake. Mary also likes the video, but not as much as the photo of Trevor smiling with his birthday cake, and over the years Mary has returned often to view this particular photo.

Using conventional media libraries that are sorted chronologically, she may need to navigate the media library manually starting from the most recent photos and videos taken, backward through all of her images and videos taken in all the years from now, through 2014, to arrive at 2013. Then, Mary may need to navigate through all the photos taken in 2013 to locate the exact photo from Trevor's birthday party that she is looking for from amongst all other photos taken and stored from the year 2013. This may be a very time consuming and frustrating procedure for Mary to locate the exact photo she wants, and may cause her to abandon the effort before obtaining the photo of Trevor's third birthday party. If the media library was able to anticipate her desire to find the photo of Trevor smiling with his birthday cake from Trevor's third birthday party, without Mary needing to perform a search for the photo, her task would be completed faster and she may find more enjoyment in using the media library.

FIG. 1 is a block diagram of an example system 100 for providing a curated media library. System 100 may include multiple user devices, e.g., smartphone 102, laptop 104, etc. Each user devices 102, 104 may include a media library application 108 that is configured to display assets accessible to the particular user device on which the media library application 108 is executed, such as assets stored locally to the user device. Moreover, in one example, any of the various user devices 102, 104 may be configured to connect to a media server 110 to allow the media library application 108 to access additional assets that are stored remotely to media server 110 (and may not be local to the particular user device). In one approach, the media library application 108 may display remotely-stored and/or locally-stored assets in a graphical user interface (GUI) on user devices 102, 104.

Any type of user device (including those not specifically shown in FIG. 1) may be included in system 100, such as desktop computers, media devices like set-top boxes (STBs), mobile phones, digital streaming devices, smart televisions (TVs), tablet computers, wearable devices, etc.

Media library application 108 may be configured to present a media library via user devices 102, 104. The media library, although not shown, may be configured to present a plurality of assets to a user interacting with the media library. Any type of asset may be shown in the media library, such as images, photos, videos, animated images, composite presentations, etc., as described in more detail in FIGS. 2-9.

An image, as used herein, describes any type of digitally stored viewable content, such as static animation, a logo, a cartoon, artwork, etc. A photo as used herein describes a digital representation of real-world imagery that was captured using a digital camera device.

An animated image, as used herein, describes a container or other file format that includes a series of images that are manipulated or processed to appear as a coherent moving image when opened or played. Some example animated images include, but are not limited to, graphics interchange format (GIF) files, portable network graphics (PNG) files, multiple-image network graphics (MNG) files, Live Photos™, etc.

A composite presentation, as used herein, describes an arrangement of media assets, such as images and/or videos, that are selected according to a theme or purpose, and may be set to audio or music. For example, a composite presentation may be directed to a weekend ski trip, and may include videos and photos from the ski trip, such as pictures of family members surrounding a firepit drinking hot cocoa followed by an image of the ski resort, photos of a child wearing ski clothing, and then videos of family members skiing down the slopes. Of course, the order of the assets, the music and other audio played, titles, text or audio descriptions, etc., may be set or modified, as desired by a user of the media library.

Referring again to FIG. 1, in one approach, user devices 102, 104 may utilize a network 106 to access media server 110, or any other remotely accessible data source. Any type of network 106 may be utilized, such as the Internet, wide area network (WAN), local area network (LAN), wireless local area network (WLAN), virtual private network (VPN), mobile broadband network, etc. Moreover, in an approach, more than one network may be used to connect a user device 102, 104 to any other system, device, or network.

Media server 110 may be any type of system or device that is configured to store assets, and provide access to and/or transfer such assets to a requesting user device 102, 104. In one example, media server 110 may be a cloud server that hosts images, videos, and other assets so that they may be accessed, on demand, by user devices 102, 104. In a further approach, the media applications 108 may be client applications that rely on the media server 110 to provide instructions and/or assets for display on the user devices 102, 104.

Returning to the example of Mary, she may use mobile phone 102 to access a media library via media library application 108 to search for the photo of Trevor and his birthday cake from his third birthday party. If the photo is not stored locally to mobile phone 102, then media library application 108 may access media server 110 (possibly via network 106) to search for, and ultimately obtain the desired photo using any of the various approaches described herein.

FIGS. 2-6B show different example views or cards that may be displayed within a GUI of a media library application. These various views may be used to display different levels of the media library to allow a user, such as Mary in the example above, to more easily locate and access an asset that is of interest to Mary, like the picture of Trevor and his birthday cake from his third birthday party. In addition, in one example, undesirable assets, like the blurry photo or the receipt photo may be hidden from most views so that the number of assets that Mary navigates through to find a desired asset is reduced, making the task easier for Mary.

Figure 2:
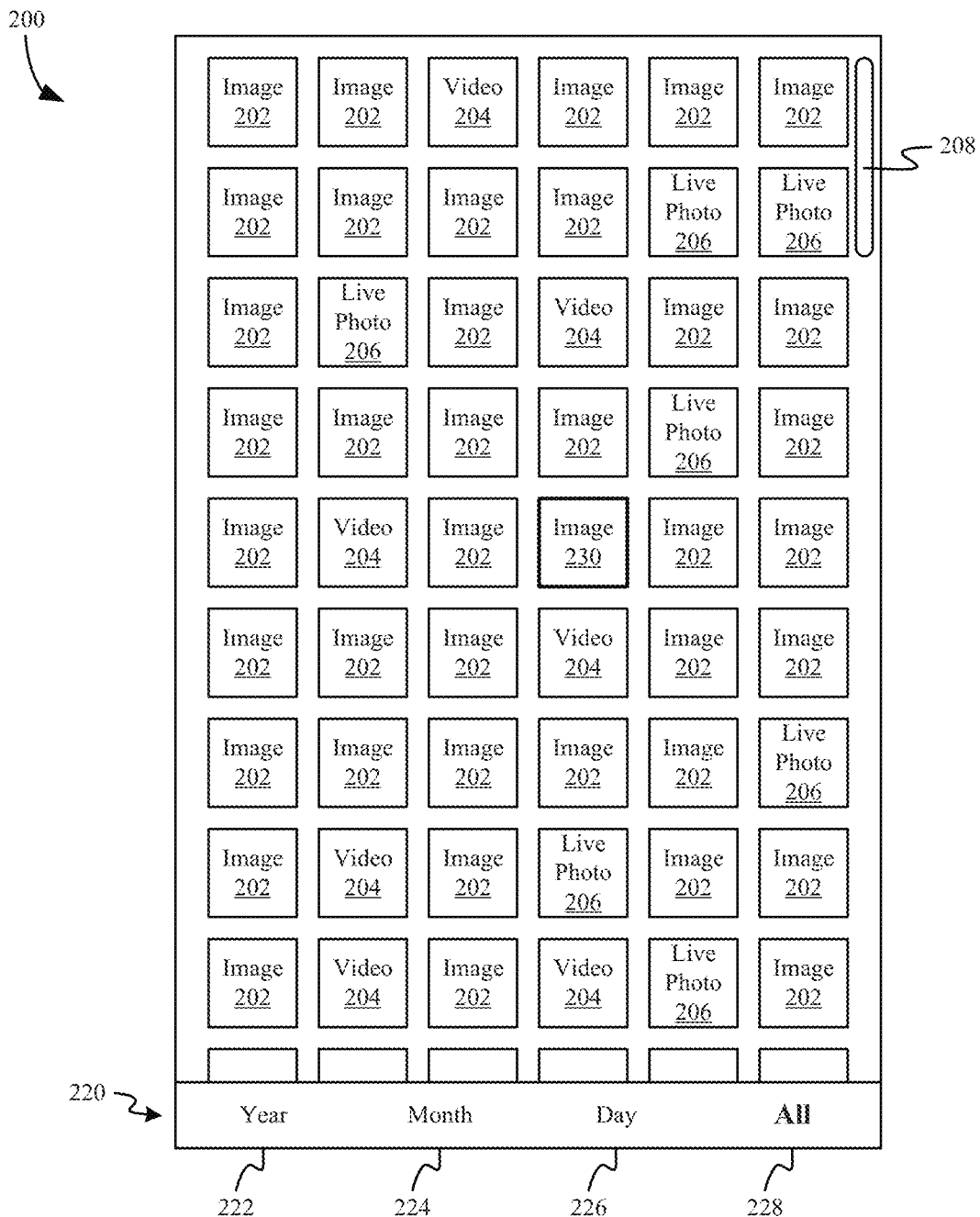
FIG. 2 shows an example all assets view of the media library application.

FIG. 2 shows an example all assets view 200 of the media library application. This view 200 may be used to display all assets of a media library, in one approach. All four of the assets captured during Trevor's third birthday party would appear in this view, for example. The assets may include still images 202, videos 204, animated images 206, or any other asset types, such as composite presentations, panoramic images, etc. As shown, only a portion of a plurality of assets that are stored to the media library are actually shown in all assets view 200 at any given time. This is because it is not possible to show all assets of a large media library in any functional way without utilizing a massive display, which is simply not available on most devices which are used to view the media library, e.g., mobile phones, laptop computers, etc.

The assets may be sorted chronologically in the media library, in an example. Other methods of sorting the assets may be employed in conjunction with or in place of chronological, such as alphabetically by name or title, by size, by curation score (as described later), by aesthetic score (as described later), etc. In addition, a scroll bar 208 may be provided to allow a user to scroll through the plurality of assets that may be displayed in all assets view 200, in an example. However, any type of mechanism that is able to navigate through the plurality of assets quickly and intuitively may be used, such as finger dragging on a touchscreen, up and down soft or hard key input, etc.

In all assets view 200, each of the assets is shown having substantially the same size, regardless of the type of asset in one approach. By substantially equal, what is meant is that each asset which is larger than the common frame size is scaled down to fit within the common frame of the all assets view 200, while assets which are smaller than the common frame size are centered within the common frame for display. In the example described above, the three photos and the video from Trevor's third birthday party may all appear having a same size.

In an example, a user may zoom in or zoom out while in all assets view 200. A user may provide zoom input to indicate a desired zoom level, such as by selecting one of a series of options (e.g., 10%, 25%, 50%, 75%, 90%, 100%, 150%, 250%, etc.), moving a slider icon on a slider bar, touch and drag input on a touchscreen display, etc. Zooming in increases a size of each asset, while zooming out decreases a size of each asset, with the increase or decrease being proportional to zoom input from the user.

In another approach, some of the assets shown in the all assets view 200 may have different sizes than other assets. The decision as to which assets to show more prominently (larger) may be based on several factors, as discussed in more detail later. In the example with Mary's photos, the blurry photo and the receipt photo may appear smaller than the photo of Trevor and his birthday cake and the video of opening gifts. In a further approach, because Mary likes the photo more than the video, the photo may appear larger than the video.

In an approach, all assets view 200 may include a ribbon element 220. The ribbon element 220 may include a set of selectable links or labels. For example, in FIG. 2, four labels are shown: Year label 222, Month label 224, Day label 226, and All label 228. All label 228 is shown highlighted, because the current view is all assets view 200. Any type of highlighting may be used to denote an active label, such as bold lettering, enlarged lettering, italicized lettering, a different background color surrounding the current label, different coloring for the current label, etc. Moreover, any name or image may be used to represent the different levels of the media library that are represented by the various labels, as would be appropriate for the specific labels chosen to navigate through the media library.

In FIG. 2, ribbon element 220 is shown positioned along a bottom of all assets view 200. However, ribbon element 220 may be positioned along a top of view 200, a side of view 200 (with vertical lettering in one example), or it may auto-hide and disappear when a user is not interacting with view 200 in some examples.

Each of the labels may be associated with a different type of card or view, so that when a particular label is selected, the view will change to display the associated card or view. For example, when Day label 226 is selected, the current view will transition to a day view, described in more detail in FIGS. 3-4. In another example, when Month label 224 is selected, the current view will transition to a month view, described in more detail in FIG. 5. According to another example, when Year label 222 is selected, the current view will transition to a year view, described in more detail in FIG. 6A.

In addition, a current focus of the current view will be maintained after the transition to the selected view. For example, in FIG. 2, if image 230 is a focus of view 200, indicated by the bold frame surrounding image 230, then image 230 will remain the focus of attention after transitioning to a day view by ensuring that a day or days that are shown in the day view include image 230 (in other words, a timestamp associated with image 230 occurs during a day that is shown in the day view transitioning to), e.g., if image 230 was taken on May 17, 2012, then the asset(s) shown in response to selecting Day label 226 will be taken on or around May 17, 2012.

The focus of a particular view or card may be indicated by a user selecting an asset within the view or card in one approach. This selection of the image may be indicated using a gesture or user input device, e.g., a mouse hover, mouse click, touch input on a touchscreen display, stylus input on a tablet, remote control, trackpad input on a laptop computer, etc.

In another approach, the focus of a particular view or card may be indicated by an image, video, or other asset that is currently displayed in a particular view. For example, if a user scrolls through assets of all assets view 200 and arrives at a portion of the plurality of assets that shows images captured on Jan. 6, 2017, then a transition to another view will maintain a focus on that date (e.g., a day view will show assets from Jan. 6, 2017, a month view will show assets from January 2017, and a year view will show assets from 2017).

When multiple assets from different dates are shown on a current view when a transition to another view is requested, absent explicit user input selecting an asset to focus on, the media library application may determine that an asset located near a center of all currently-displayed assets is the focus of the current view, in one approach.

In another approach, a last user selected image may remain a focus of the particular view in the absence of a later selection.

Figure 3:
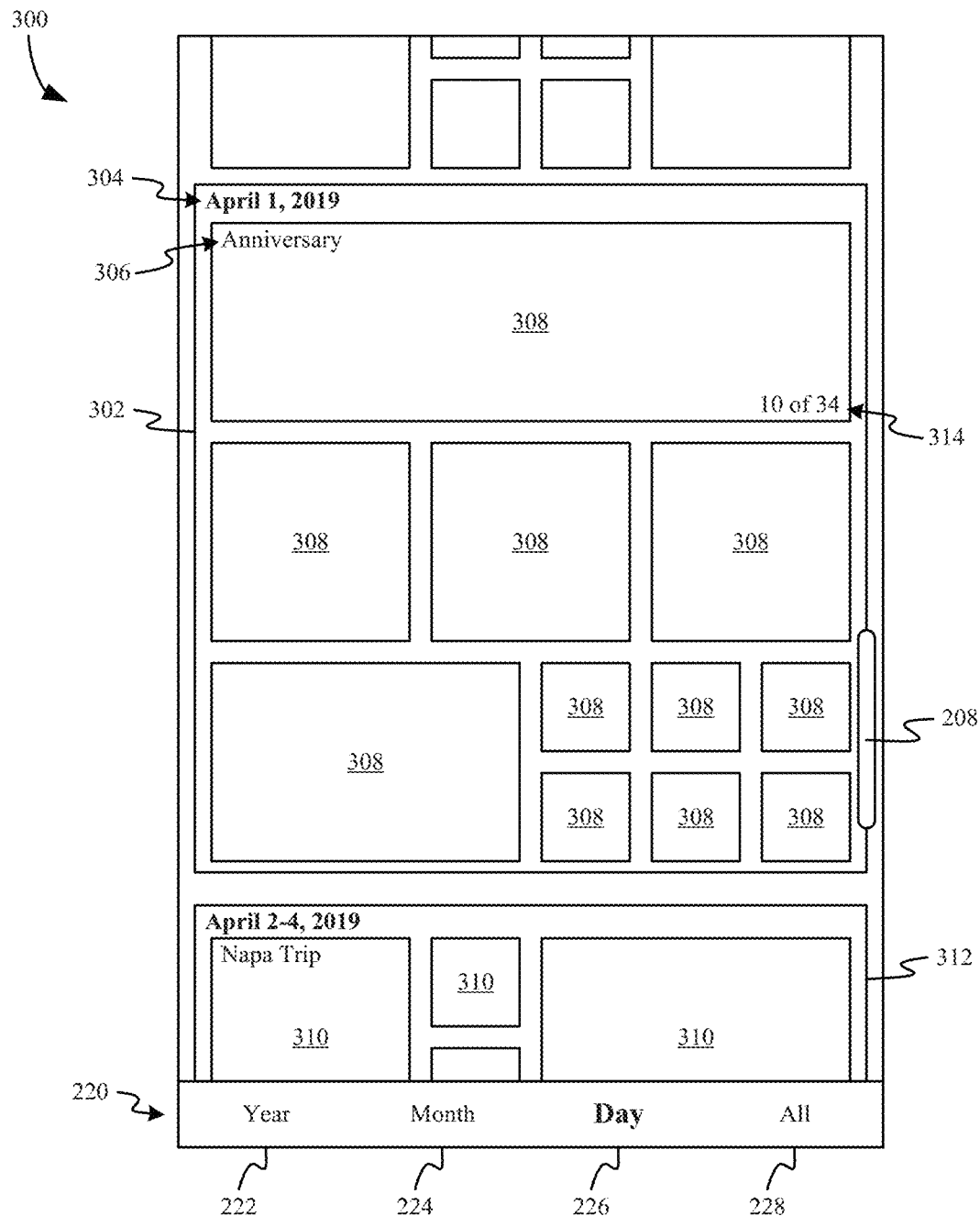
FIG. 3 shows an example day view of the media library application focusing on a day card.
Figure 17:
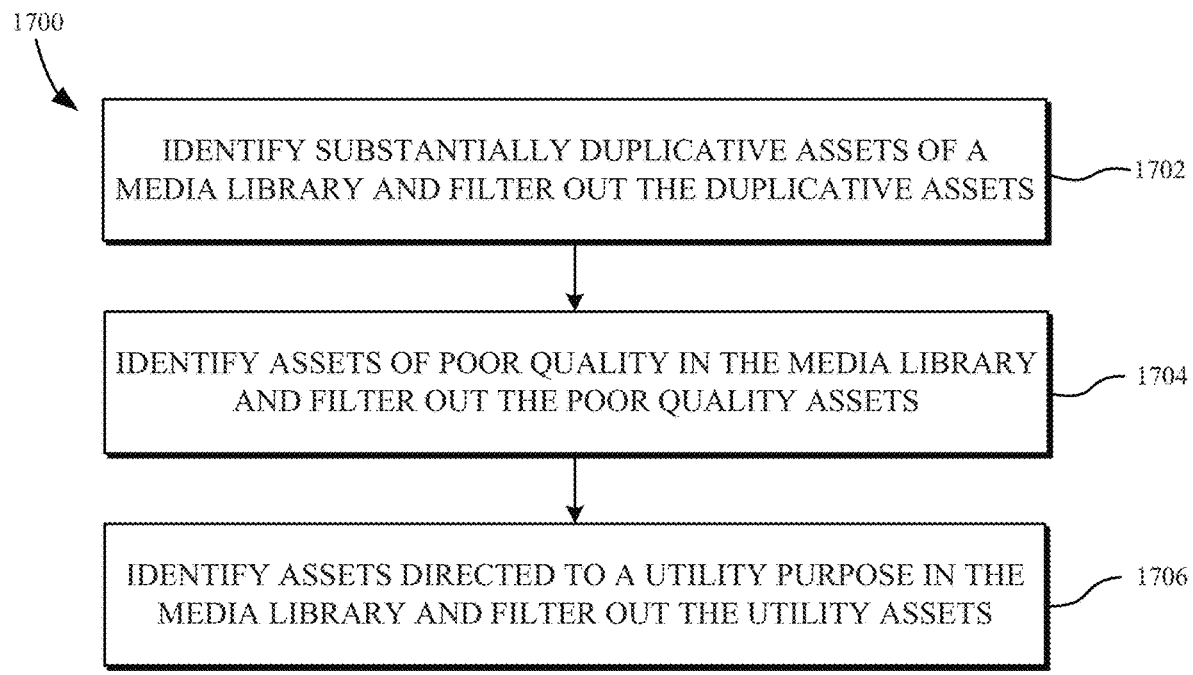
FIG. 17 is a flow diagram of an example process for curating assets of a media library.

FIG. 3 shows an example day view 300 of the media library application focusing on a day card 302. This view 300 may be used to display some or all assets associated with a particular day (Apr. 1, 2019 for example). In one approach, day view 300 displays curated assets 308 on a day card 302, and hides from view other assets associated with the particular day that are filtered out from the set of curated assets 308 presented on day card 302. FIG. 17 shows an example curation process that may be used in the context of determining which assets to display in day view 300 of FIG. 3, in one approach.

Continuing the example for Mary, only the video of opening gifts and the photo of Trevor and his birthday cake may be presented in a day view of Trevor's third birthday, while the blurry photo and receipt photo would be filtered out and hidden from the day view of Trevor's third birthday. This would allow Mary to more easily access desired assets from Trevor's third birthday party without needing to navigate through undesired content (like the blurry photo and receipt photo), thereby providing a better user experience because the media library application identifies the most meaningful assets (e.g., based on aesthetics, people, location, etc.) and presents those assets to the user prominently.

An example day view 300 focuses on Apr. 1, 2019, and displays eleven curated assets 308 from this day within day card 302. Day card 302 includes a timeframe reference 304 which indicates the particular day represented by day card 302 (Apr. 1, 2019) and a contextual description 306 of curated assets 308 included in day card 302 ("Anniversary"). The timeframe reference 304 may be determined based on metadata of curated assets 308 (e.g., a timestamp for creation, timestamp for last modified, timestamp for when asset is received in media library, etc.). The contextual description 306 may be created based on metadata associated with curated assets 308, information about the user of the media library (important dates, profile information describing the user, social media information, etc.), information about family members of the user, information about friends of the user, etc. This collected information may be used to determine an appropriate contextual description for assets 308. As shown, curated assets 308 relate to an anniversary for the user or another person represented in curated assets 308 in an example, but any event, holiday, trip, location, date, etc., may be considered in determining the contextual description 306.

In one approach, the contextual description 306 is automatically generated, and may be user-editable after creation to allow the user to more concisely or accurately describe curated assets 308 included in day card 302.

Some assets 308 on day card 302 are shown larger than other assets. A decision as to which assets to promote (e.g., show larger) may be based on which assets are determined to be key asset(s) for the day. A key asset may be determined, in an example, based on a curation score of the curated assets shown to the day card 302. For example, the largest asset positioned at a top of day card 302 may be a key asset for Apr. 1, 2019. The next largest asset shown at a lower left corner of day card 302 may also be a key asset having a next highest curation score. Calculation of curation scores is described in more detail later, and any method of determining a key asset may be used, alone or in conjunction with curation scores or some other known method of determining key assets.

The choice of which assets 308 to show on day card 302 and which assets to hide from the day view 300 may be based on several factors. One intent in determining how many and what sizes of assets to display to the various day cards 302 is to eliminate any white space where assets are not shown in day view 300.

In one example, an asset count reference 314 may be included on day card 302 which indicates a total number of assets that exist for Apr. 1, 2019 in the media library, e.g., 34. The location of where the asset count reference 314 is displayed is not limited to the position shown in FIG. 3, as it may be located on a left side of the day card 302, right side, center, top, bottom, etc. The asset count reference 314 may also indicate a chronological order for the asset shown within the total number of assets in an example, e.g., 10, indicating that the asset shown is the $10^{th}$ asset captured in for April 1. The asset count reference 314 as shown in day view 300 is just one example of how information may be relayed to a user, and many other possibilities are available for providing information about the assets available in the media library for each particular day. Moreover, in an approach, selection of asset count reference 314 may open an all asset view with a focus on the key asset for Apr. 1, 2019.

According to one approach, day view 300 may include multiple day cards 302 for a single day in response to multiple types of events being captured on the same day. The groupings for the assets may be based on where and when the assets were created. In one example, assets captured at a user's work location, assets captured at a user's home location, assets captured during a trip outside of a user's locale area, and assets captured for any and all other events may be displayed on separate cards 302 on the day view 300 for the same day in which they are captured.

Other event types may be added to these four types and used to group together assets captured on same days for display in the day view 300, as would be apparent to one of skill in the art upon reading the present disclosures.

To determine whether assets are created at the same event, several different criteria may be considered. One criterion for determining whether assets are created at the same event is an elapsed time between the capture of the individual media items. For example, if there is a break, pause, or time lapse of greater than a threshold amount (e.g., 1 hour, 2 hours, etc.) between the time of capture for any two assets, it is indicative of the assets being from different events. Another criterion for determining whether assets are created at the same event is whether the assets were captured using the same device or different devices. For example, two assets captured at about a same time but at different locations using different devices most likely are not of the same event, while assets captured at about the same time by the same device probably are of the same event. In another example, assets captured at about the same time at the same location by different devices probably are of the same event, but when location data is not available, the different device capturing the asset may be used as a clue of whether the assets represent the same event. Another criterion for determining whether assets are created at the same event is persons recognized in the assets. For example, if the same person or group of people appear in several assets, they are more likely to be of the same event. Yet another criterion for determining whether assets are created at the same event is a location where an asset is captured, as specified by metadata or input from the user. For example, a group of photos captured at the same location are probably of the same event.

Any of the above criteria may be used alone or in combination to provide a more accurate assessment of whether a group of assets are from the same event, even if some of the assets in the group were obtained from different devices, by different users, at different locations, across a range of different times, etc.

In an approach, each event may be limited to collecting assets from one device and for one time period. The time period may not extend past 3 AM or 4 AM in a couple of examples, to allow for the user to have at least a 3-4 hour break for sleep. A time period may begin on a new day starting at 5 AM or 6 AM, in several examples. The clock of the device which captured the asset is used to timestamp when the asset was created, with local time for where the device is located at a time of capturing the asset being used.

In one example, density-based clustering may be used for determining which assets belong to an event. Some rules may be applied to the collection of assets for a particular grouping. For example, GPS error correction may be applied to determine an accurate location for the asset, assets received from other devices may be collected in a separate group even if they are determined to be from the same event, each distinct location where assets are created may be considered a different event, continual movement of greater than a threshold velocity may signal a continued event, etc.

Ribbon element 220 may be shown in day view 300 to indicate that the current view is day view 300 by highlighting Day label 226 in an example. Ribbon element 220 may also be configured to receive user input to navigate to another view using one of the labels (e.g., Year label 222, Month label 224, All label 228). Day views include both individual day cards (e.g., day card 302) and aggregation cards (e.g., aggregation card 312).

In one example, multiple day cards may be shown in day view 300 from a first day, and then one or more day cards from another day may be shown when day view 300 has space to fit all the multiple day cards.

In another example, because day card 302 for Apr. 1, 2019 does not fill the entire GUI, other day and/or aggregation cards (as appropriate in a chronological ordering) may be displayed before and/or after day card 302. For example, aggregation card 312 is shown below (after) day card 302 which displays curated assets 310 for an aggregation of days (Apr. 2-4, 2019) that represent a trip to Napa. Aggregation cards that represent multiple days are described in more detail with reference to FIG. 4A.

Figure 4A:
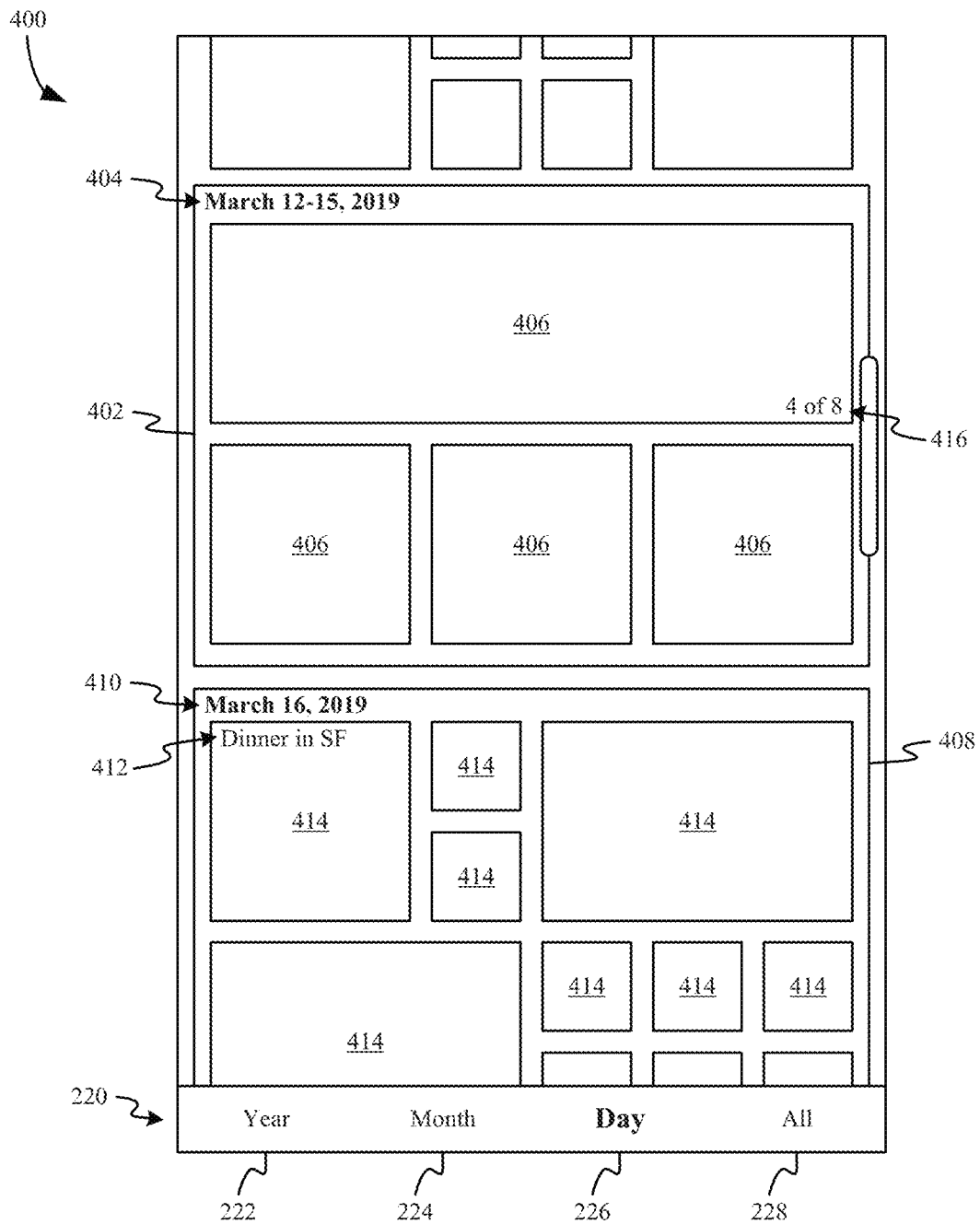
FIG. 4A shows an example day view of the media library application focusing on an aggregation card.

FIG. 4A shows an example day view 400 of the media library application focusing on an aggregation card 402. This view 400 may be used to display some or all assets associated with multiple consecutive days (Mar. 12-15, 2019 for example).

In one approach, day view 400 displays curated assets 406 on aggregation card 402 in response to a determination that there are not enough assets from any of the individual days of the aggregation period (March 12-15) to display the days on separate day cards. In other words, the media library application may determine a number of curated assets for each day, compare the number of curated assets for each day with a predetermined day card threshold (e.g., two, three, four, five curated assets, etc.), and determine whether one or more of the particular days should be represented with its own day card, or aggregated together with other adjacent days (previous day or subsequent day) to form an aggregation card to represent assets during the aggregation period.

In one example, one or more days may not have any assets associated with those days, and therefore may be included in an aggregation card with one or more other consecutive days, which may or may not include curated assets.

In an example, presence of an asset for a particular day is not sufficient to cause the asset to be presented on an individual day card, or even display the asset on an aggregation card; instead, only curated assets are included in a determination of whether to use an aggregation card or a day card to present assets in the media library in one approach.

In another approach, an aggregation card may be used to represent a trip that may span one or more days away from a user's typical locale. In this approach, each user may have a locale area assigned to the user based on historical device location information obtained from electronic devices that are used by the user, e.g., a smartphone, laptop computer, etc. By ascertaining a typical locale for a user, it can be determined when the user leaves the locale area, which generally indicates that the user has taken a trip. In several examples, the locale area for a user may include an area of between 30 square kilometers and 100 square kilometers centered at a home location of the user, such as a locale area of about 70 square kilometers.

The locale area may be expanded or contracted for a particular user based on historical location data. For example, if Sam typically stays within an area of 20 square kilometers around his home, then the locale area for Sam may be set at 20 square kilometers surrounding his home. Then, if Sam begins regularly travelling outside of this set locale area, it may be enlarged to include the regular activity.

In another example, if Susan travels to work a great distance from home, because she lives in Tracy, Calif. and works in San Francisco, Calif. about 100 kilometers away, the locale area for Susan may be set to include this distance to work (about 100 kilometers) within a radius of the locale area, such that the locale area for Susan may encompass an area of more than about 31,400 square kilometers. In other approach, two distinct locale areas may be set for Susan, one around her work location and one around her home location, with the path between the two locations being ignored for determination of a trip being taken by Susan.

In an example, a home location for a user may be determined based on historical location data for the user and the user's associated electronic devices which have location services enabled thereon. A user typical spends most nights at home, and therefore a majority of nights spent at a single location is an indication that this location is the user's home location. A location of a device may also be determined based on which cell tower is used for mobile communications at different times of the day, along with other indicia of location that may obtained by the media library application from device information.

Also, in an example, a user's work location may also be determined based on historical location data. Typically, if a user spends most weekdays at a location other than the user's home location, then this location is most likely the user's work location.

Using these techniques, or other techniques known in the art, a home location and a work location may be determined for each user, individually, for use in determining how to enrich the user experience for presentation of assets in the media library for each user.

Example day view 400 focuses on aggregation period Mar. 12-15, 2019, and displays four curated assets 406 from within this aggregation period on aggregation card 402. Aggregation card 402 may include a timeframe reference 404 which indicates the particular aggregation period represented by aggregation card 402 (Mar. 12-15, 2019). Although not shown, a contextual description of curated assets 406 may be included in aggregation card 402 in some approaches. The timeframe reference 404 may be determined based on metadata of curated assets 406 (e.g., a timestamp for creation, timestamp for last modified, timestamp for when asset is received in media library, etc.).

FIG. 17 shows an example curation process that may be used in the context of determining which assets to display to card(s) in day view 400 of FIG. 4A, in one approach.

Some assets 406 on aggregation card 402 are shown larger than other assets. A decision as to which assets to promote (show larger) may be based on which assets are determined to be key asset(s) for the aggregation of days. A key asset may be determined, in an example, based on a curation score of all assets collected for a particular day. For example, the largest asset positioned at a top of aggregation card 402 may be a key asset for time period Mar. 12-15, 2019. The other assets shown all appear with a same size, indicating that none of these assets are key assets for this time period. Calculation of curation scores is described in more detail later, and any method of determining a key asset may be used, alone or in conjunction with curation scores or some other known method of determining key assets.

The choice of which assets 406 to show on aggregation card 402 and which assets to hide from the day view 400 may be based on several factors. In one example, an asset count reference 416 may be included on aggregation card 402 which indicates a total number of assets that exist for Mar. 12-15, 2019 in the media library, e.g., 8. The asset count reference 416 may also indicate a chronological order for the asset shown within the total number of assets in an example, e.g., 4, indicating that the asset shown is the $4^{th}$ asset captured in the time period of March 12-15. In another example, the asset count reference 416 may indicate numbers for the day in which the asset shown was captured rather than overall numbers for the aggregation time period. The asset count reference 416 as shown in day view 400 is just one example of how information may be relayed to a user, and many other possibilities are available for providing information about the assets available in the media library for each particular day. Moreover, in an approach, selection of asset count reference 416 may open an all asset view with a focus on the key asset for Mar. 12-15, 2019.

According to one approach, day view 400 may include multiple day cards 408 for a single day in response to multiple types of events being captured on the same day. The groupings for the assets may be based on where and when the assets were created. In one example, assets captured at a user's work location, assets captured at a user's home location, assets captured during a trip outside of a user's locale area, and assets captured for any and all other events may be displayed on separate day cards 408 on the day view 400 for the same day in which they are captured.

Other event types may be added to these four types and used to group together assets captured on same days for display in the day view 400, as would be apparent to one of skill in the art upon reading the present disclosures.

Ribbon element 220 may be shown in day view 400 to indicate that the current view is day view 400 by highlighting Day label 226 in an example. Ribbon element 220 may also be configured to receive user input to navigate to another view using one of the labels (e.g., Year label 222, Month label 224, All label 228). Day views include both individual day cards (e.g., day card 408) and aggregation cards (e.g., aggregation card 402).

Because aggregation card 402 for aggregation period Mar. 12-15, 2019 does not fill the entire GUI, day card 408 is shown below (after) aggregation card 402 which displays curated assets 414 for an individual day (Mar. 16, 2019) that represent a dinner in San Francisco. The event is indicated by the contextual reference 412, while the date associated with day card 408 is indicated by timeframe reference 410.

Figure 4B:
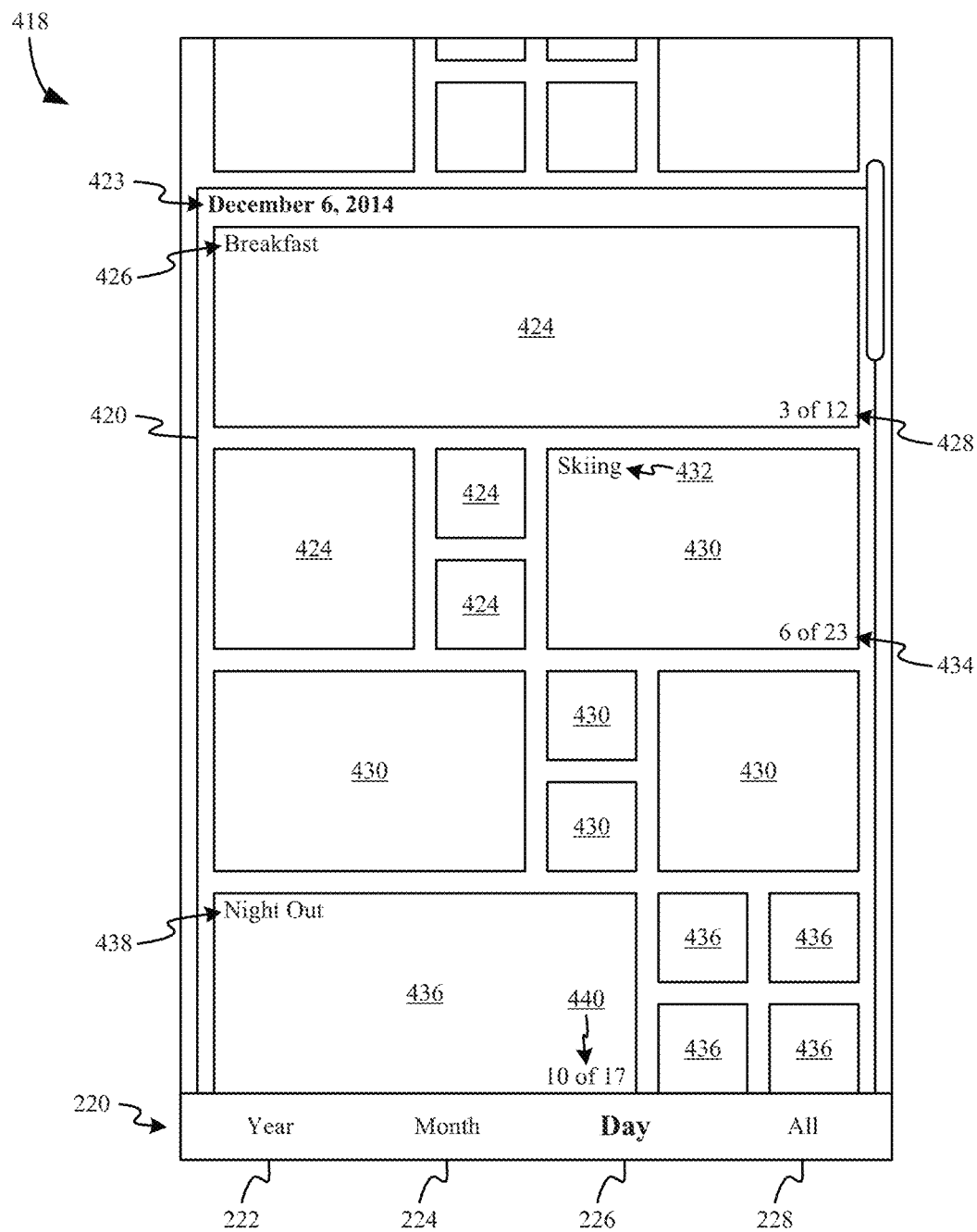
FIG. 4B shows an example day view of the media library application focusing on a single day card showing multiple events.

FIG. 4B shows an example day view 418 of the media library application focusing on a single day card 420 showing multiple events. This view 418 may be used to display some or all assets associated with the single day, regardless of a location or event in which the assets were acquired or captured (Dec. 6, 2014 for example). In an example, assume that on this day, Mary was on a ski trip where she had breakfast in the morning at a café, skied during the day, then went out to a restaurant and some cocktails in the evening. Each of these different events may be captured on different day cards or on the same day card, in several approaches.

In one approach, day view 418 displays curated assets 424 on day card 420 for Dec. 6, 2014 that are directed to "Breakfast" as indicated by contextual reference 426. Four curated assets 424 are shown for the Breakfast event, with the key asset (shown larger than the other curated assets for Breakfast) having an asset count reference 428.

In one example, the asset count reference 428 may indicate a total number of assets that exist for the Breakfast event on Dec. 6, 2014 in the media library, e.g., 12. The asset count reference 428 may also indicate a chronological order for the asset shown within the total number of assets in an example, e.g., 3, indicating that the asset shown is the $3^{rd}$ asset captured for the Breakfast event. In another example, the asset count reference 428 may indicate numbers for the day in which the asset shown was captured rather than numbers for the event. The asset count reference 428 as shown in day view 418 is just one example of how information may be relayed to a user, and many other possibilities are available for providing information about the assets available in the media library for each particular day and/or event. Moreover, in an approach, selection of asset count reference 428 may open an all asset view with a focus on the key asset for the Breakfast event on Dec. 6, 2014.

As shown in this example, day view 418 also displays curated assets 430 on day card 420 for Dec. 6, 2014 that are directed to "Skiing" as indicated by contextual reference 432. Five curated assets 430 are shown for the Skiing event, with the key asset (shown with the contextual reference 432 having an asset count reference 434.

In one example, the asset count reference 434 may indicate a total number of assets that exist for the Skiing event on Dec. 6, 2014 in the media library, e.g., 22. The asset count reference 434 may also indicate a chronological order for the asset shown within the total number of assets in an example, e.g., 6, indicating that the asset shown is the $6^{th}$ asset captured for the Skiing event. The asset count reference may display other information and function as described above, in more examples.

Also shown in this example, day view 418 displays curated assets 436 on day card 420 for Dec. 6, 2014 that are directed to "Night Out" as indicated by contextual reference 438. Five curated assets 436 are shown for the Night Out event, with the key asset (shown larger with the contextual reference 438 having an asset count reference 440.

In one example, the asset count reference 440 may indicate a total number of assets that exist for the Night Out event on Dec. 6, 2014 in the media library, e.g., 17. The asset count reference 440 may also indicate a chronological order for the asset shown within the total number of assets in an example, e.g., 10, indicating that the asset shown is the 10$^{th}$ asset captured for the Night Out event. The asset count reference may display other information and function as described above, in more examples.

FIG. 17 shows an example curation process that may be used in the context of determining which assets to display to day card 420 in day view 418 of FIG. 4B, in one approach.

Some assets in each event may be displayed larger to day card 420 than other assets. A decision of which assets to promote (e.g., show larger) may be based on which assets are determined to be key asset(s) for the events of the day. A key asset may be determined, in an example, based on a curation score of all assets collected for a particular event within the day. For example, the largest asset positioned at a top of day card 420 may be a key asset for the day. Calculation of curation scores is described in more detail later, and any method of determining a key asset may be used, alone or in conjunction with curation scores or some other known method of determining key assets. Moreover, the choice of which assets 406 to show on day card 420 and which assets to hide from the day view 418 may be based on several factors as also described herein.

According to one approach, day view 418 may include multiple day cards for a single day in response to multiple types of events being captured on the same day. In another approach, as shown in FIG. 4B, one day card 420 may show multiple events. The groupings for the assets may be based on where and when the assets were created. In one example, assets captured at a user's work location, assets captured at a user's home location, assets captured during a trip outside of a user's locale area, and assets captured for any and all other events may be displayed on separate day cards on the day view 420 for the same day in which they are captured.

Other event types may be added to these four types and used to group together assets captured on same days for display in the day view 420, as would be apparent to one of skill in the art upon reading the present disclosures.

Ribbon element 220 may be shown in day view 418 to indicate that the current view is day view 418 by highlighting Day label 226 in an example. Ribbon element 220 may also be configured to receive user input to navigate to another view using one of the labels (e.g., Year label 222, Month label 224, All label 228). Day views include both individual day cards (e.g., day card 420) and aggregation cards.

Figure 5:
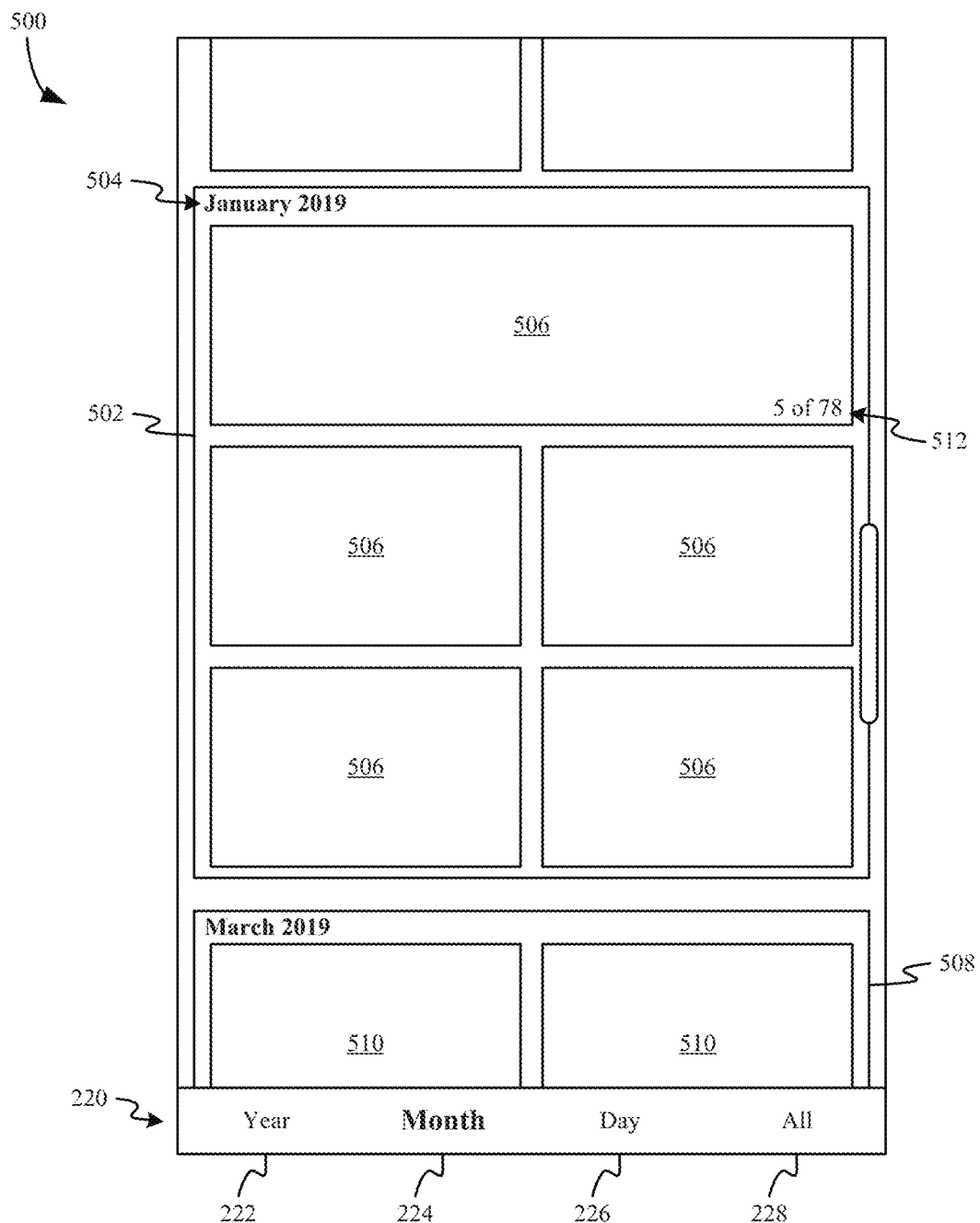
FIG. 5 shows an example month view for the media library application focusing on a month card.

FIG. 5 shows an example month view 500 for the media library application focusing on a month card 502. This view 500 may be used to display key assets 506 associated with a particular month (January 2019 for example). Key assets 506 are assets from the media library associated with the particular month card 502 that are determined to be the best assets to represent the month (e.g., most likely to be important, desirable, memorable, aesthetically pleasing, etc.).

Key assets may be selected from curated assets based on curation scores of the various curated assets. A curated asset which attains a highest curation score for a particular week in a month may be selected as the key asset to represent that week, in one approach.

In another approach, a threshold curation score may be determined, and this threshold curation score may be compared to curation scores calculated for curated assets for the month. The threshold curation score may be dynamically determined to only select a certain percentage of assets to be key assets (e.g., a top 10%, 5%, 2%, 1%, 0.5%, etc.). All curated assets that have a curation score greater than or equal to the threshold curation score may be considered a key asset for the month in this approach.

In an example, determining which key assets to display for a month may include randomly selecting up to five key assets from amongst all key assets for a particular month and displaying these selected key assets on month card 502. Each time month card 502 is navigated to by a user, another set of key assets may be randomly selected and displayed. In this way, the month card 502 may dynamically change each time it is navigated to, but still displays only key assets for the month represented which are most likely to be the best assets taken from the month.

A curation score for a particular curated asset may be determined based on one or more factors. Example factors used to determine a curation score include, but are not limited to, a global aesthetic, a number of shares for the particular asset, a number of views for the particular asset, a number of persons identified in the particular asset, a size of a grouping of assets that includes the particular asset, an imputed meaning for the particular asset, etc. An example process for determining key assets is described in more detail in FIG. 18.

Referring again to FIG. 5, in one approach, month view 500 displays up to five key assets 506 on month card 502 in response to a determination that a key asset is present for each calendar week of the particular month (e.g., January 2019). Although a month is limited to 31 days (i.e., 4 weeks+3 days), sometimes a month may be spread across five calendar weeks. Therefore, a month card 502 may be represented by up to five key assets 506 in an approach.

For example, January 2019 starts on a Tuesday and ends on a Thursday; therefore, calendar weeks of January 2019 may be: 1) Tuesday January 1-Saturday January 5, 2) Sunday January 6-Saturday January 12, 3) Sunday January 13-Saturday January 19, 4) Sunday January 20-Saturday January 26, and 5) Sunday January 27-Thursday January 31. Of course, calendar weeks may begin on any day of the week (Saturday, Sunday, Monday, etc.) but are limited to including seven days, unless they are the first or last calendar week, where they may include less than seven days.

In one example, one or more calendar weeks of a month may not have any key assets associated with those weeks, and therefore may not have a key asset shown on month card 502. In an example, a month which includes no key assets may not have a month card shown in month view 500, as shown by the absence of a month card for February 2019 between month card 502 for January 2019 and month card 508 for March 2019 that shows key assets 510 for March 2019. In another example, each month may be represented by at least a timeframe reference 504, even if no key assets are displayed on a month card.

Moreover, because month card 502 for January 2019 does not fill the entire GUI, month view 500 also displays month card 508 below (after) month card 502. The portion of month card 508 that is visible displays key assets 510 for the next month having key assets to display, e.g., March 2019.

In some approaches, one or more of the key assets 506 on month card 502 may include a contextual description (not shown). An optional contextual description may be displayed at all times, or only when a user is interacting with, has selected, or otherwise focuses on a particular key asset of month card 502, in various examples. Any type of user input may be used to determine interest in a particular key asset, such as hovering over the key asset with a mouse cursor, finger hovering over the key asset using a touchscreen, touch and hold input, etc.

The choice of which key assets 506 to show on month card 502 and which assets to hide from the month view 500 may be based on several factors. In one example, an asset count reference 512 may be included on month card 502 which indicates a total number of assets that exist for January 2019 in the media library, e.g., 78. The asset count reference 512 may also indicate a chronological order for the shown asset within the total number of assets in an example, e.g., 5, indicating that the asset shown is the $5^{th}$ asset captured in January. In another example, the asset count reference 512 may indicate numbers for a single day of January in which the asset shown was captured rather than overall month numbers. The asset count reference 512 as shown in month view 500 is just one example of how information may be relayed to a user, and many other possibilities are available for providing information about the assets available in the media library for each particular month. Moreover, in an approach, selection of asset count reference 512 may open a day view with a focus on the key asset for January 2019.

Ribbon element 220 may be shown in month view 500 to indicate that the current view is month view 500 by highlighting Month label 224 in an example. Ribbon element 220 may also be configured to receive user input to navigate to another view using one of the labels (e.g., Year label 222, Day label 226, All label 228). Day views may include both individual day cards and aggregation cards when appropriate.

Figure 6A:
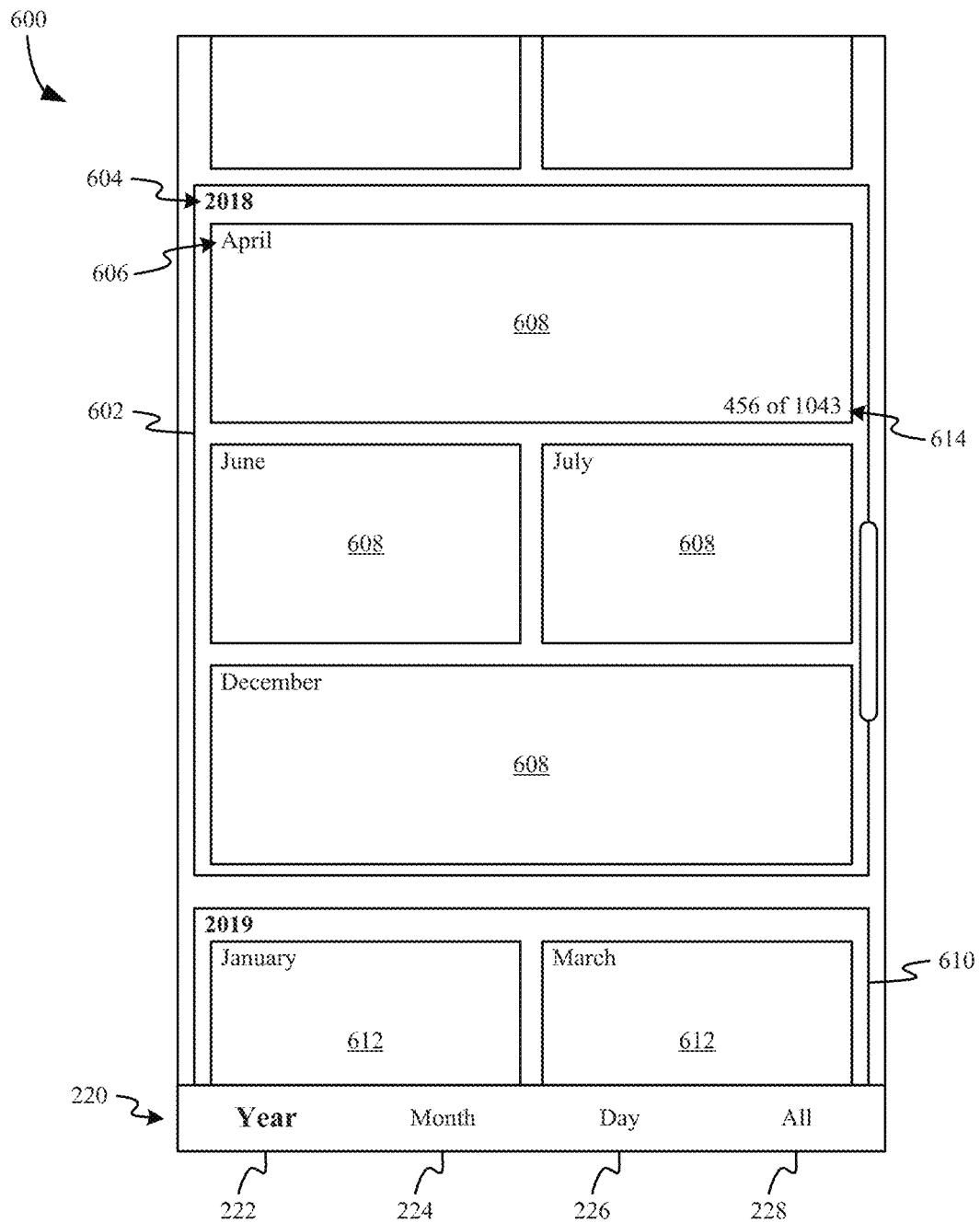
FIG. 6A shows an example year view for the media library application focusing on a year card.

FIG. 6A shows an example year view 600 for the media library application focusing on a year card 602. This view 600 may be used to display one or more key assets 608 associated with the particular year (e.g., 2018). In one approach, one or more particular months (e.g., April, June, July, December) of a particular year (2018 for example) may have key assets 608 displayed for year card 602.

Year card 602 may include a timeframe reference 604 (indicating the year as "2018") and/or one or more contextual descriptions 606. In this example, each contextual description 606 may indicate a month from which a key asset 608 is derived. In other examples, contextual descriptions 606 may include a description of an event or activity of the corresponding key asset 608.

An optional contextual description may be displayed at all times, or only when a user is interacting with, has selected, or otherwise focuses on a particular key asset of year card 602, in various examples. Any type of user input may be used to determine interest in a particular key asset, such as hovering over the key asset with a mouse cursor, finger hovering over the key asset using a touchscreen, touch and hold input, etc.

The choice of which key assets 608 to show on year card 602 and which assets to hide from the year view 600 may be based on several factors. In one example, an asset count reference 614 may be included on year card 602 which indicates a total number of assets that exist for 2018 in the media library, e.g., 1043. The asset count reference 614 may also indicate a chronological order for the shown asset within the total number of assets in an example, e.g., 456, indicating that the asset shown is the $456^{th}$ asset captured in the year 2018. In another example, the asset count reference 614 may indicate numbers for the month of April rather than overall year numbers. The asset count reference 614 as shown in year view 600 is just one example of how information may be relayed to a user, and many other possibilities are available for providing information about the assets available in the media library for each particular year and month. Moreover, in an approach, selection of asset count reference 614 may open a day view or a month view with a focus on the key asset for January 2019.

Ribbon element 220 may be shown in year view 600 to indicate that the current view is year view 600 by highlighting Year label 222 in an example. Ribbon element 220 may also be configured to receive user input to navigate to another view using one of the labels (e.g., Month label 224, Day label 226, All label 228). Day views may include both individual day cards and aggregation cards when appropriate.

In an example, key asset(s) 608 displayed for year card 602 may be selected from key assets of months for year 2018. Because key assets 608 shown for year card 602 are selected from key assets for months in the particular year represented by year card 602 (e.g., 2018), and not all months may have key assets, as discussed previously, not every month in year 2018 may be shown on year card 602 in this example.

In an example, one key asset for each month in 2018 (the year represented for year card 602) that has a key asset may be displayed, in an approach, with each key asset 608 shown being determined to be the best asset to represent the corresponding month (e.g., most likely to be important, desirable, memorable, aesthetically pleasing, etc.).

In one approach, a curation score that is used to determine key asset may be based on significant event(s) within a respective month that would be important to the user. For example, if January is the birth month for Mary's son Trevor, then one or more key assets shown on a month card for January may be of Trevor's birthday in a previous year, or possibly images of Trevor in general to reflect that January is his birth month. When multiple important people (family, friends, etc.) have birthdays in the same month, group shots of the people who share the birthday month may be selected preferentially as a key asset. Of course, other memorable, nostalgic, and important events may be reflected in key assets as would be understood by one of skill reading the present descriptions.

The single key asset 608 for each month may be selected from key assets of the particular month based on curation scores of the various key assets. A key asset which attains a highest curation score for a particular month may be selected as the key asset 608 to represent that month, in one approach.

In another approach, a threshold curation score may be determined, and this threshold curation score may be compared to curation scores calculated for key assets for each month in the year. The threshold curation score may be dynamically determined to only select a certain percentage of assets to be key assets (e.g., a top 10%, 6%, 2%, 1%, 0.6%, etc.). All curated assets that have a curation score greater than or equal to the threshold curation score may be considered a key asset for the month in this approach.

In an example, determining which key assets 608 to display for a particular month may include randomly selecting one or more key assets from amongst all key assets for a particular month and displaying these selected key assets for the particular month on year card 602. Each time year card 602 is navigated to by a user, another one or more key assets may be randomly selected and displayed in each of the month(s) displayed to year card 602. In this way, year card 602 may dynamically change each time it is navigated to, but still displays only key assets for months represented in the year which are most likely to be the best assets taken from the various months.

In another approach, only a single key asset may be displayed on year card 602. The key asset 608 chosen to represent year card 602 may be selected to be a key asset from the particular year (e.g., 2018) that has a timestamp most similar to a current date. For example, if today's date is Apr. 30, 2019, then the key asset 608 used to represent year card 602 for 2018 may be a key asset for the month of April 2018 preferentially, or the month of May 2018 if a key asset for April 2018 does not exist. Should no key asset exist for May 2018, then a key asset from another month in 2018 may be selected based on a proximity of a timestamp for the key asset and the current date, in one example.

A curation score for a particular curated asset may be determined based on one or more factors. Example factors used to determine a curation score include, but are not limited to, a global aesthetic, a number of shares for the particular asset, a number of views for the particular asset, a number of persons identified in the particular asset, a size of a grouping of assets that includes the particular asset, an imputed meaning for the particular asset, etc. An example process for determining key assets is described in more detail in FIG. 18.

Referring again to FIG. 6A, because year card 602 for 2018 does not fill the entire GUI, the year view 600 also displays year card 610 below (after) year card 602. The portion of year card 610 that is visible displays key assets 612 for the next year, 2019.

For Mary in the previous example, she may be able to see her favorite photo of Trevor and his birthday cake from his third birthday party in 2013 represented on a year card for 2013 whenever the current date is close to Trevor's birthday. The promotion of Trevor's birthday photo may be due to that photo receiving a high curation score based on the number of times that Mary has viewed the photo, a number of times she shared the photo, knowledge that the photo is of a birthday (imputed meaning of the photo), etc. Moreover, because that photo would qualify as a key asset, it may also be featured prominently on a month card for Trevor's birthday month in 2013 in one approach.

Figure 6B:
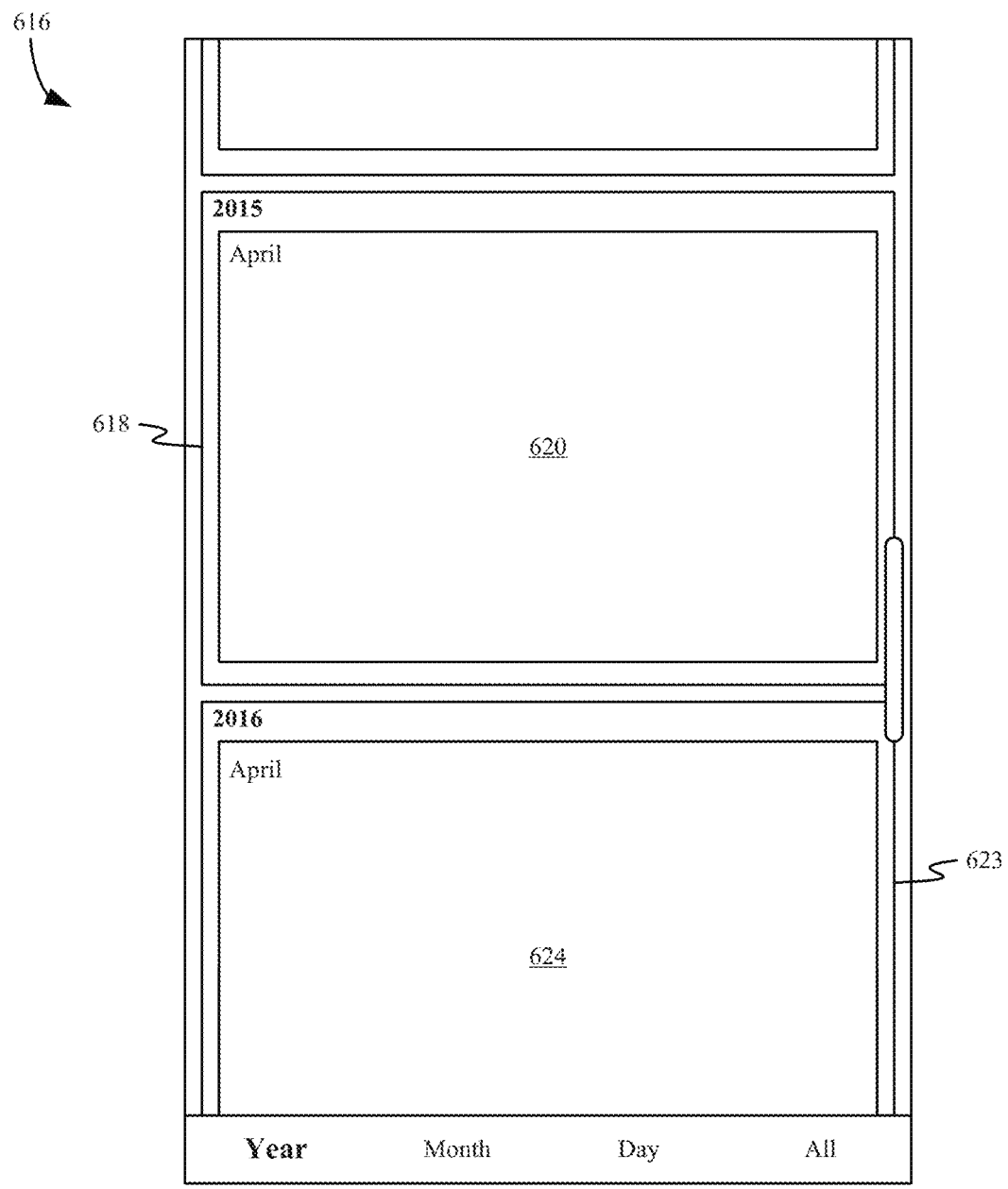
FIG. 6B shows another example year view for the media library application.

FIG. 6B shows another example year view 616 for the media library application. In year view 616, each year is represented by a single year card with a single key asset prominently displayed to the year card. For example, year card 618 for 2015 displays a key asset 620 for April of that year, 2015, while year card 622 for 2016 displays a key asset 624 for April of that year, 2016. In this example, the key assets 620, 624 are both selected from the month of April in response to a present date being in April, so that each year card 618, 622 show key assets from similar time frames in past years 2015, 2016.

In another approach, even when year view 616 displays a single asset for each year, the assets selected to be displayed may be from different time periods within the respective years.

Transitions

Figure 7:
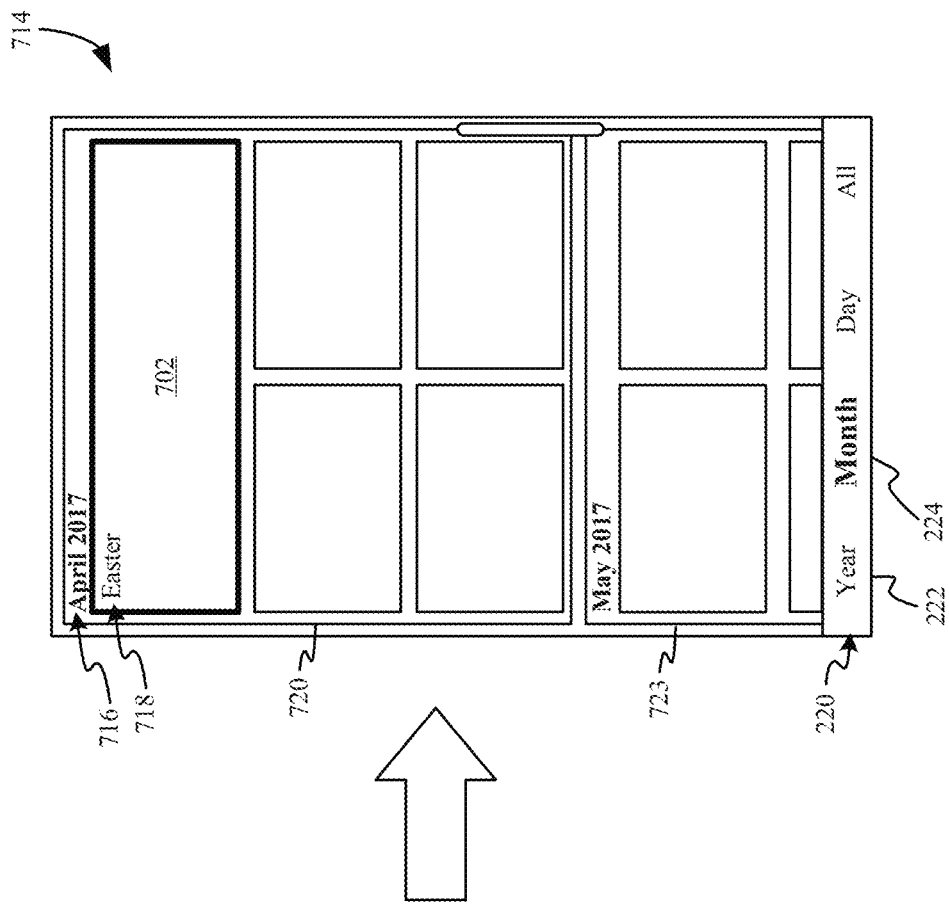
FIG. 7 shows an example transition from a year view to a month view.
Figure 7:
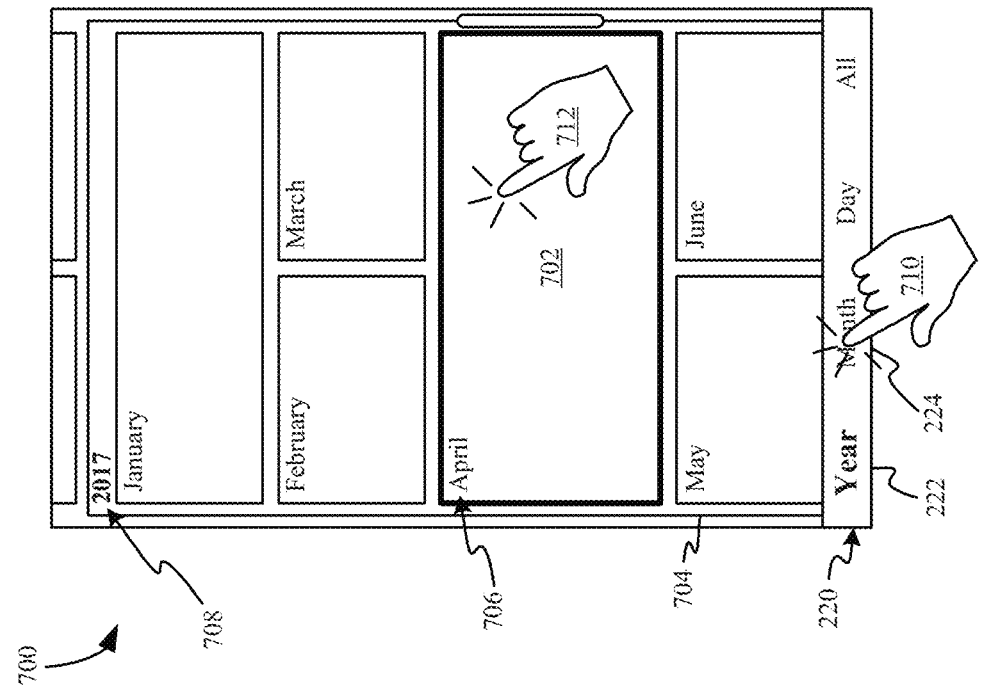

FIG. 7 shows an example transition from a year view 700 to a month view 714. In this example, year view 700 displays year card 704 for 2017 and indicates that a current view is a year view by highlighting Year label 222 on ribbon element 220. Key assets from select months are represented on year card 704. In addition, a timeframe reference 708 is included for year card 704 that indicates the card is for the year "2017." Each of the key assets for the various months are indicated with contextual descriptions 706 indicating which month the key asset represents.

Moreover, as shown in year view 700, key asset 702 is the focus of the view, as indicated by the bold frame surrounding the asset. Any other way of indicating the focus of the view 700, including not visually indicating a focus at all, may be used as would be understood by one of skill in the art. Key asset 702 may be selected as the focus in response to user input 712 selecting key asset 702, or some other way of determining a focus of a current view, such as determining that an asset located near a center of a current view is the focus, in one approach. Any other way of determining a focus of a current view may be used in more approaches, as would be understood by one of skill in the art.

In one approach, a user may select Month label 224 from ribbon element 220 with user input 710. Any type of user input 710 may be used to select Month label 224, such as a mouse hover, mouse click, touch input on a touchscreen display, stylus input on a tablet, remote control, trackpad input on a laptop computer, etc. In response to user input selecting Month label 224, the GUI may transition to month view 714 that maintains focus on key asset 702.

In another approach, a user may select a key asset 702 from year card 704 with a user input 712. Any type of user input 712 may be used to select key asset 702, such as a mouse hover, mouse click, touch input on a touchscreen display, stylus input on a tablet, remote control, trackpad input on a laptop computer, etc. In response to user input selecting key asset 702, the GUI may transition to month view 714 that maintains a focus on key asset 702.

By maintaining focus on a particular asset, what is meant, in an example, is that after transitioning to a new view, the particular asset is prominently featured in the new view (e.g., the largest asset displayed, presented with a bold or highlighted frame, pre-selected when the view is loaded, etc.). In another example, the particular asset is displayed to the new view, but not necessarily prominently featured.

As shown in month view 714, in one example, month card 720 for April 2017 is shown, with the current view being indicated as a month view by highlighting Month label 224 on ribbon element 220. Select key assets are represented on month card 720, included key asset 702, which was the focus of year view 700. In addition, a timeframe reference 716 is included for month card 720 that indicates the card is for the month "April 2017." Also, a contextual description 718 is included for month card 720 that indicates the key asset 702 relates to "Easter." Month view 714 also displays a portion of the next month card 722 for May 2017.

This transition from year view 700 to month view 714 that maintains focus on key asset 702 provides a convenient way for a user to drill down through levels of the media library to arrive at photos, videos, and other assets from a specific period of time related to a key asset 702 prominently displayed at higher levels (e.g., year view 700). In this way, a user may access additional assets related to key asset 702 and/or other assets obtained at a time frame similar to key asset 702 based on interaction with higher levels of the media library that display key asset 702.

Figure 8:
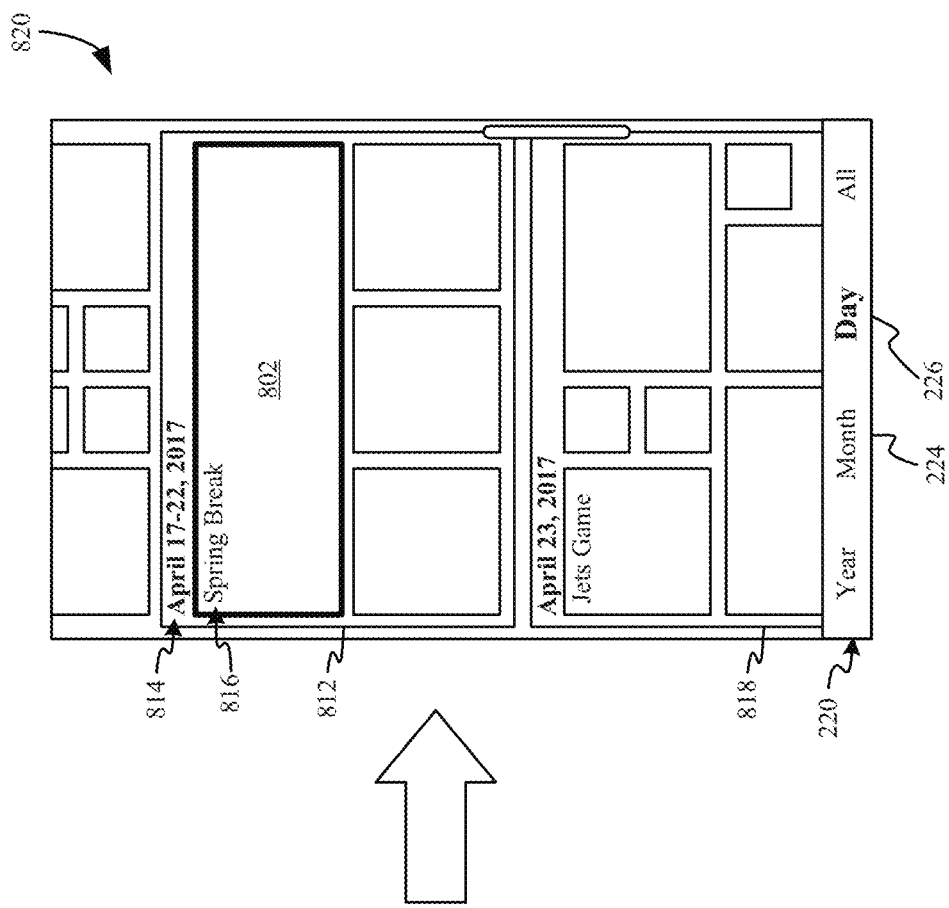
FIG. 8 shows an example transition from a month view to a day view.
Figure 8:
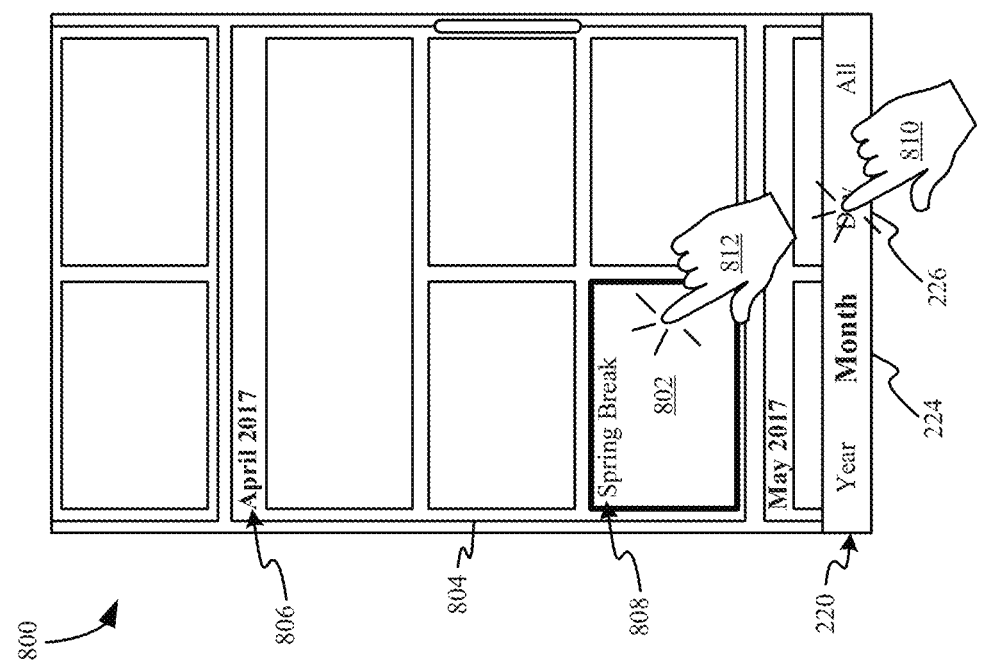

FIG. 8 shows an example transition from a month view 800 to a day view 820. In this example, month view 800 displays month card 804 for 2017 and indicates that a current view is a month view by highlighting Month label 224 on ribbon element 220. Key assets from April 2017 are represented on month card 804. In addition, a timeframe reference 806 is included for month card 804 that indicates the card is for the month "April 2017." One of the key assets 802 for April 2017 is indicated with a contextual description 808 indicating that the key asset 802 is related to "Spring Break."

Moreover, as shown in month view 800, key asset 802 is the focus of the view, as indicated by the bold frame surrounding the asset. Key asset 802 may be selected as the focus in response to user input 812 selecting key asset 802, or some other way of determining a focus of a current view, such as determining that an asset located near a center of a current view is the focus, in one approach. Any other way of determining a focus of a current view may be used in more approaches, as would be understood by one of skill in the art.

In one approach, a user may select Day label 226 from ribbon element 220 with user input 810. Any type of user input 810 may be used to select Day label 226 such as a mouse hover, mouse click, touch input on a touchscreen display, stylus input on a tablet, remote control, trackpad input on a laptop computer, etc. In response to user input selecting Day label 226 the GUI may transition to day view 820 that maintains focus on key asset 802.

In another approach, a user may select key asset 802 from month card 804 with a user input 812. Any type of user input 812 may be used to select key asset 802, such as a mouse hover, mouse click, touch input on a touchscreen display, stylus input on a tablet, remote control, trackpad input on a laptop computer, etc. In response to user input selecting key asset 802, the GUI may transition to day view 820 that maintains a focus on key asset 802.

As shown in day view 820, in one example, aggregation card 812 for April 17-21, 2017 is shown, with the current view being indicated as a day view by highlighting Day label 226 on ribbon element 220. This aggregation card shows a trip that spanned several consecutive days, in this particular case it was Spring Break in 2017. Select key assets are represented on aggregation card 812, including key asset 802, which was the focus of month view 800. In addition, a timeframe reference 814 is included for aggregation card 812 that indicates the card is for multiple consecutive days of "Apr. 17-21, 2017." Also, a contextual description 816 is included for aggregation card 812 that indicates the key asset 802 and/or aggregation card 812 relate to "Spring Break." Day view 820 also displays a portion of the next day card 818 for Apr. 22, 2017. In day card 818, one of the key assets is indicated as being related to a "Jets Game" which may have taken place on Apr. 22, 2017.

This transition from month view 800 to day view 820 that maintains focus on key asset 802 provides a convenient way for a user to drill down through levels of the media library to arrive at photos, videos, and other assets from a specific period of time related to a key asset 802 prominently displayed at higher levels (e.g., month view 800). In this way, a user may access additional assets related to key asset 802 and/or other assets obtained at a time frame similar to key asset 802 based on interaction with higher levels of the media library that display key asset 802.

Figure 9:
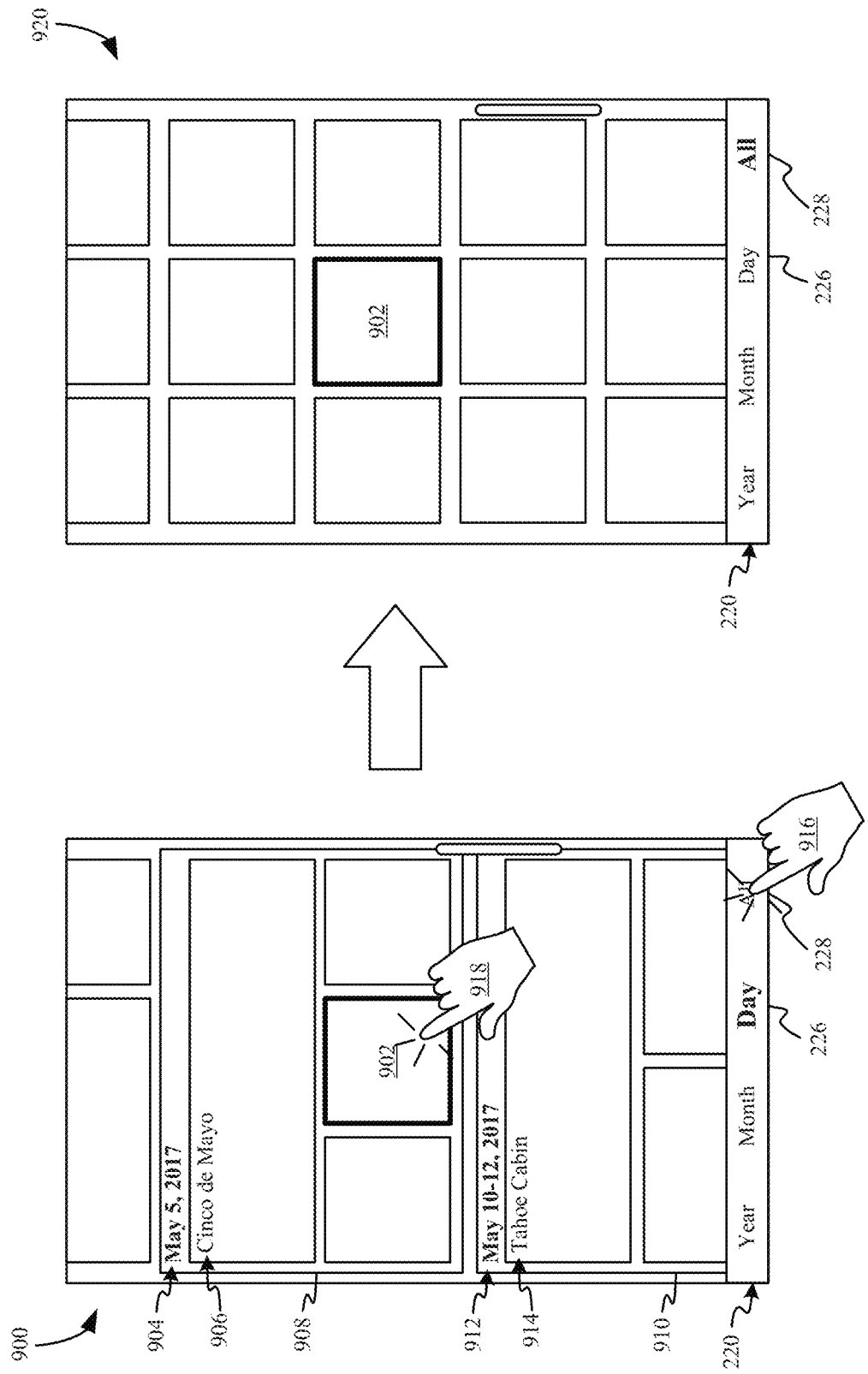
FIG. 9 shows an example transition from a day view to an all assets view.

FIG. 9 shows an example transition from a day view 900 to an all assets view 920. In this example, day view 900 displays day card 908 for May 5, 2017 and indicates that a current view is a day view by highlighting Day label 226 on ribbon element 220. Curated assets from May 5 are represented on the day card 908. In addition, a timeframe reference 904 is included for day card 908 that indicates the card is for "May 5, 2017." A largest curated asset for this day is indicated with a contextual description 906 indicating that the curated assets are related to "Cinco de Mayo."

Day view 900 also displays an aggregation card 910 following day card 900, with a timeframe reference 912 indicating the aggregation period is "May 10-12, 2017" and a contextual description 914 indicates this time frame related to "Tahoe Cabin," most likely a trip to Lake Tahoe, Calif. where the user stayed at a cabin by the lake.

Moreover, as shown in day view 900, curated asset 902 is the focus of the view, as indicated by the bold frame surrounding the asset. Curated asset 902 may be selected as the focus in response to user input 918 selecting curated asset 902, or some other way of determining a focus of a current view, such as determining that an asset located near a center of a current view is the focus, in one approach. Any other way of determining a focus of a current view may be used in more approaches, as would be understood by one of skill in the art.

In one approach, a user may select All label 228 from ribbon element 220 with user input 916. Any type of user input 916 may be used to select All label 228, such as a mouse hover, mouse click, touch input on a touchscreen display, stylus input on a tablet, remote control, trackpad input on a laptop computer, etc. In response to user input selecting All label 228, the GUI may transition to all assets view 920 that maintains focus on curated asset 902.

In another approach, a user may select curated asset 902 from day card 908 with user input 918. Any type of user input 918 may be used to select curated asset 902, such as a mouse hover, mouse click, touch input on a touchscreen display, stylus input on a tablet, remote control, trackpad input on a laptop computer, etc. In response to user input selecting curated asset 902, the GUI may transition to all assets view 920 that maintains a focus on curated asset 902.

By maintaining focus on a particular asset, all assets view 920 is scrolled to a location showing the particular asset after the transition to the new view. As shown in all assets view 920, in one example, curated asset 902 is shown in a center of the display, and ribbon element 220 shows that the current view is all assets view 920 by highlighting All label 228 and no longer highlighting Day label 226.

All assets view 920 displays every asset of the media library in a first order, including assets that were filtered out of higher level views (e.g., day views, month views, year views) due to such assets including undesirable content, such as being blurry or out of focus, being directed to a utility purpose (photos of receipts, data and information, whiteboards, drawings and sketches, shopping lists, reminder lists, screenshots, etc.), being substantially duplicative of other curated assets promoted to the higher level views, etc. In one approach, the first order is chronological, which displays assets according to dates associated with each asset (e.g., a capture date, last modified date, creation date, date from metadata, etc.). In other approaches, the first order may include alphabetical ordering (A-Z or Z-A), frequency of access ordering (most accessed displayed first, least accessed displayed last, or vice versa), an ordering based on determined curation scores (as described in more detail later), an ordering based on determined aesthetic scores (as described in more detail later), etc., or some combination of ordering types.

This transition from day view 900 to all assets view 920 that maintains focus on curated asset 902 provides a convenient way for a user to drill down through levels of the media library to arrive at photos, videos, and other assets from a specific period of time related to a key asset 902 prominently displayed at higher levels (e.g., day view 900).

In this way, a user may access additional assets related to key asset 902 and/or other assets obtained at a time frame similar to key asset 902 based on interaction with higher levels of the media library that display key asset 902, particularly if such assets are only displayed in all assets view 920 due to content included therein. However, a user does not need to scroll through junk images and videos, blurry images or videos, utility pictures or videos, and/or duplicated images or videos at higher levels of the media library because such assets are only displayed in all assets view 920 in an approach.

FIGS. 10A-10D show example all assets views of the media library application. Each of the example all assets views includes a different number of columns for displaying assets therein.

Figure 10A:
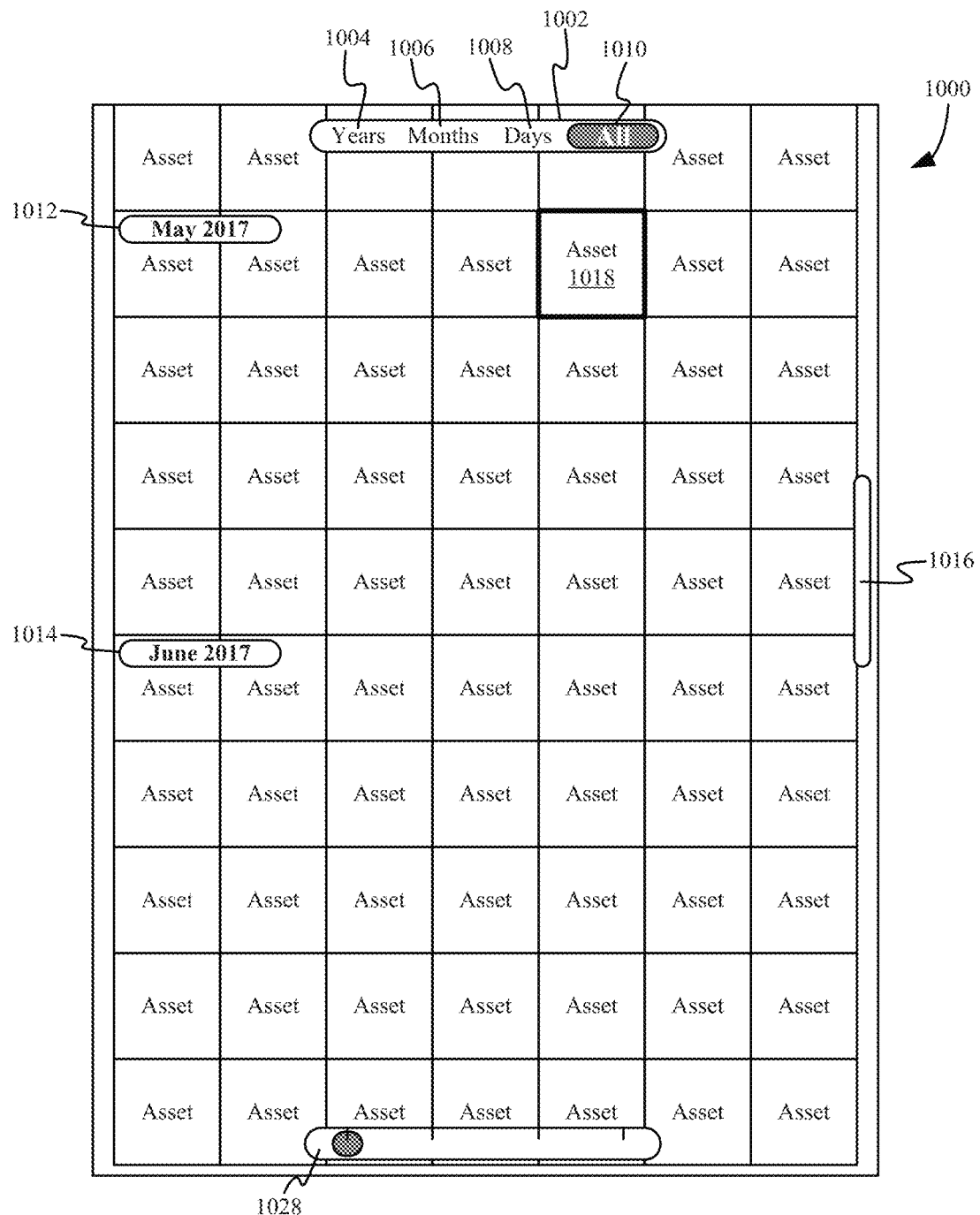
FIGS. 10A-10D show example all assets views of the media library application.

In FIG. 10A, an all assets view 1000 is shown with seven columns for placement of assets therein in one example. This view 1000 shows the assets placed very close together with minimal or no border or spacing between the individual assets. However, in some approaches, small borders or spacing may surround each of the assets to make it easier to distinguish the boundaries of the individual assets.

All assets view 1000 represents a first zoom level, which is designed to show many assets from the media library displayed in a first order. In addition, timeframe references 1012, 1014 may indicate a relative timeframe from where the displayed assets originated or represent. Timeframe reference 1012 indicates that the assets positioned below the reference 1012 relate to May 2017, while timeframe reference 1014 indicates that assets positioned below the reference 1014 relate to June 2017. Each asset from the media library shown in view 1000 may be sorted in a chronological order, in one approach. In more approaches, the first order may include other methods of sorting the assets that may be employed in conjunction with or in place of the chronological order, such as alphabetically by name or title, by size, by curation score (as described later), by aesthetic score (as described later), etc. In addition, a scroll bar 1016 may be provided to allow a user to scroll through the plurality of assets that are displayed in all assets view 1000, in an example. However, any type of mechanism that is able to navigate through the plurality of assets quickly and intuitively may be used, such as finger dragging on a touchscreen, up and down soft or hard key input, etc.

A navigation element 1002 may also be shown in view 1000 in an example, which may be positioned at or near a top of the view 1000 (as shown), or in any other position of the view 1000 (e.g., a bottom, side, corner, etc.). Navigation element 1002 may be a rectangle with rounded corners (as shown) or take any other shape capable of displaying the various views available to navigate to, as would be known in the art, such as a circle, oval, rectangle, square, individual view buttons, radio buttons, etc. Moreover, navigation element 1002 may be completely opaque, semi-transparent, or almost completely transparent, in several approaches, to allow any assets positioned behind navigation element 1002 to be seen. In one approach, navigation element 1002 may be hidden from view, and in this approach, it may appear in response to a trigger, such as moving a cursor or finger near where navigation element 1002 is positioned, selection of a link to display navigation element 1002, etc.

In an example, navigation element 1002 may include a Years label 1004 that transitions the current view to a year view when selected, a Months label 1006 that transitions the current view to a month view when selected, a Days label 1008 that transitions the current view to a day view when selected, and the current or active view is indicated by the highlighted All label 1010. Other views may be navigated to using navigation element 1002 in other examples, and as would be known to one of skill in the art.

Any type of highlighting may be used to denote an active label, such as bold lettering, enlarged lettering, italicized lettering, a different background color surrounding the current label, different coloring for the current label, etc. Moreover, any name or image may be used to represent the different levels of the media library that are represented by the various labels, as would be appropriate for the specific labels chosen to navigate through the media library.

In all assets view 1000, each of the assets is shown having substantially the same size and a square aspect ratio, regardless of the type of asset in one approach. By substantially equal, what is meant is that each asset which is larger than the common cell size is scaled down to fit within the common cell of the all assets view 1000, while assets which are smaller than the common cell size are centered within the common cell for display. However, in other approaches, the assets may be displayed with a portrait aspect ratio, a landscape aspect ratio, or a mix of two or more aspect ratio types.

In an example, a user may zoom in or zoom out while in all assets view 1000 via a zoom input. A user may provide the zoom input to indicate a desired zoom level, such as by selecting one of a series of options (e.g., 10%, 25%, 50%, 75%, 90%, 100%, 150%, 250%, etc.), moving a slider icon on a slider bar, touch and drag input on a touchscreen display, a pinch gesture, a sliding gesture, a swiping gesture, etc. Zooming in increases a size of each asset, while zooming out decreases a size of each asset, with the increase or decrease being proportional to zoom input from the user in one approach.

In one embodiment, zoom levels displayed in all assets view 1000 may be dynamically generated based on the zoom input. In other words, there are no fixed zoom levels, and each zoom level may be generated in response to the zoom input, with the resulting all assets view 1000 being displayed at the dynamically-generated zoom level once the zoom input is completed. The zoom input in this embodiment may comprise moving a slider icon on a slider bar, touch and drag input on a touchscreen display, a pinch gesture, a sliding gesture, a swiping gesture, etc. Zooming in increases a size of each asset, while zooming out decreases a size of each asset, with the increase or decrease being proportional to the zoom input in one approach.

In one approach, the zoom input may be received as a click and drag input from a mouse, touch input, gesture on a touchscreen, or trackpad that manipulates a slider element 1028 that controls a zoom level for the display. In one approach, this slider element 1028 may include hash marks that denote each zoom level available for the all assets view of the media library.

Slider element 1028 may be positioned at or near a bottom of the view 1000 (as shown), or in any other position of the view 1000 (e.g., a top, side, corner, etc.). Slider element 1028 may be a rectangle with rounded corners (as shown) or take any other shape capable of displaying the various zoom levels available to zoom the current view, as would be known in the art, such as a circle, oval, rectangle, square, individual view buttons, radio buttons, etc. Moreover, slider element 1028 may be completely opaque, semi-transparent, or almost completely transparent, in several approaches, to allow any assets positioned behind slider element 1028 to be seen. In one approach, slider element 1028 may be hidden from view, and in this approach, it may appear in response to a trigger, such as moving a cursor or finger near where slider element 1028 would be shown, selection of a link to display slider element 1028, etc.

In another approach, some of the assets shown in the all assets view 1000 may have different sizes than other assets. The decision as to which assets to show more prominently (larger) may be based on several factors such as determination of key assets, as discussed in more detail later.

As shown, asset 1018 is the focus asset for all assets view 1000, and is indicated by the bold line surrounding asset 1018. Any other type of highlighting may be used, such as being brighter, larger, etc. The focus asset does not need to be highlighted, and in some approaches, it may be presented like all the other asset shown in all assets view 1000.

Figure 10B:
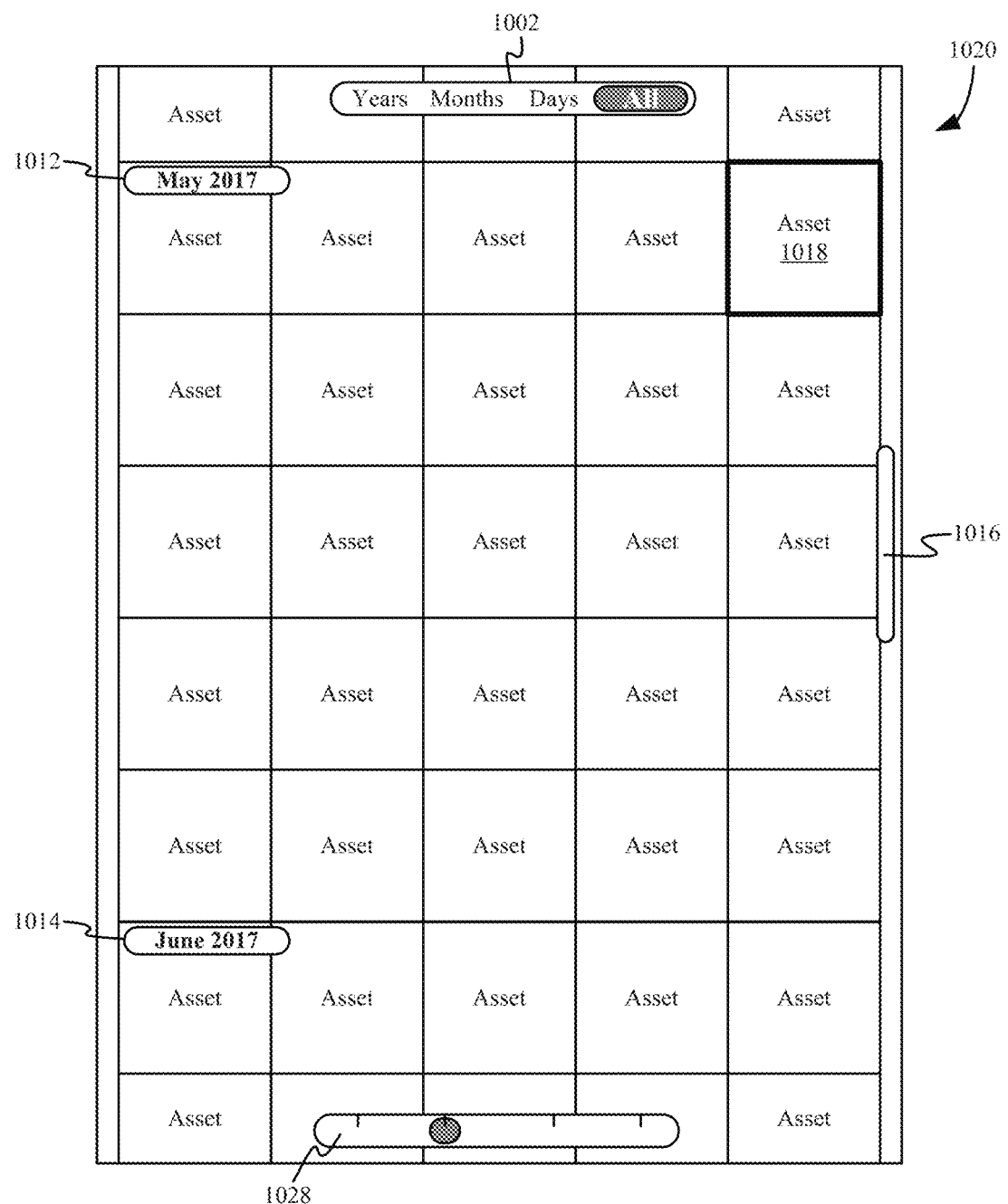

FIG. 10B shows an all assets view 1020 with five columns for placement of assets therein in one example. This view 1020 shows the assets placed very close together with minimal or no border or spacing between the individual assets. However, in some approaches, small borders or spacing may surround each of the assets to make it easier to distinguish the boundaries of the individual assets.

All assets view 1020 represents a second zoom level, which is designed to show less assets from the media library in a single display than the first zoom level. Timeframe reference 1012 indicates that the assets positioned below the reference 1012 relate to May 2017, while timeframe reference 1014 indicates that assets positioned below the reference 1014 relate to June 2017.

Focus asset 1018 is shown in the fifth column of the first row of May 2017 at an edge of the view, and the assets for May 2017 extend for five rows. When assets from the media library shown in view 1022 are sorted in chronological order, the position of the assets may shift relative to previous all assets views shown in FIG. 10A to account for the beginning of the month. For example, all assets view 1000 in FIG. 10A displays focus asset 1018 in the fifth column, but two columns from the edge of the view 1000. Also, May 2017 only extends for four rows.

Referring again to FIG. 10B, all assets view 1020 may include navigation element 1002 in an example, to provide navigation to other view types. In addition, a scroll bar 1016 may be provided to allow a user to scroll through the plurality of assets that are displayed in all assets view 1020, in an example. However, any type of mechanism that is able to navigate through the plurality of assets quickly and intuitively may be used, such as finger dragging on a touchscreen, up and down soft or hard key input, etc.

In one approach, a slider element 1028 that controls a zoom level for the display may be included in all assets view 1020. In one approach, this slider element 1028 may include hash marks that denote each zoom level available for the all assets view of the media library.

Figure 10C:
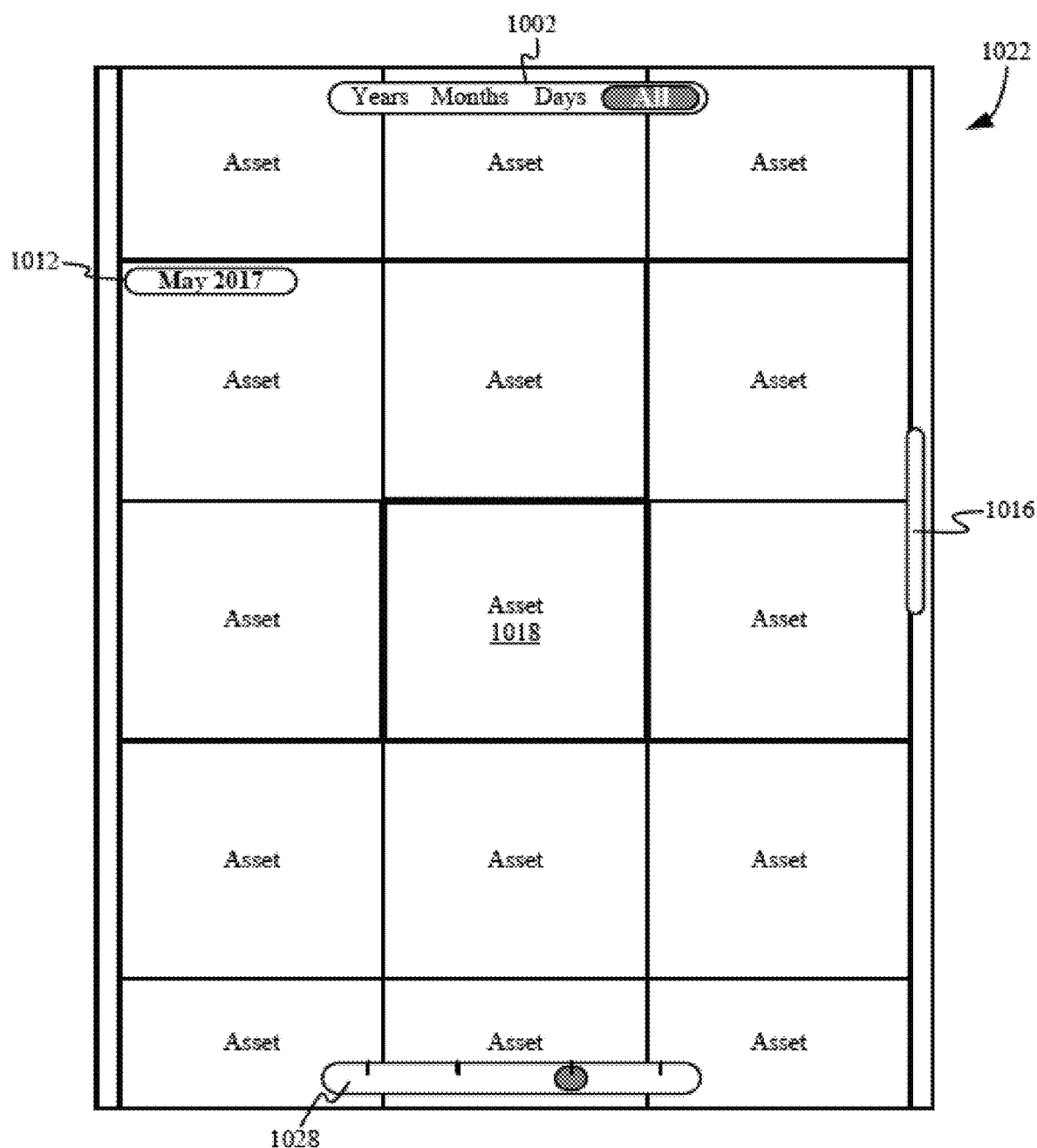

FIG. 10C shows an all assets view 1022 with three columns for placement of assets therein in one example. This view 1022 shows the assets placed very close together with minimal or no border or spacing between the individual assets. However, in some approaches, small borders or spacing may surround each of the assets to make it easier to distinguish the boundaries of the individual assets.

All assets view 1022 represents a third zoom level, which is designed to show less assets from the media library in a single display than the second zoom level. Timeframe reference 1012 indicates that the assets positioned below the reference 1012 relate to May 2017.

Focus asset 1018 is shown in the second column of the second row of May 2017 in the middle of the view, and the assets for May 2017 extend beyond the assets viewable in all assets view 1022. When assets from the media library shown in view 1022 are sorted in chronological order, the position of the assets may shift relative to previous all assets views shown in FIGS. 10A-10B to account for the beginning of the month. For example, all assets view 1000 in FIG. 10A displays focus asset 1018 in the fifth column, but two columns from the edge of the view 1000. Also, May 2017 only extends for four rows. In FIG. 10B, focus asset 1018 is shown in the fifth column of the first row of May 2017 at an edge of the view 1020, and the assets for May 2017 extend for five rows.

Referring again to FIG. 10C, all assets view 1022 may include navigation element 1002 in an example, to provide navigation to other view types. In addition, a scroll bar 1016 may be provided to allow a user to scroll through the plurality of assets that are displayed in all assets view 1022, in an example. However, any type of mechanism that is able to navigate through the plurality of assets quickly and intuitively may be used, such as finger dragging on a touchscreen, up and down soft or hard key input, etc.

In one approach, a slider element 1028 that controls a zoom level for the display may be included in all assets view 1022. In one approach, this slider element 1028 may include hash marks that denote each zoom level available for the all assets view of the media library. However, zoom input may seamlessly transition from any starting zoom level to any ending zoom level without stopping at or displaying any zoom levels positioned therebetween, even if hash marks denote such intermediate zoom levels.

Figure 10D:
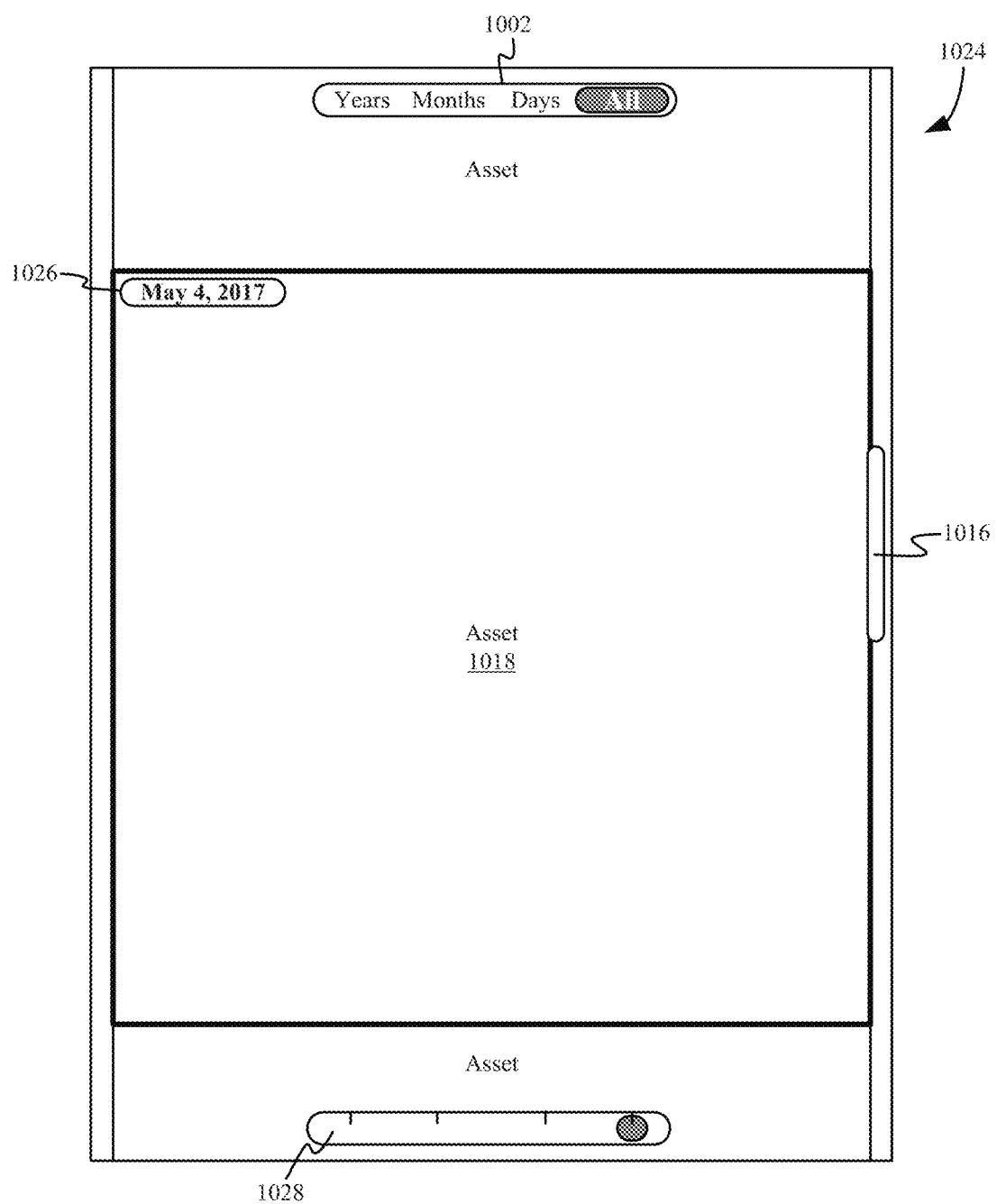

FIG. 10D shows an all assets view 1024 with a single column for placement of assets therein in one example. This view 1024 shows the assets placed very close together with minimal or no border or spacing between the individual assets. However, in some approaches, small borders or spacing may surround each of the assets to make it easier to distinguish the boundaries of the individual assets.

All assets view 1024 represents a fourth zoom level, which is designed to show a single asset from the media library. Timeframe reference 1026 indicates that the asset shown, focus asset 1018, relates to May 4, 2017. Focus asset 1018 is centered vertically and horizontally in view 1024, with preceding assets positioned above focus asset 1018, and succeeding assets positioned below focus asset 1018.

All assets view 1024 may include navigation element 1002 in an example, to provide navigation to other view types. In addition, a scroll bar 1016 may be provided to allow a user to scroll through the plurality of assets that are displayed in all assets view 1024, in an example. However, any type of mechanism that is able to navigate through the plurality of assets quickly and intuitively may be used, such as finger dragging on a touchscreen, up and down soft or hard key input, etc.

In one approach, a slider element 1028 that controls a zoom level for the display may be included in all assets view 1024. In one approach, this slider element 1028 may include hash marks that denote each zoom level available for the all assets view of the media library.

Although odd numbers of columns are shown in the views described in FIGS. 10A-10D, any number of columns may be used in an all assets view, to minimize empty spaces and maximize the ability to display assets for interaction with by a user of the media library. Moreover, although four zoom levels are described and shown in FIGS. 10A-10D, any number of zoom levels may be possible in an all assets view that displays each and every asset from the media library for interaction with by the user.

Moreover, a user may provide zoom input that seamlessly switches an all assets view from a lowest zoom level to a highest zoom level, or vice versa, without needing to stop at any zoom levels between the starting zoom level and the ending zoom level. In other words, the user may provide zoom input that seamlessly switches between a starting zoom level and an ending zoom level without stopping at, pausing at, or viewing any intermediate zoom levels that may exist between the starting zoom level and the ending zoom level.

Figure 11:
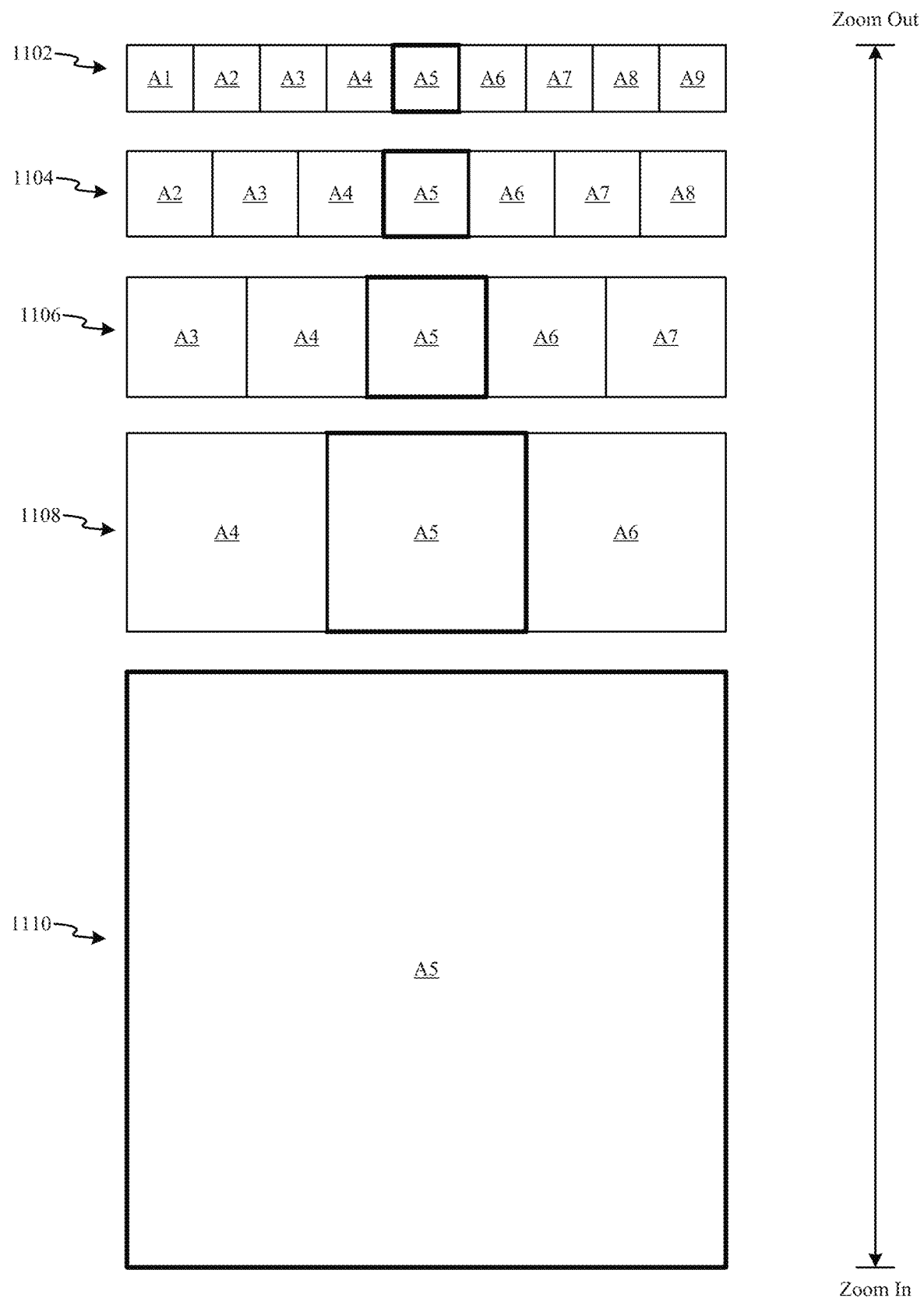
FIG. 11 shows example zoom levels for layouts of an all assets view of the media library application.

FIG. 11 shows example zoom levels for layouts of an all assets view of the media library application. A single row is shown for each zoom level, but it should be understood that multiple rows may be shown in each zoom level, provided that the rows are capable of fitting on the display of a computing device displaying the particular all assets view. In each zoom level, focus asset A5 is shown highlighted.

A first zoom level 1102 is represented as having nine columns, with assets A1-A9 being displayed in a single row of the first zoom level 1102. In response to receiving a zoom input zooming in on focus asset A5, a second zoom level 1104 may be shown having seven columns. The second zoom level 1104 displays assets A2-A8, with focus asset A5 still being centered. In response to receiving another zoom input zooming in on focus asset A5, a third zoom level 1106 may be shown having five columns. The third zoom level 1106 displays assets A3-A7, with focus asset A5 still being centered. In response to receiving a zoom input zooming in on focus asset A5 again, a fourth zoom level 1108 may be shown having three columns. The fourth zoom level 1108 displays assets A4-A6, with focus asset A5 still being centered. In response to receiving yet another zoom input zooming in on focus asset A5, a fifth zoom level 1110 may be shown having a single column. The fifth zoom level 1110 displays only focus asset A5. When moving downward through the various zoom levels, the assets displayed are zoomed in and made larger, while moving upward through the various zoom levels causes the assets to be zoomed out and made smaller.

Any of the zoom levels may be navigated up to from a lower zoom level in response to receiving a zoom input zooming out to show more assets than are currently being displayed. For example, starting with the fourth zoom level 1108, a zoom input zooming out may cause display of any of the third zoom level 1106, second zoom level 1104, or first zoom level 1102, depending on an amount of zoom input received. In another example, starting with the second zoom level 1104, a zoom input zooming in may cause display of less assets than are currently being displayed, e.g., any of the third zoom level 1106, fourth zoom level 1108, or fifth zoom level 1110, depending on an amount of zoom input received.

In one approach, assets shown in more dense zoom levels (e.g., zoom level 1102, zoom level 1104) may be displayed at lower resolution than assets shown in less dense zoom levels (e.g., zoom level 1108, zoom level 1110) which may be displayed at a higher resolution. This helps to increase the speed at which assets in the media library may be scrolled through, loading times for each new view, bandwidth and delay needed to retrieve assets from a remote or cloud server, etc.

Figure 12A:
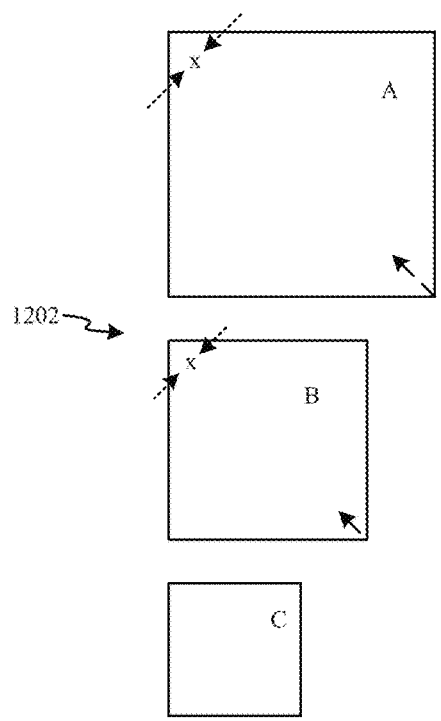
FIGS. 12A-12D show example zoom-out actions taken in response to different input locations within cells of the media library application.

FIGS. 12A-12D show example zoom-out actions taken in response to different input locations within cells of the media library application. In FIG. 12A, cells A, B, and C are shown, which represent a single cell that becomes progressively smaller in response to applying a zoom-out action 1202 to the cell.

Initially, as shown by cell A, a zoom input is received centered at point x in an upper left corner of cell A. For example, the zoom input may be a pinch gesture on a touchscreen display, and point x indicates a point equal distance from each touch contact on the touchscreen display. In other example, the zoom input may be a mouse click at point x in conjunction with wheel rotation or sliding motion that denotes an amount of zoom. In any implementation, the center (x) of the zoom input is used as an anchor point for changing the size of the cell as the zoom input is applied. In one example, zoom input may include a pinch gesture having multiple points of touch contact that move closer together (as indicated by the dashed lines centered on anchor point x) to zoom out from cell A.

Because the anchor point x for the zoom input is located at the upper left corner of cell A, zooming out may cause the lower right corner of cell A to be pulled inward toward the anchor point x to make cell A smaller, as shown by cell B. Continuing to apply a zoom input at anchor point x will cause additional shrinking of cell B, pulling inward from the bottom right corner of cell B to result in cell C.

Other cells that are positioned around cell A in a first view may shrink toward a center point of each cell, and then in a second view resulting from the zoom-in action 1202 terminating, each of these other cells will position themselves relative to cell C. Cell C will occupy a position as determined from how the zoom-out action 1202 causes shrinking of cell A, to cell B, to cell C, shifting upward and to the left.

Figure 12B:
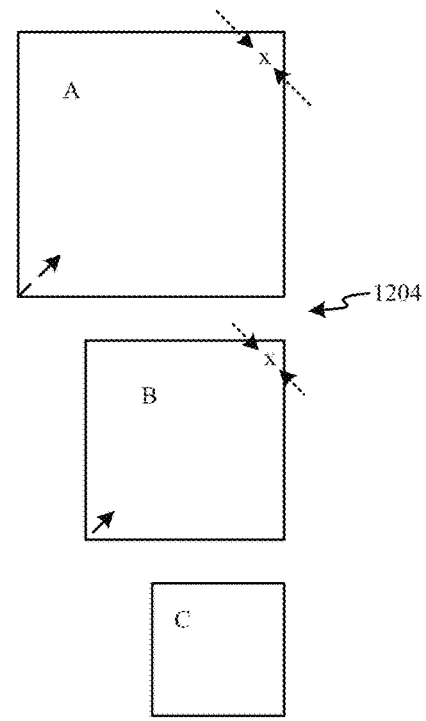

In FIG. 12B, cells A, B, and C are shown, which represent a single cell that becomes progressively smaller in response to applying a zoom-out action 1204 to the cell. Initially, as shown by cell A, a zoom input is received centered at point x in an upper right corner of cell A. The center (x) of the zoom input is used as an anchor point for changing the size of the cell as the zoom input is applied. In one example, zoom input may include a pinch gesture having multiple points of touch contact that move closer together (as indicated by the dashed lines centered on anchor point x) to zoom out from cell A.

Because the anchor point x for the zoom input is located at the upper right corner of cell A, zooming out may cause the lower left corner of cell A to be pulled inward toward the anchor point x to make cell A smaller, as shown by cell B. Continuing to apply a zoom input at anchor point x will cause additional shrinking of cell B, pulling inward from the bottom left corner of cell B to result in cell C.

Other cells that are positioned around cell A in a first view may shrink toward a center point of each cell, and then in a second view resulting from the zoom-out action 1204 terminating, each of these other cells will position themselves relative to cell C. Cell C will occupy a position as determined from how the zoom-in action 1204 causes shrinking of cell A, to cell B, to cell C, shifting upward and to the right.

Figure 12C:
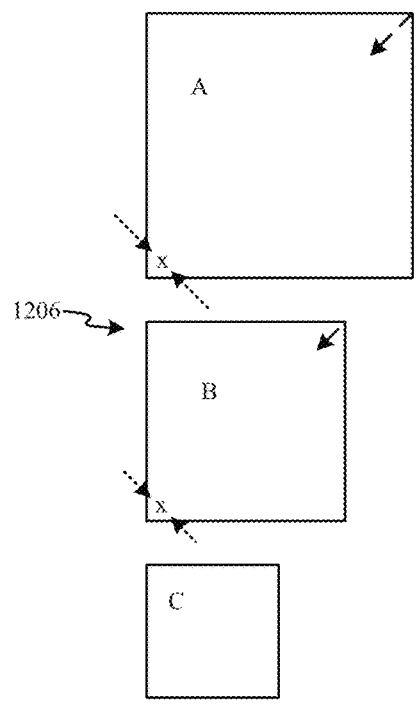

In FIG. 12C, cells A, B, and C are shown, which represent a single cell that becomes progressively smaller in response to applying a zoom-out action 1206 to the cell. Initially, as shown by cell A, a zoom input is received centered at point x in a lower left corner of cell A. The center (x) of the zoom input is used as an anchor point for changing the size of the cell as the zoom input is applied. In one example, zoom input may include a pinch gesture having multiple points of touch contact that move closer together (as indicated by the dashed lines centered on anchor point x) to zoom out from cell A.

Because the anchor point x for the zoom input is located at the lower left corner of cell A, zooming out may cause the upper right corner of cell A to be pulled inward toward the anchor point x to make cell A smaller, as shown by cell B. Continuing to apply a zoom input at anchor point x will cause additional shrinking of cell B, pulling inward from the upper right corner of cell B to result in cell C.

Other cells that are positioned around cell A in a first view may shrink toward a center point of each cell, and then in a second view resulting from the zoom-out action 1206 terminating, each of these other cells will position themselves relative to cell C. Cell C will occupy a position as determined from how the zoom-out action 1206 causes shrinking of cell A, to cell B, to cell C, shifting downward and to the left.

Figure 12D:
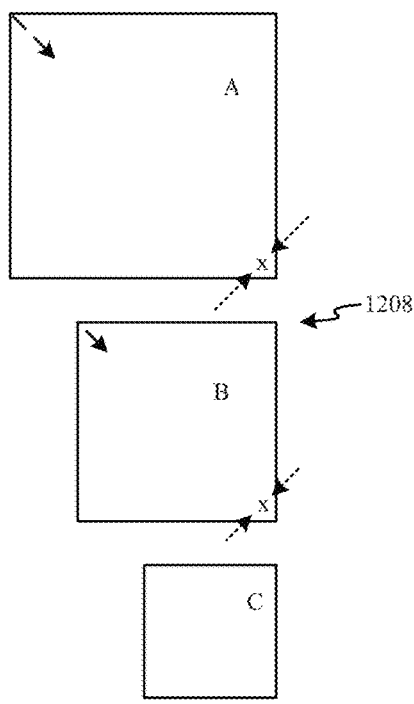

In FIG. 12D, cells A, B, and C are shown, which represent a single cell that becomes progressively smaller in response to applying a zoom-out action 1208 to the cell. Initially, as shown by cell A, a zoom input is received centered at point x in a lower right corner of cell A. The center (x) of the zoom input is used as an anchor point for changing the size of the cell as the zoom input is applied. In one example, zoom input may include a pinch gesture having multiple points of touch contact that move closer together (as indicated by the dashed lines centered on anchor point x) to zoom out from cell A.

Because the anchor point x for the zoom input is located at the lower right corner of cell A, zooming out may cause the upper left corner of cell A to be pulled inward toward the anchor point x to make cell A smaller, as shown by cell B. Continuing to apply a zoom input at anchor point x will cause additional shrinking of cell B, pulling inward from the upper left corner of cell B to result in cell C.

Other cells that are positioned around cell A in a first view may shrink toward a center point of each cell, and then in a second view resulting from the zoom-out action 1208 terminating, each of these other cells will position themselves relative to cell C. Cell C will occupy a position as determined from how the zoom-out action 1208 causes shrinking of cell A, to cell B, to cell C, shifting downward and to the right.

Figure 13A:
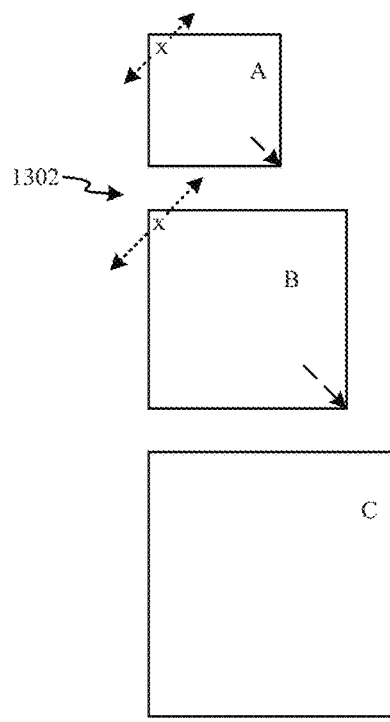
FIGS. 13A-13D show example zoom-in actions taken in response to different input locations within cells of the media library application.

FIGS. 13A-13D show example zoom-in actions taken in response to different input locations within cells of the media library application. In FIG. 13A, cells A, B, and C are shown, which represent a single cell that becomes progressively larger in response to applying a zoom-in action 1302 to the cell.

Initially, as shown by cell A, a zoom input is received centered at point x in an upper left corner of cell A. The center (x) of the zoom input is used as an anchor point for changing the size of the cell as the zoom input is applied. In one example, zoom input may include a pinch gesture having multiple points of touch contact that move farther apart (as indicated by the dashed lines extending from anchor point x) to zoom in on cell A.

Because the anchor point x for the zoom input is located at the upper left corner of cell A, zooming in may cause the lower right corner of cell A to be pushed outward from the anchor point x, as shown by cell B. Additionally applying zoom input at anchor point x will cause additional expansion of cell B, pushing outward through the bottom right corner of cell B to result in cell C.

Other cells that are positioned around cell A in a first view may expand outward from a center point of each cell, and then in a second view resulting from the zoom-in action 1302 terminating, each of these other cells will position themselves relative to cell C. Cell C will occupy a position as determined from how the zoom-in action 1302 causes expansion of cell A, to cell B, to cell C, shifting downward and to the right.

Figure 13B:
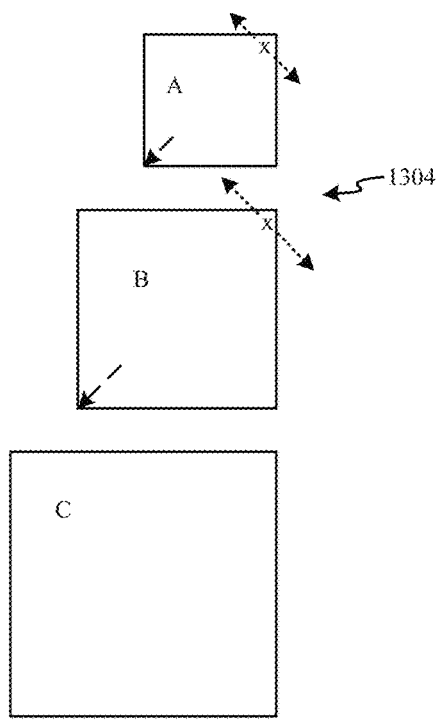

In FIG. 13B, cells A, B, and C are shown, which represent a single cell that becomes progressively larger in response to applying a zoom-in action 1304 to the cell. Initially, as shown by cell A, a zoom input is received centered at point x in an upper right corner of cell A. The center (x) of the zoom input is used as an anchor point for changing the size of the cell as the zoom input is applied. In one example, zoom input may include a pinch gesture having multiple points of touch contact that move farther apart (as indicated by the dashed lines extending from anchor point x) to zoom in on cell A.

Because the anchor point x for the zoom input is located at the upper right corner of cell A, zooming in may cause the lower left corner of cell A to be pushed outward from the anchor point x, as shown by cell B. Additionally applying zoom input at anchor point x will cause additional expansion of cell B, pushing outward through the bottom left corner of cell B to result in cell C.

Other cells that are positioned around cell A in a first view may expand outward from a center point of each cell, and then in a second view resulting from the zoom-in action 1304 terminating, each of these other cells will position themselves relative to cell C. Cell C will occupy a position as determined from how the zoom-in action 1304 causes expansion of cell A, to cell B, to cell C, shifting downward and to the left.

Figure 13C:
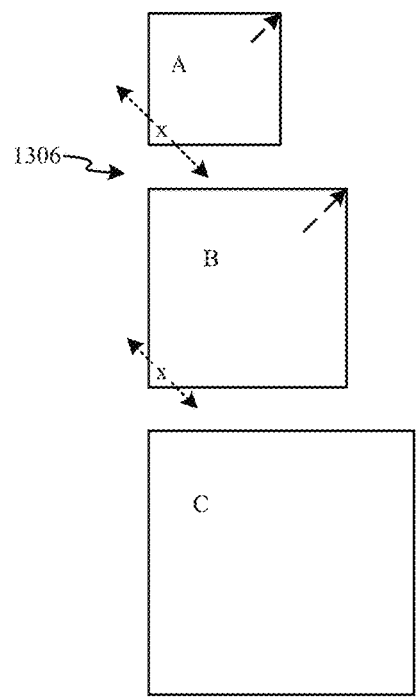

In FIG. 13C, cells A, B, and C are shown, which represent a single cell that becomes progressively larger in response to applying a zoom-in action 1306 to the cell. Initially, as shown by cell A, a zoom input is received centered at point x in a lower left corner of cell A. The center (x) of the zoom input is used as an anchor point for changing the size of the cell as the zoom input is applied. In one example, zoom input may include a pinch gesture having multiple points of touch contact that move farther apart (as indicated by the dashed lines extending from anchor point x) to zoom in on cell A.

Because the anchor point x for the zoom input is located at the lower left corner of cell A, zooming in may cause the upper right corner of cell A to be pushed outward from the anchor point x, as shown by cell B. Additionally applying zoom input at anchor point x will cause additional expansion of cell B, pushing outward through the upper right corner of cell B to result in cell C.

Other cells that are positioned around cell A in a first view may expand outward from a center point of each cell, and then in a second view resulting from the zoom-in action 1306 terminating, each of these other cells will position themselves relative to cell C. Cell C will occupy a position as determined from how the zoom-in action 1306 causes expansion of cell A, to cell B, to cell C, shifting upward and to the right.

Figure 13D:
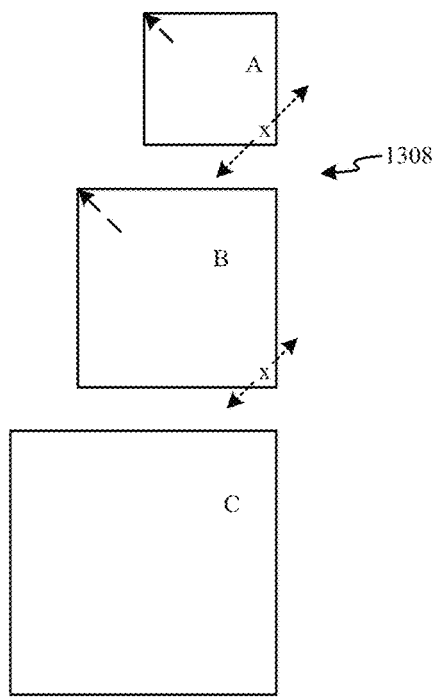

In FIG. 13D, cells A, B, and C are shown, which represent a single cell that becomes progressively larger in response to applying a zoom-in action 1308 to the cell. Initially, as shown by cell A, a zoom input is received centered at point x in a lower right corner of cell A. The center (x) of the zoom input is used as an anchor point for changing the size of the cell as the zoom input is applied. In one example, zoom input may include a pinch gesture having multiple points of touch contact that move farther apart (as indicated by the dashed lines extending from anchor point x) to zoom in on cell A.

Because the anchor point x for the zoom input is located at the lower right corner of cell A, zooming in may cause the upper left corner of cell A to be pushed outward from the anchor point x, as shown by cell B. Additionally applying zoom input at anchor point x will cause additional expansion of cell B, pushing outward through the upper left corner of cell B to result in cell C.

Other cells that are positioned around cell A in a first view may expand outward from a center point of each cell, and then in a second view resulting from the zoom-in action 1308 terminating, each of these other cells will position themselves relative to cell C. Cell C will occupy a position as determined from how the zoom-in action 1308 causes expansion of cell A, to cell B, to cell C, shifting upward and to the left.

Although an entire view that has many cells arranged in columns and rows are not shown in FIGS. 12A-12D and 13A-13D, one of skill in the art would appreciate that the cells shown may be located at any position within a particular view, e.g., at a top, a bottom, a side, etc. The expansion or contraction of the focus asset within a cell in relation to the anchor point may cause shifting of the other cells in the view in numerous different ways, and is not meant to be limited by the descriptions provided herein.

Figure 14:
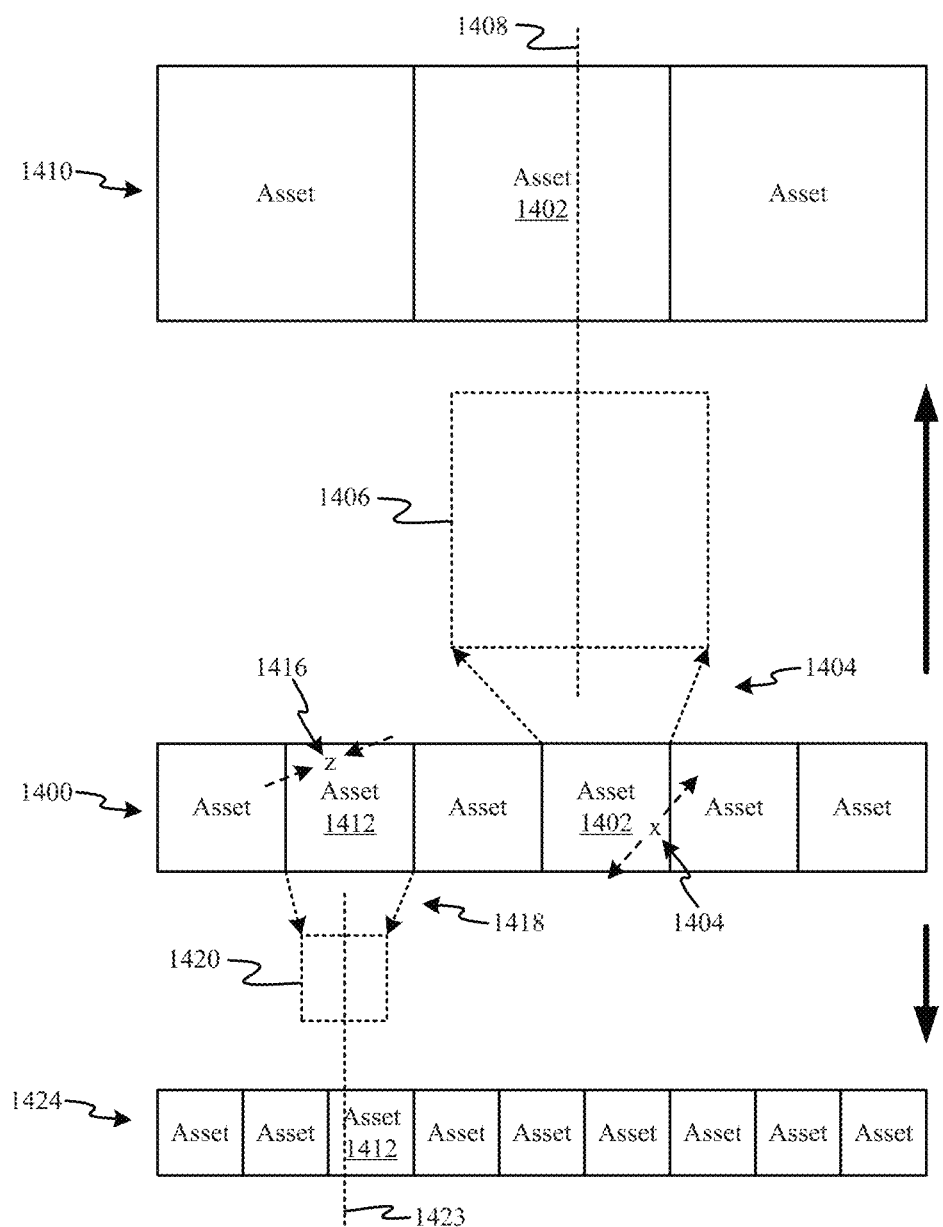
FIG. 14 shows example transitions between zoom levels for a single row in the all assets view of the media library application.

FIG. 14 shows example transitions between zoom levels for a single row 1400 of a grid in the all assets view of the media library application. Only a single row is shown from each of the grids in order to reduce confusion in the descriptions of the transitions, but it is understood that each row may have rows above and rows below in its corresponding grid. For example, row 1400 may be presented in a 9×6 grid (9 rows and 6 columns), contracted row 1424 may be presented in a 16×9 grid (16 rows and 9 columns), and expanded row 1410 may be presented in a 4×3 grid (4 rows and 3 columns). Of course, the actual display area of a display used to present the grids may be used to determine the size of a particular grid and individual cell sizes placed within the particular grid.

Example row 1400 includes six assets, but may include any number of assets displayed in cells of a certain size. Asset 1402 is chosen as the focus asset due to the zoom input 1404 being positioned within the cell which displays asset 1402. Zoom input 1404, centered at anchor point x, is a zoom-out action, and may cause the focus asset 1402 to expand to the size of intermediate cell 1406.

This intermediate cell 1406 is created because it is not always possible to place the resized focus asset 1402 into expanded row 1410 in a corresponding grid of cells at a position determined from the anchor point x of zoom input 1404 and amount of zoom applied. As shown, intermediate cell 1406 is positioned between two columns in expanded row 1410 of the corresponding grid. Therefore, intermediate cell 1406 is not actually positioned, in the horizontal direction, where focus asset 1402 will ultimately end up in the expanded row 1410 of its corresponding grid.

In one example, the position of the anchor point x may be used to determine how the intermediate cell 1406 expands, e.g., to the left and downward. Once intermediate cell 1406 is determined, a vertical centerline 1408 for intermediate cell 1406 is determined, and whichever cell in expanded row 1410 this vertical centerline 1408 intersects with is the cell chosen to place focus asset 1402. In this example, the cell that the vertical centerline 1408 intersects with is the middle cell. The other assets will then be distributed around focus asset 1402 in expanded row 1410 in accordance with a first order or sorting criteria, such as chronological, alphabetical, by curation score, by aesthetic score, etc.

As shown, row 1410 includes three assets, with focus asset 1402 positioned in a middle of the expanded row 1410. However, any number of cells may be included in the expanded row 1410 and other rows of its corresponding grid, as long as the cell sizes are larger than in row 1400.

In another example, zoom input 1416, centered at anchor point z, is a zoom-in action, and may cause focus asset 1412 to contract to the size of intermediate cell 1420. This intermediate cell 1420 is created to determine where to place the resized focus asset 1412 into contracted row 1424 in a corresponding grid of cells. Where to place the resized focus asset 1412 may be determined from the anchor point z of zoom input 1416 and an amount of zoom applied. As shown, intermediate cell 1420 is positioned between two columns in contracted row 1424 of its corresponding grid. Therefore, intermediate cell 1420 is not actually positioned, in the horizontal direction, where focus asset 1412 will ultimately end up in the contracted row 1424 of its corresponding grid.

In one example, the position of the anchor point z may be used to determine how the intermediate cell 1420 contracts, e.g., to the left and upward. Once intermediate cell 1420 is determined, a vertical centerline 1422 for intermediate cell 1420 is determined, and whichever cell in contracted row 1424 this vertical centerline 1422 intersects with is the cell chosen to place focus asset 1402. In this example, the cell that the vertical centerline 1408 intersects with is the middle cell. The other assets will then be distributed around focus asset 1412 in contracted row 1424 in accordance with a first order or sorting criteria, such as chronological, alphabetical, by curation score, by aesthetic score, etc.

As shown, contracted row 1424 includes nine assets, with focus asset 1412 positioned three assets in from the left edge of the contracted row 1424. However, any number of cells (e.g., any number of columns) may be included in the contracted row 1424, and other rows of its corresponding grid, as long as the cell sizes are smaller than in row 1400.

Figure 15A:
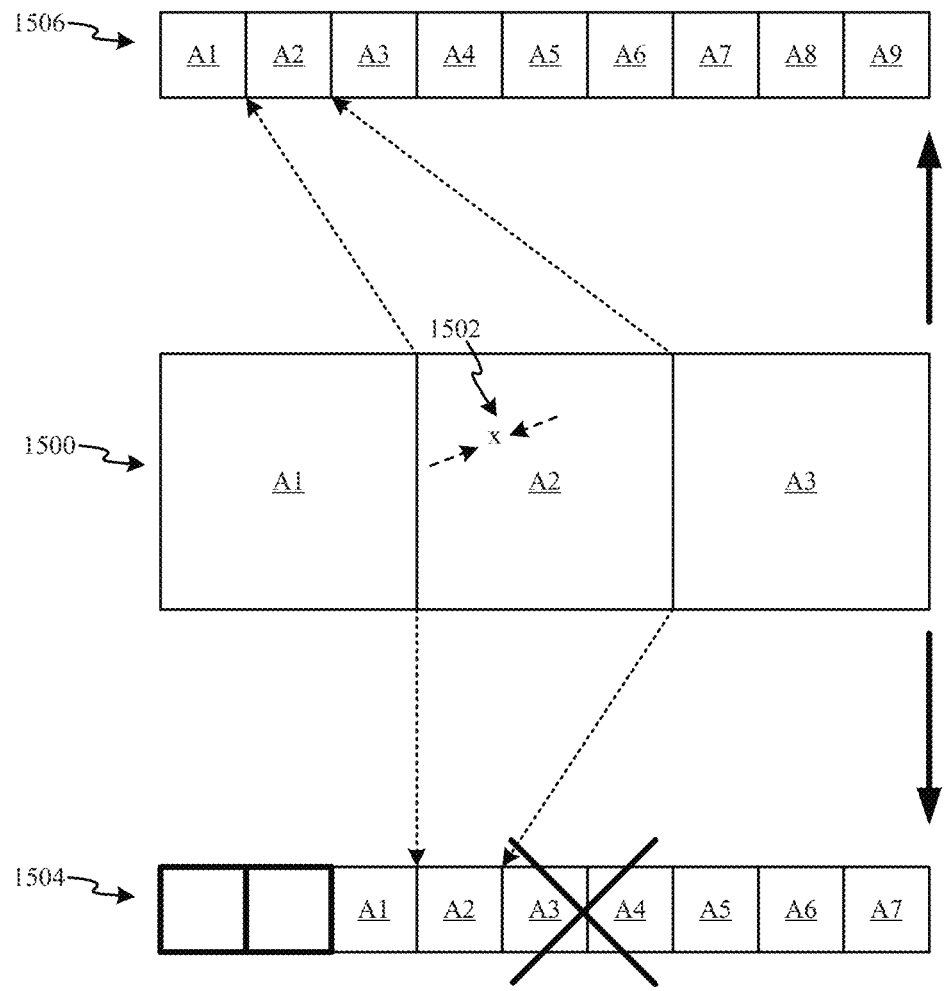
FIG. 15A shows an example transition between zoom levels for an asset near an end of a single row in the all assets view of the media library application.

FIG. 15A shows an example transition between zoom levels for an asset near an end of a row in the all assets view of the media library application. Only a single row is shown from each associated grid in order to reduce confusion in the descriptions of the transitions, but it is understood that each row may have rows above and/or rows below when presented in its associated grid. For example, row 1500 may be presented in a 3×3 grid (3 rows and 3 columns), contracted row 1506 may be presented in a 12×9 grid (12 rows and 9 columns), and contracted row 1504 may be presented in a 9×9 grid (9 rows and 9 columns). Of course, the actual display area of a display used to present the grids may be used to determine the size of a particular grid and individual cell sizes placed within the particular grid.

Example row 1500 includes three assets, but may include any number of assets displayed in cells of a certain size. Asset A2 is chosen as the focus asset due to the zoom input 1502 being positioned within the cell which displays asset A2. Zoom input 1502, centered at anchor point x, is a zoom-out action, and may cause the focus asset A2 to contract or shrink to a smaller size.

Based on a centerline of an intermediate cell (not shown), focus asset A2 would be placed in the fourth position in contracted row 1504. However, because focus asset A2 is the second asset in the set (indicated by labels A1, A2, . . . ), placing focus asset A2 in the fourth position, as shown in contracted row 1504, would result in two empty cells to the left of asset A1, which is undesirable. In one approach, a top edge of any set of assets being displayed should be smooth, e.g., be filled with assets and have no empty spaces or cells (e.g., whitespace). If contracted row 1504 is the top row, then the set of assets shown in the grid corresponding to contracted row 1504 would have a jagged top edge. As indicated by the x-out over contracted row 1504, this is not desirable.

In an example, in order to avoid showing whitespace or empty cells in a top row of a grid, the position of the assets within the cells may be shifted. In contracted row 1506, the assets are shifted by two cells to the left such that asset A1 is in the first cell, and focus asset A2 is in the second cell. This is desirable to present a full, straight edge in the grid.

This technique for ensuring that an edge (e.g., top, side, bottom) of any set of assets is smooth and does not include any whitespace or empty cells when the view is positioned on that portion may be applied to any view type, including but not limited to, day views, aggregation views, month views, year views, and any other view types described herein.

Figure 15B:
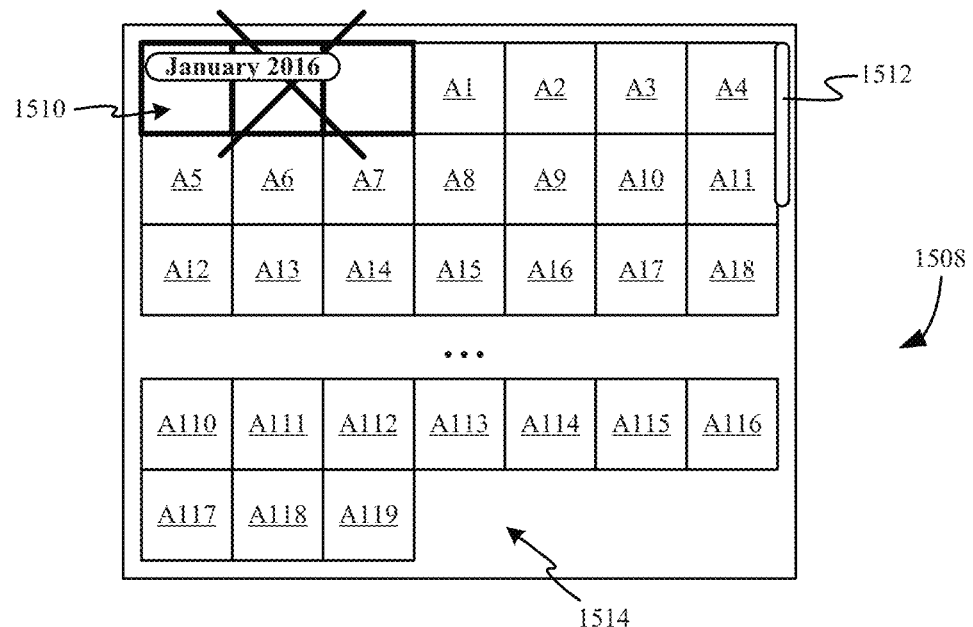
FIG. 15B shows an example placement of a focus asset near an end of a grid in the all assets view of the media library application.
Figure 15B:
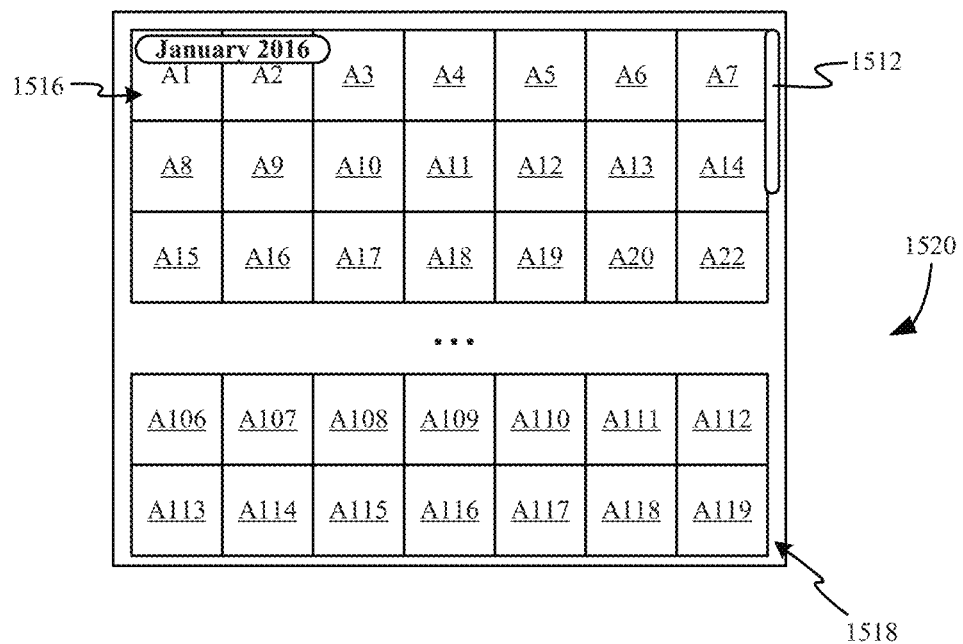

FIG. 15B shows an example placement of a focus asset near an end of a grid in the all assets view of the media library application. Grid 1508 and grid 1520 are configured to display a set of assets, with the assets being in a first order designated by assets A1, A2, . . . , A118, A119. In grid 1508, a user may need to scroll down (e.g., using scroll bar 1512) through the displayed assets to arrive at the end of the set of assets to see asset 119 displayed, and then scroll back up to see the first row 1510 of the assets that includes assets A1-A4. Similarly, in grid 1520, a user may need to scroll down (e.g., using scroll bar 1512) through the displayed assets to arrive at the end of the set of assets to see asset 119 displayed, and then scroll back up to see the first row 1516 of the assets that includes assets A1-A7.

Grid 1508 shows an undesirable effect where a first row 1510 of grid 1508 has empty cells or whitespace preceding the first asset A1. Even when a focus asset, such as asset A2, is determined to be placed at a particular location based on a zoom input, which is a desired result from a zoom input, when such placement would cause empty cells to appear at a beginning of a first row 1510, it is desired to not present the grid 1508 in this way. Therefore, grid 1508 is indicated as being undesirable by the "x-out" shown on the whitespace preceding the first asset A1. In this example, a zoom input may have directed placement of focus asset A2 in a fifth cell of the first row 1510, based on a position of the zoom input and an amount of zoom applied (either zooming in from a more expanded grid view, or zooming out from a more contracted grid view as described previously).

To avoid a staggered or uneven first row (e.g., a row with whitespace at a beginning of the row) as shown in grid 1508, assets in a first row 1516, as shown in grid 1520, may be moved to completely fill the first row 1516, even though this may cause focus asset A2 to appear in a cell that is not determined from the zoom input applied to focus asset A2 at a previous zoom level. In an example, once the zoom input is terminated or is completed, all assets may "snap" into positions such that the first row 1516 is filled with assets, to present a clean front edge for the set of assets shown in grid 1520.

A secondary consideration when determining where to place assets in a grid may be a trailing edge of the grid. In grid 1508, the trailing edge 1514 is staggered and the last row is not completely filled with assets. This situation is not out of the ordinary for a user, as many display layouts present a staggered trailing edge when presenting a set of assets. However, in grid 1520, the trailing edge 1518 is clean (e.g., as each cell of the last row is occupied by an asset). However, in some approaches, the trailing edge 1518 is not manipulated, even when it would appear staggered or include empty cells. When manipulation of a leading or trailing edge is desired, the manipulation may occur when scrolling through the media library (e.g., using scroll bar 1512, touch input drag up or down, etc.), in one approach.

For example, when scrolling up through grid 1508, such as by gesturing or using scroll bar 1512, assets may shift to cause the first row 1510 to transition to appear like first row 1516 in grid 1520. The shifting of assets may be triggered by movement of the grid using scroll bar 1512 to within a threshold distance from the first row, in one example. In another example, a speed of scrolling the grid may be taken into account when determining whether to shift the assets within the grid.

In another approach, assets displayed in the grid may be shifted in a manner that is imperceptible to the user, e.g., when scrolling through the assets in the grid at a speed which makes it difficult or impossible to determine that assets have shifted positions within the grid, when resizing assets and first displaying an expanded or contracted grid, etc.

Again, this technique for ensuring that an edge (e.g., top, side, bottom) of any set of assets is smooth and does not include any whitespace or empty cells when the view is positioned on that portion may be applied to any view type, including but not limited to, day views, aggregation views, month views, year views, and any other view types described herein.

Figure 16:
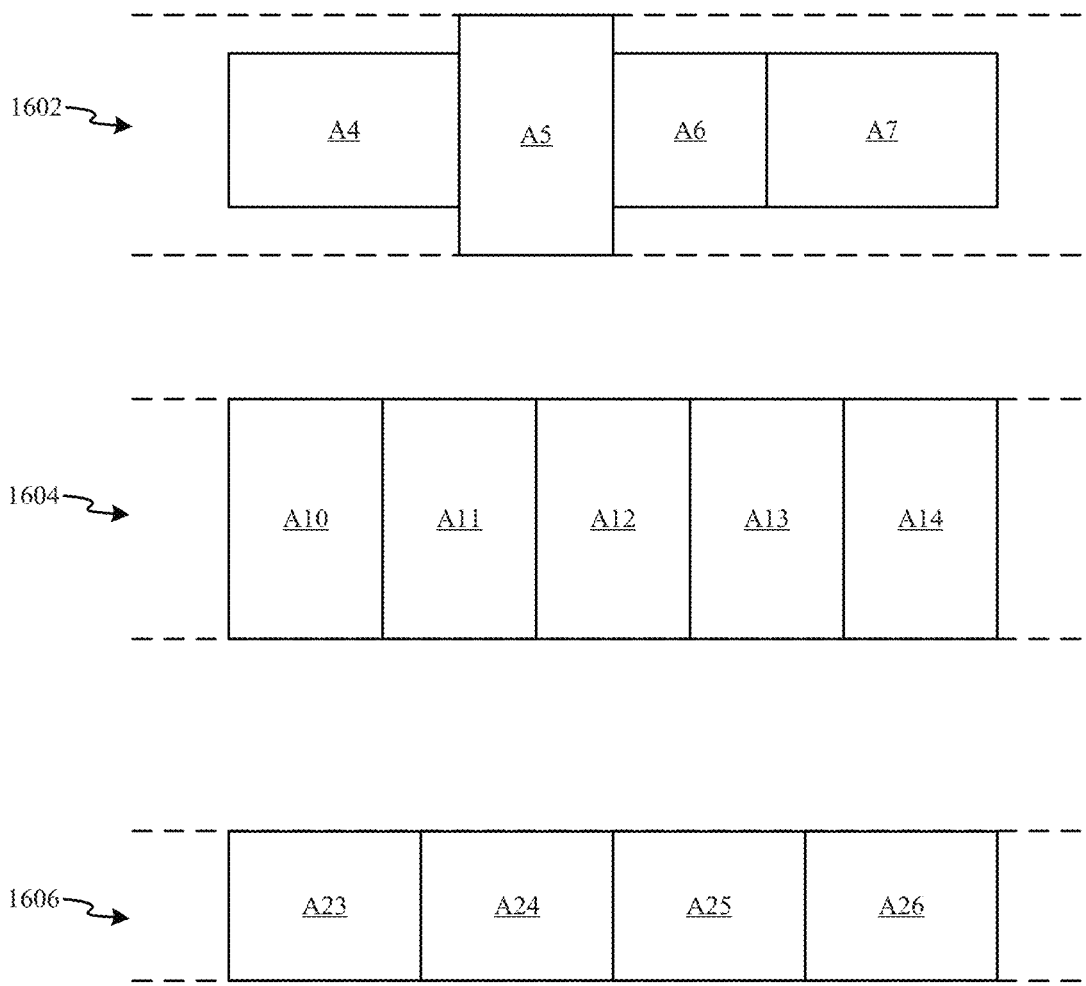
FIG. 16 shows different example rows in the all assets view of the media library application.

FIG. 16 shows different example rows that may be used in a grid in the all assets view of the media library application. Although in the previous discussions, each asset was shown in a cell having an even or square asset ratio (e.g., 1:1), the cells of a grid may include any desired aspect ratios. In one approach, the various aspect ratios available for displaying assets in a particular view may be toggled by user input, such as through selection of a button, sliding a slider icon on a slider element, etc.

Example row 1602 shows an example that includes a mixture of aspect ratio types: landscape (like asset A4 and A7 in row 1602), portrait (like asset A5), and square (like asset A6). Example row 1604 shows all portrait aspect ratios for assets A10-A14, and example row 1606 shows all landscape aspect ratios for assets A23-A26. Due to the difference in aspect ratios, row 1604 is able to present five columns, while rows 1602 and 1606 have four columns each. However, the difference in aspect ratios may also cause a difference in row height, as row 1604 and row 1602 have a greater row height to account for portrait orientations than row 1606.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

FIG. 17 is a flow diagram of an example process 1700 for curating assets of a media library. Assets of a media library may be curated using process 1700 for any of the example views described in FIGS. 2-10D.

Referring again to FIG. 17, in operation 1702, substantially duplicate assets (e.g., images which are substantially similar to other images, videos which are substantially similar to other videos) are identified in a media library. Any method of determining a similar or duplicative image or video may be used, such as filename and size comparison, a pixel-by-pixel analysis, performing a hash of file contents for two different files and comparing the hash outcomes, etc.

By substantially similar, what is meant is that a primary focus and intent of the asset is the same for each of the similar assets, even though subtle differences may exist in the actual images or videos. For example, a sunset that is captured using burst mode may have three or more images of the same sunset captured in a very short period of time. In the curated assets, it is desirable to only include one of those sunset images, and particularly desirable to include the best of those sunset images.

In one approach, which is the best asset from a series of substantially similar assets may be determined based on a number of factors. The factors for this determination may include an aesthetic score (as described later), a number of times the asset has been shared by the user, and a number of times the user has viewed the asset. Other relevant factors may be used in place of or in conjunction with any of these identified factors, in other examples.

As a result of operation 1702, duplicative assets may be filtered out from the other assets in the media library.

In operation 1704, assets of poor quality are identified in the media library. Poor quality may indicate any of a number of characteristics for individual assets, such as assets that appear blurry, washed out or overexposed, too dark or underexposed, etc. In addition, assets that appear to be accidently captured, such as a photo in a user's pocket, may also be identified.

After identifying all of the assets exhibiting poor quality, as a result of operation 1704, these poor quality assets may be filtered out from the other assets in the media library.

In operation 1706, assets being directed to a utility purpose are identified in the media library. A utility purpose indicates that the asset was obtained to serve a certain non-aesthetic purpose, as would be understood by one of skill in the art. Some examples of assets directed to a utility purpose include, but are not limited to, photo of a receipt, photo of a whiteboard showing notes from a meeting, instructional video of a technique for performing a certain activity (like sharpening a knife, decorating a cake, etc.), photo of documents or papers, photo of drawings or sketches, photo of a shopping list, photo of a reminder, a screenshot, etc.

After identifying all of the utility assets, as a result of operation 1706, these utility assets may be filtered out from the other assets in the media library.

After operations 1702, 1704, and 1706, the remaining assets of the media library which have not been filtered out may be referred to as first curated assets. The operations 1702, 1704, and 1706 may be performed in any order in process 1700, and one or more of operations 1702, 1704, and 1706 may be omitted in certain approaches.

Figure 18:
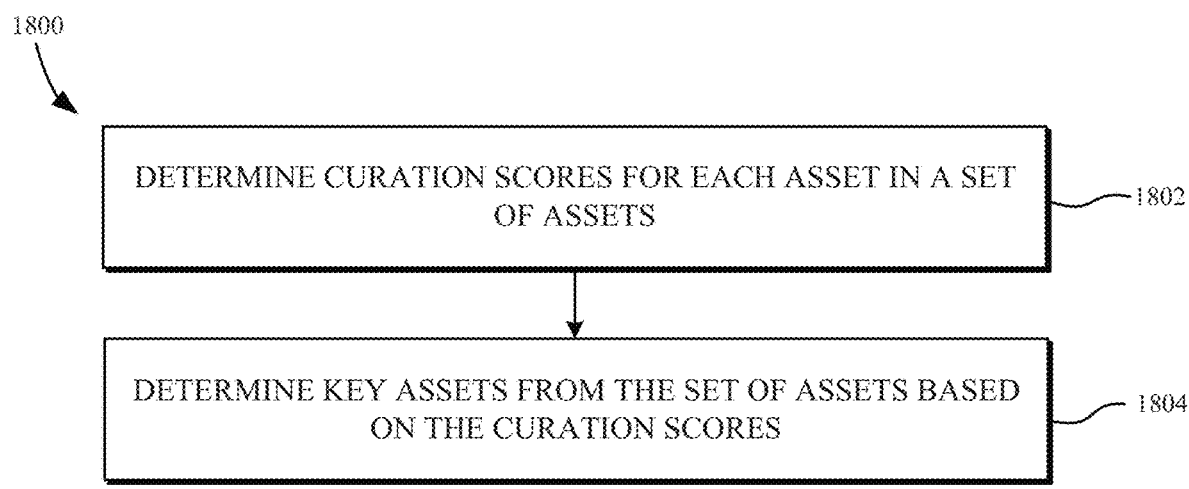
FIG. 18 is a flow diagram of an example process for determining key assets of a media library.

FIG. 18 is a flow diagram of an example process 1800 for determining key assets of a media library. Key assets of the media library may be determined using process 1800 from amongst curated assets determined using process 1700 for any of the example views described in FIGS. 2-10D.

Referring again to FIG. 18, in operation 1802, a curation score for each asset in a set of assets (the set of assets may include all first curated assets of a media library in one approach) is determined.

The curation score may be determined based on one or more factors. Example factors may include, but are not limited to, a global aesthetic, an aesthetic score for the particular asset, a number of shares for the particular asset, a number of views for the particular asset, a number of persons identified in the particular asset, a size of a grouping of assets that includes the particular asset, an imputed meaning for the particular asset, etc.

A global aesthetic describes a highest aesthetic score possible using an algorithm or set of algorithms, and represents an optimally-aesthetically pleasing image or series of images (in the case of a video) as determined by experts in the field. The global aesthetic score may be compared to individual aesthetic scores calculated for individual assets to determine how far from the global standard the particular assets rate. To accomplish this comparison, an aesthetic score is calculated for each of the assets individually using the same algorithm or set of algorithms used to calculate the global aesthetic. Then, a determination is made as to a difference between the global aesthetic and the individual aesthetic for each asset.

In one approach, only assets which achieve an aesthetic score meeting a certain threshold may be considered for further processing, while unaesthetically pleasing assets may be dropped from consideration. In a different approach, the individual aesthetic score may be used in a weighted overall analysis of the particular asset.

The weighted overall analysis may assign a certain weight to several different factors, then weight-average the factors together to achieve a weighted curation score for the particular asset. Any way of determining specific weights for the various factors may be used, as would be known to one of skill in the art.

In an example, a photo which has been shared by a user to many other people over the past two weeks may indicate that the user really likes the photo and would like to see it more often. Therefore, a weighted overall analysis for a particular asset may consider how many times the particular asset has been shared by the user. This determination may further be limited to a certain recent timeframe to remove the influence of past proclivities of the user which may not reflect current inclinations.

In another example, a photo which has been viewed by a user repeatedly over the past two weeks may indicate that the user really likes the photo and would like to see it more often. Therefore, a weighted overall analysis for a particular asset may consider how many times the particular asset has been viewed by the user. This determination may further be limited to a certain recent timeframe to remove the influence of past proclivities of the user which may not reflect current inclinations.

In another example, a photo with many family members shown may be more favorable to a user than a photo which does not include any faces or a photo with only one friend. Therefore, a weighted overall analysis for a particular asset may consider how many persons can be identified in the particular asset (e.g., how many faces are recognized by facial recognition software, and possibly a relationship of these persons to the user).

In another example, a user may take many photos at a concert or on a trip because the user wants to capture and remember this time. All of these photos may be grouped together based on them being from the same event (the concert) or from the same trip. Therefore, a weighted overall analysis for a particular asset may consider a size of a grouping of assets that includes the particular asset.

In another example, special occasions and events typically mean more to a user than random photos not attached to a special event or time in a user's life. Therefore, a weighted overall analysis for a particular asset may consider an imputed meaning for the particular asset. Metadata, tie of creation, persons shown in the asset, and any other relevant characteristics of the assets may be used to determine the meaning of the particular asset. Some example meanings include, but are not limited to, birthdays, weddings, anniversaries, birth of children, graduations, trips, religious events, etc.

In operation 1804, key assets from the set of assets are determined based on the curation scores of the set of assets.

In one approach, any asset which achieves a weighted average across all factors (e.g., a curation score) that meets a certain threshold may be considered a second curated asset or key asset, while assets which do not meet the weighted average threshold are not key assets and remain just first curated assets.

In another example, a curated asset which attains a highest curation score for a particular timeframe (e.g., a day, a week, a month, a year) may be selected as the key asset to represent that timeframe.

In another example, a threshold curation score may be determined, and this threshold curation score may be compared to curation scores calculated for curated assets for a particular timeframe (e.g., a day, a week, a month, a year). The threshold curation score may be dynamically determined to only select a certain percentage of assets to be key assets (e.g., a top 10%, 5%, 2%, 1%, 0.5%, etc.). All curated assets that have a curation score greater than or equal to the threshold curation score may be considered a key asset for the particular timeframe (e.g., a day, a week, a month, a year) in this approach.

Figure 19:
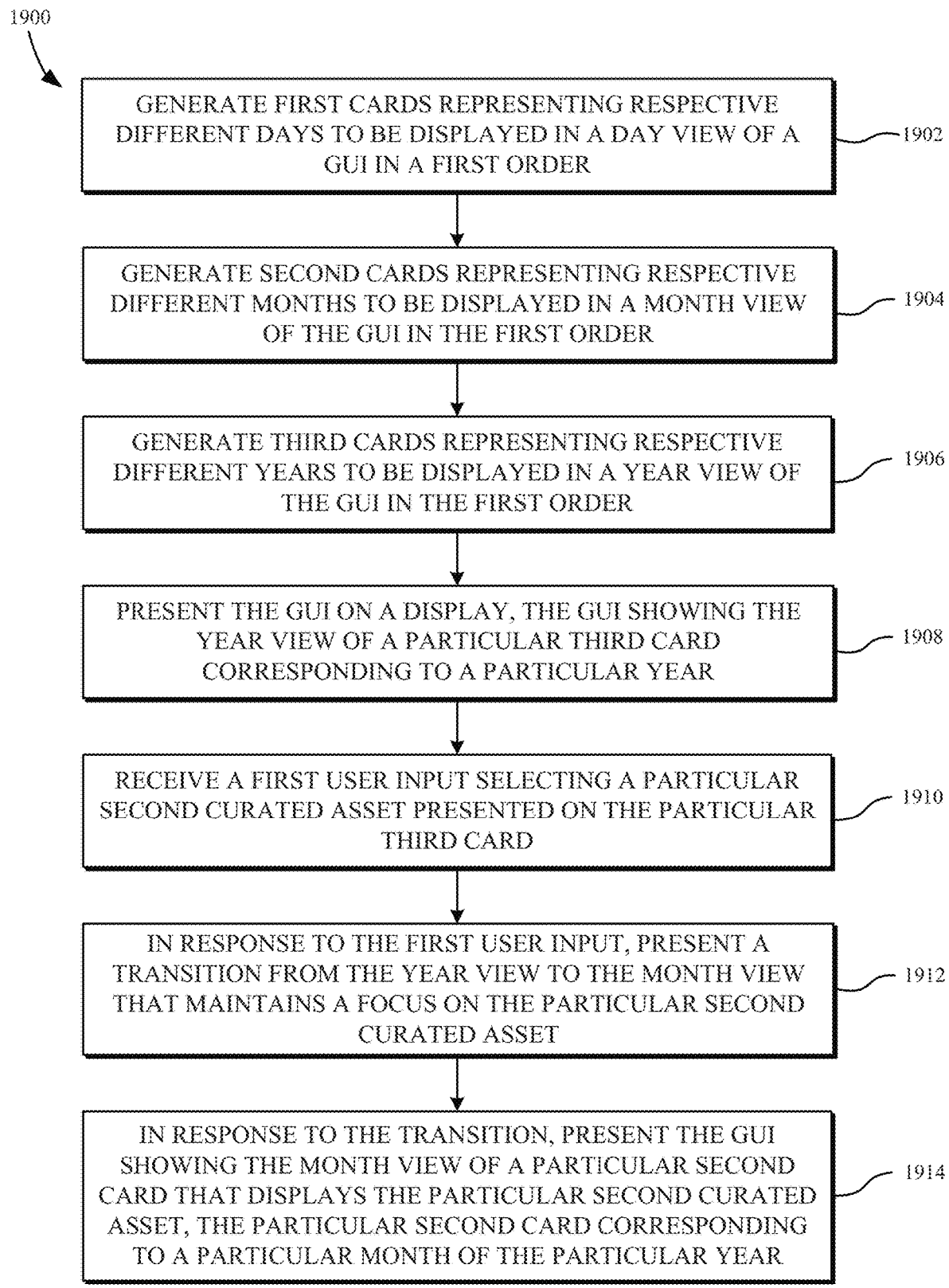
FIG. 19 is a flow diagram of an example process for selecting and displaying assets of a media library.

FIG. 19 is a flow diagram of an example process 1900 for selecting and displaying assets of a media library. Assets of a media library may be selected and displayed using process 1900 for any of the example views described in FIGS. 2-10D. In an approach, example assets that may be included in the media library include, but are not limited to, still images, videos, animated images, composite presentations, panoramic images, etc.

Referring again to FIG. 19, in operation 1902, a computing device may generate first cards (e.g., day cards, aggregation cards). Each first card may represent a respective different day or aggregation of days to be displayed in a day view of a GUI in a first order. In one example, a day view may include multiple day cards for a single day in response to multiple types of events being captured on the same day. In this example, assets captured at a user's work location, assets captured at a user's home location, assets captured during a trip outside of a user's locale area, and assets captured for any other events may be displayed on separate cards for the same day in which they are captured. Other event types may be used to determine how to separate assets captured in a same day as would be apparent to one of skill in the art upon reading the present disclosures.

The first order may include chronological ordering, alphabetical ordering, size ordering, alphabetical ordering by asset name or location, ordering by curation score, ordering by aesthetic score, etc., or some combination thereof.

Moreover, each day card may include first curated assets (e.g., filtered assets) from a media library that has many assets, with each first card representing a respective single day or an aggregation of consecutive days. The filtered assets may be derived from a curation process, such as example process 1700 shown in FIG. 17.

An aggregation of days may be shown on a day card in day view when the assets are captured during a trip over several days, or there are insufficient assets available for display for one or more days in the aggregation of days.

In one approach, filtered assets do not include duplicate images and videos, junk assets (blurry, unrecognizable content, pocket photos, low light, washed out, etc.), and utility assets, as described in more detail previously. The filtered assets are those assets of the media library that remain after filtering out undesired assets.

Returning to FIG. 19, in operation 1904, the computing device may generate second cards (month cards) representing respective different months to be displayed in a month view of the GUI in the first order. Each month card may include second curated assets (key assets) selected from one of the day cards that represents a day or an aggregation of consecutive days in a corresponding month. The key assets may be derived from a curation process, such as example process 1800 shown in FIG. 18.

Returning to FIG. 19, in operation 1906, the computing device may generate third cards (year cards) representing respective different years to be displayed in a year view of the GUI in the first order. Each year card may include one or more key assets selected from one of the month cards that represents a month in a corresponding year. The represented month in the corresponding year may be selected to be nearest to a current month, so that each time a user views the year view, the image(s), video(s), or other asset(s) that are shown relate to the current date, and may change daily to keep the interface looking fresh for the user.

In operation 1908, the GUI may be presented on a display of the computing device. The GUI may show any of the particular views, and in one example, the GUI may show the year view of a particular year card corresponding to a particular year.

In operation 1910, a first user input selecting a particular key asset presented on the particular year card may be received by the computing device. This first user input may be direct selection of the particular key asset, or an inferred selection of the key asset based on a position of the key asset in the GUI when a different label is selected to direct the GUI to change views.

In operation 1912, in response to the first user input, the computing device may present a transition from the year view to the month view while maintaining a focus on the particular key asset. Keeping a focus of the current view on the selected key asset includes displaying the key asset after the transition to the next view, and/or showing a grouping of assets that includes the selected key asset after the transition (even if the selected key asset is not shown in the GUI, but is accessible through selection of one of the assets shown from the grouping).

In operation 1914, in response to the transition, the computing device presents the GUI showing the month view of a particular month card that displays the particular key asset (or at least represents a time frame when the particular key asset was captured). The particular month card corresponds to a particular month of the particular year.

In another approach, a video may be automatically played (e.g., in a loop or only one or two times) in response to the video being displayed in the GUI. In this way, every time a view of the GUI includes a video, the video is automatically played to provide interest in the view, instead of simply presenting a still image taken from the video.

Similarly, in an approach, an animated image may be automatically played (e.g., in a loop or only one or two times) in response to the animated image being displayed in the GUI. In this way, every time a view of the GUI includes an animated image, the animated image is automatically played to provide interest in the view, instead of simply presenting a still image taken from the animated image.

In one example, the GUI may include a ribbon element that includes one or more labels to other views available in the GUI. For example, the ribbon element may include labels to an all assets view, a month view, a year view, and a day view. Each label, when selected, causes the GUI to show a particular card associated with the label in an appropriate view to the GUI, e.g., month cards are shown in month view, day cards are shown in day view, etc. The ribbon element may be selectively positioned along a top, a bottom, or one of the sides of the GUI, it may auto-hide from view when not in use, and it may have a transparent background, an opaque background, or a semi-transparent background. Moreover, the various labels may include textual descriptors, graphics, or a combination of a graphic and text to distinguish what the label represents.

In one example, the first user input may be selection of one of the labels in the ribbon element.

In another example, the plurality of assets of the media library may be filtered to produce the first curated assets (e.g., filtered assets). This filtering of assets in the media library may cause removal of duplicate assets, assets of poor quality, and assets having a utility purpose in an approach.

To determine which assets to show in some of the views (e.g., year view, month view) and which assets to show larger in some of the views (e.g., year view, month view, day view), curation scores may be determined for the filtered assets (e.g., the first curated assets left after filtering out junk, duplicates, and utility assets). In another approach, key assets (e.g., second curated assets) may be determined based on curation scores of the plurality of filtered assets.

A curation score for a particular asset may be based on one or more of the following factors: a global aesthetic, a number of shares for the particular asset, a number of views for the particular asset, a number of persons identified in the particular asset, a size of a grouping of assets that includes the particular asset, and an imputed meaning for the particular asset. These factors may be combined together to form an overall curation score for a particular asset with equal weighting, or according to a weighting scheme which causes one or more of the (high-weighted) factors to influence the overall curation score more than other (low-weighted) factors.

In another approach, key assets for the month and year views may be determined based on behavioral curation of the assets in the media library. In this approach, past behavior of a user of the media library may be used to determine preferences of the user for managing assets of the media library, determining which assets to display more prominently (e.g., larger than other assets on a card), which assets to demote from most views (e.g., filter out from year, month, and day views), etc.

In an additional approach, relationship information for the user may be used in determining which assets are more likely to be viewed favorably by the user. Relationship information may be used to determine who persons that are identified in photos and videos are to the user, for example, mother, father, sister, brother, child, etc. Assets which include family members may be more important to the user than images that do not include family. Similarly, friends may be determined from photos and videos based on a frequency of the person appearing in assets of the media library, how the user treats assets with a particular person in it (e.g., multiple views, multiple shares with one or more contacts who may be the person in the asset, etc.).

In another approach, a knowledge graph may be used to help determine key assets for the media library. The knowledge graph may correlate assets and metadata associated with the assets in the media library with the user, stored data and metadata for contacts of the user, relationship information for the user, locations, timeframes, and other information available to determine connections between data.

A knowledge graph metadata network associated with the assets stored to the media library may be generated. The metadata network may comprise correlated metadata assets describing characteristics associated with the assets of the media library. Each metadata asset may describe a characteristic associated with one or more assets in the media library. In a non-limiting example, a metadata asset may describe a characteristic associated with multiple images and/or videos in the media library. Each metadata asset may be represented as a node in the metadata network, and may be correlated with at least one other metadata asset (node). Each correlation between metadata assets may be represented as an edge in the metadata network that is positioned between the nodes representing the correlated metadata assets. By using such a vast knowledge graph metadata network to describe the connections between assets, the user, contacts of the user, locations, timeframes, etc., key assets may be more carefully determined that represent images and people that a user would want to see more prominently in the media library and that may be used to locate timeframes to search for other assets in lower levels of the media library.

For example, a photo of a group of people may not be aesthetically pleasing with respect to the global aesthetic, but it may be commonly viewed by the user, put on wallpaper of a laptop by the user, and sent via text message to a group of contacts who are recognized as being in the photo. This photo, even if it does not have a high curation score may ultimately be considered a key asset based on the behavior of the user with respect to the photo, and may be prominently displayed on cards for timeframes in which the photo was captured because it is a key asset.

In an approach, the GUI may be presented showing the day view of a particular day card (in response to user input selecting a day view). A size of at least one filtered asset displayed in the particular day card may be larger than other filtered assets displayed in the particular day card based on the curation score of the at least one filtered asset. In other words, a filtered asset that is chosen to be a key asset may be shown larger than other filtered assets for a particular day.

In this approach, second user input selecting a filtered asset displayed to the particular day card may be received by the computing device. In response to receiving the second user input, the computing device may present a transition from the day view to an all assets view that maintains a focus on the filtered asset. Also, in response to the transition, the computing device may present the GUI showing the all assets view of a portion of the plurality of assets of the media library sorted in accordance with the first order to allow a user to easily navigate through levels of the media library in an intuitive manner. In this view, sizes of all assets currently displayed in the GUI may be substantially equal. The user may navigate through this view to access all assets stored to the media library, regardless of the content and quality of the asset (e.g., the assets are unfiltered). The first order may include chronological ordering, alphabetical ordering, size ordering, alphabetical ordering by asset name or location, ordering by curation score, ordering by aesthetic score, etc., or some combination thereof.

According to an example, the particular month card may be limited to displaying up to five key assets selected from different weeks of a particular month that is represented by the particular month card. Each key asset displayed in the month card may be selected based on curation scores of filtered assets for day cards that represent days in the particular month. In this example, second user input selecting a certain key asset displayed to the month card may be received, and in response to the second user input, the computing device may present a transition from the month view to the day view that maintains a focus on the certain key asset. Thereafter, in response to the transition, the computing device may present the GUI showing the day view of a particular day card which includes the certain key asset to allow a user to easily navigate through levels of the media library in an intuitive manner.

In one approach, each key asset displayed in the particular year card may be selected based on one or more factors. The factors may include, but are not limited to, curation scores of key assets for month cards that represent months in the particular year represented by the particular year card, and a similarity between a current date and a timestamp of the key assets for the month cards that represent the months in the particular year.

Figure 20:
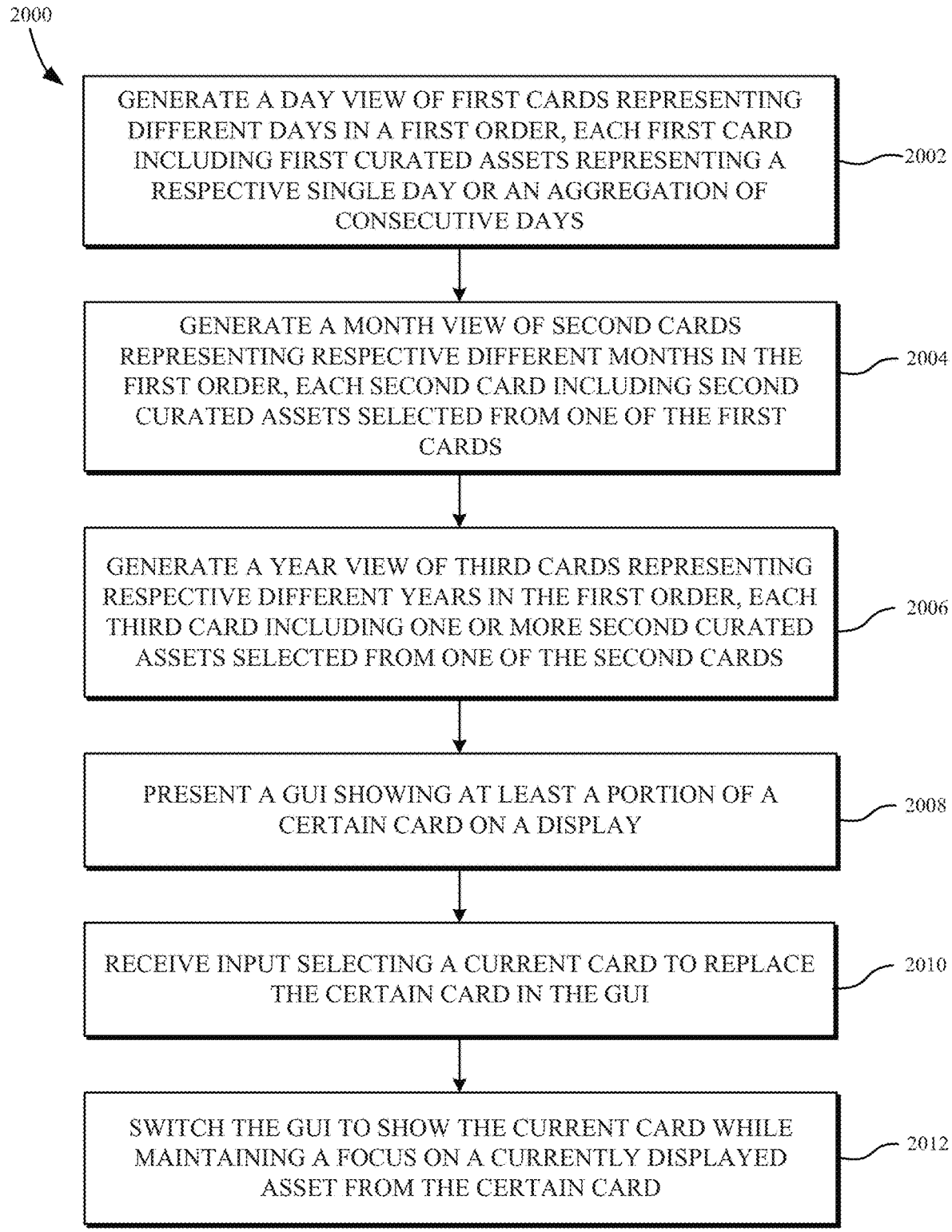
FIG. 20 is a flow diagram of an example process for selecting and displaying assets of a media library.

FIG. 20 is a flow diagram of an example process 2000 for selecting and displaying assets of a media library. Assets of a media library may be selected and displayed using process 2000 for any of the example views described in FIGS. 2-10D. In an approach, example assets that may be included in the media library include, but are not limited to, still images, videos, animated images, composite presentations, panoramic images, etc.

Referring again to FIG. 20, in operation 2002, a computing device may generate a day view of first cards (e.g., day cards and/or aggregation cards) to be displayed in a GUI in a first order. Each day card may include first curated assets (e.g., filtered assets) representing a respective single day or aggregation of consecutive days. In one example, a day view may include multiple day cards for a single day in response to multiple types of events being captured on the same day.

The first order may include chronological ordering, alphabetical ordering, size ordering, alphabetical ordering by asset name or location, ordering by curation score, ordering by aesthetic score, etc., or some combination thereof.

In this example, filtered assets captured at a user's work location, filtered assets captured at a user's home location, filtered assets captured during a trip outside of a user's locale area, and filtered assets captured for other event types (dinners, parties, etc.) may be displayed on separate day cards for the same day (the day in which they are captured). Other event types may also be used in determining how to separate filtered assets captured in a same day, as would be apparent to one of skill in the art upon reading the present disclosures.

Moreover, the filtered assets may be derived from a curation process, such as example process 1700 shown in FIG. 17.

An aggregation of filtered assets from multiple consecutive days may be shown on an aggregation card in day view when the filtered assets are captured during a trip over several days, or there are insufficient assets available for display for one or more days in the aggregation of days.

In one approach, filtered assets do not include duplicate images and videos, junk assets (blurry, unrecognizable content, pocket photos, low light, washed out, etc.), and utility assets, as described in more detail previously. The filtered assets are those assets of the media library that remain after filtering out undesired assets.

Returning to FIG. 20, in operation 2004, the computing device may generate a month view of second cards (month cards) representing respective different months to be displayed in the GUI in the first order. Each month card may include second curated assets (key assets) selected from one of the day cards that represents a day or an aggregation of consecutive days in a corresponding month. The key assets may be derived from a curation process, such as example process 1800 shown in FIG. 18.

Returning to FIG. 20, in operation 2006, the computing device may generate a year view of third cards (year cards) representing respective different years to be displayed in the GUI in the first order. Each year card may include one or more key assets selected from one of the month cards that represents a month in a corresponding year. The represented month in the corresponding year may be selected to be nearest to a current month, so that each time a user views the year view, the image(s), video(s), or other asset(s) that are shown relate to the current date, and may change daily to keep the interface looking fresh for the user.

In operation 2008, the GUI showing at least a portion of a certain card (e.g., a day card, aggregation card, month card, or year card) may be presented in a corresponding view (day view, month view, or year view) on a display of the computing device. The GUI may show a portion, an entirety, or multiple cards of any one type.

In operation 2010, input selecting a current card to replace the certain card already displayed to the GUI may be received by the computing device. This input may be direct selection of a particular asset displayed to the certain card, or an inferred selection of the particular asset based on a position of the key asset in the GUI when a different label is selected to direct the GUI to change views.

In operation 2012, in response to the input, the computing device may switch the GUI to show the current card while maintaining a focus on the particular asset from the certain card. Keeping a focus of the current card on the particular asset includes displaying the particular asset after the transition to the current card, and/or showing a grouping of assets that includes the particular asset after the transition (even if the particular asset is not shown in the GUI, but is accessible through selection of one of the assets shown from the grouping).

In one approach, a video may be played (e.g., in a loop or only one or two times) in response to the video being displayed in the GUI. In this way, every time a view of the GUI includes a video, the video is automatically played to provide interest in the view, instead of simply presenting a still image taken from the video.

Similarly, in an approach, an animated image may be played (e.g., in a loop or only one or two times) in response to the animated image being displayed in the GUI. In this way, every time a view of the GUI includes an animated image, the animated image is automatically played to provide interest in the view, instead of simply presenting a still image taken from the animated image.

In one example, the GUI may include a ribbon element that includes one or more labels to other views available in the GUI. For example, the ribbon element may include labels to an all assets view, a month view, a year view, and a day view. Each label, when selected, causes the GUI to show a particular card associated with the label in an appropriate view to the GUI, e.g., month cards are shown in month view, day cards are shown in day view, etc. The ribbon element may be selectively positioned along a top, a bottom, or one of the sides of the GUI, it may auto-hide from view when not in use, and it may have a transparent background, an opaque background, or a semi-transparent background. Moreover, the various labels may include textual descriptors, graphics, or a combination of a graphic and text to distinguish what the label represents.

In one example, the input may be selection of one of the labels in the ribbon element that causes the GUI to display a card that corresponds to the view of the selected label representing one or more assets from a time frame relevant to the current card.

To determine which assets to show in some of the views (e.g., year view, month view) and which assets to show larger in some of the views (e.g., year view, month view, day view), curation scores may be determined for the filtered assets (e.g., the first curated assets left after filtering out junk, duplicates, and utility assets). In another approach, key assets (e.g., second curated assets) may be determined based on curation scores of the plurality of filtered assets.

Any method or technique for determining key assets to display to the month and year view may be used, as described herein, or known to those of skill in the art.

In an approach, the current card may be a particular day card, where a size of at least one filtered asset displayed in the particular day card is larger than other filtered assets displayed in the particular day card based on a curation score of the filtered assets. Assets which achieve higher curations scores may be considered key assets in some approaches, and displayed more prominently in on their respective day cards.

In response to receiving input selecting a filtered asset displayed to the particular day card, the computing device may display a portion of all of the assets of the media library, sorted in accordance with the first order, while maintaining a focus on the selected filtered asset in the display area, wherein sizes of the portion of the plurality of assets displayed in the display area are substantially equal.

The first order may include chronological ordering, alphabetical ordering, size ordering, alphabetical ordering by asset name or location, ordering by curation score, ordering by aesthetic score, etc., or some combination thereof.

In another approach, the current card may be a particular month card displaying at least one key asset from the corresponding month. The key asset(s) shown on the month card may be selected based on curation scores of all filtered assets in the corresponding month, with highest scoring filtered assets being key assets that may be selected for display in one example.

In response to receiving input selecting a key asset displayed to the particular month card, the computing device may display a particular day card that shows the selected key asset on the day card.

In one approach, month cards may be limited to displaying up to five key assets, one for each calendar week of the corresponding month.

In another example, the current card may be a particular year card displaying one or more particular key assets from months of the corresponding year. The key assets displayed may be selected based on curation scores of key assets for month cards that represent months in the corresponding year represented by the particular year card. The key assets displayed may further be selected based on a similarity between a current date and a timestamp of the key assets that represent the months in the corresponding year. For example, if the current month is April, the key asset(s) chosen for a year card for 2011 may be selected from key assets from the month of April 2011.

In a further approach, in response to receiving input selecting a certain key asset displayed to the particular year card, the computing device may display a particular month card that comprises the certain key asset in the GUI.

Figure 21:
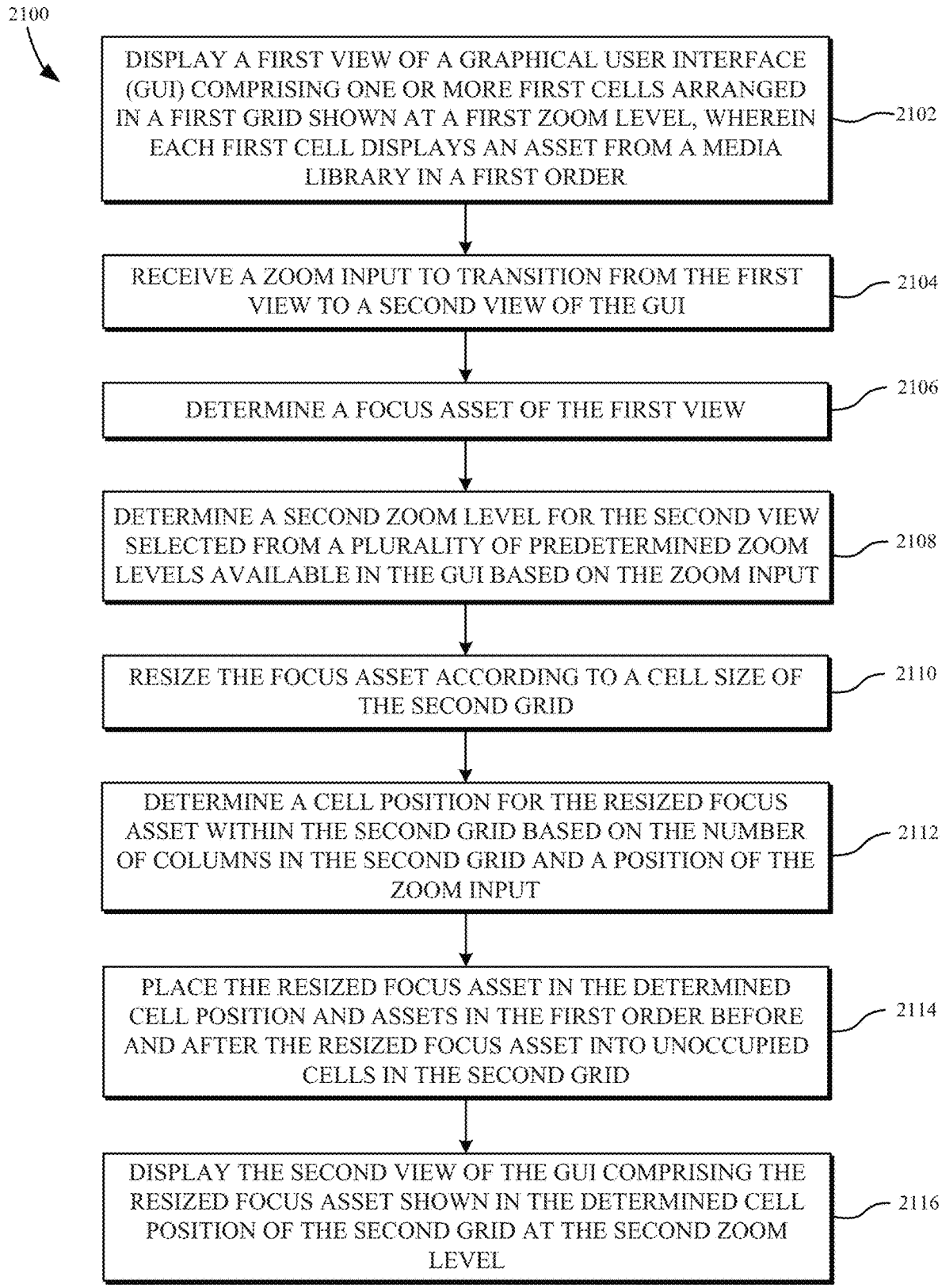
FIG. 21 is a flow diagram of an example process for presenting assets of a media library.

FIG. 21 is a flow diagram of an example process 2100 for presenting assets of a media library. Assets of the media library may be selected and displayed using process 2100 for any of the example views described in FIGS. 2-10D. In an approach, example assets that may be included in the media library include, but are not limited to, still images, videos, animated images, composite presentations, panoramic images, etc.

Referring again to FIG. 21, in operation 2102, a computing device may display a first view of a GUI. The first view may include one or more first cells arranged in a first grid shown at a first zoom level. This first view may include a single cell showing a single asset that occupies substantially all of the view, or may show a plurality of assets situated in a corresponding number of cells. Each first cell is configured to display an asset from the media library in a first order.

The first order may include chronological ordering, alphabetical ordering, size ordering, alphabetical ordering by asset name or location, ordering by curation score, ordering by aesthetic score, etc., or some combination thereof.

One or more cells in the first grid may be unoccupied upon displaying the first grid, for example, based on the cells appearing at an edge of a set of assets being displayed in the particular view.

In operation 2104, the computing device may receive a zoom input to transition from the first view to a second view of the GUI. This zoom input may be a touch input, mouse selection and/or scroll, keyboard entry, etc. Moreover, the zoom input may be centered on a particular asset in the first view, and may have a specific amount of zoom indicated by the zoom input (e.g., an amount to zoom in or zoom out).

In an example, the zoom input may include a pinch gesture having multiple points of touch contact (received via a touchscreen of the computing device) that move closer together to zoom out, or move farther apart to zoom in. In other example, the zoom input may include a click and drag input from a mouse or trackpad that manipulates a slider element that controls a zoom level for the display. In one approach, this slider element may include indications or hash marks that denote each zoom level available for the all assets view of the media library.

In operation 2106, the computing device may determine a focus asset of the first view. The focus asset may be the particular asset on which the zoom input is centered in one approach. In other approaches, the focus asset may be determined based on a center-most asset in the first view, a previously selected asset in the first view, etc. Any method or technique for determining the focus asset may be used, as would be understood by one of skill in the art upon reading the present descriptions.

In an example, the focus asset of the first view may be determined in response to receiving user input selecting the focus asset from the first view. In another example, the focus asset of the first view may be determined in response to determining that the position of the zoom input is situated or centered closer to the focus asset than any other asset in the first view.

In operation 2108, the computing device may determine a second zoom level for the second view. The second zoom level may be selected from a plurality of predetermined zoom levels available in the GUI, with the selection of which zoom level to show in the second view being based on some aspect of the zoom input (e.g., an amount of zoom specified by the zoom input, which may be determined based on a duration of the zoom input, an amount movement of one or more touch inputs received, an amount movement of one or more mouse click and drag inputs received, etc.).

In one approach, the plurality of predetermined zoom levels available in the GUI may include at least five different zoom levels. Each of these zoom levels may be associated with a grid particular to the specific zoom level, with each grid including a different number of columns for display of assets therein. In an example, the five zoom levels may correspond to grids (denoted as rows x columns) of 1×1, 4×3, 7×5, 10×7, and 15×9.

In an example, the plurality of predetermined zoom levels available in the GUI may include a single asset zoom level associated with a grid (e.g., 1×1) that displays a single asset from the media library in a cell sized to substantially fill a display of the computing device in at least one direction (e.g., either the width of the display, or the height of the display, depending on an aspect ratio of the displayed asset—portrait, landscape, square).

The second view may include, in an example, one or more second cells arranged in a second grid. The second grid may include a number of columns different than a number of columns of the first grid, e.g., more columns or less columns than the first grid. Each second cell is configured to display an asset from the media library, but one or more cells in the second grid may be unoccupied upon displaying the second grid, for example, based on the cells appearing at an edge of a set of assets being displayed in the particular view.

In operation 2110, the computing device may resize the focus asset according to a cell size of the second grid. This determination may be made after the second zoom level is determined for the second grid, so that a cell size of the second grid is known and may be used to determine how many columns the second grid includes, and positions for each column.

Although the zoom input may indicate to resize the focus asset more or less than a cell size of the second grid, the focus asset may be "snapped" to the cell size in the second grid upon termination or release of the zoom input, which may or may not be noticeable by the user. In this way, the user may assume that the focus asset is being enlarged or reduced in size exactly by an amount indicated by the zoom input, but actually is being matched to a predetermined cell size that most closely matches the resizing indicated by the zoom input. This saves on processing required to configure and display the various zoom levels (each zoom level having an associated grid with predetermined cell sizes) in the associated views.

In an example, the cell size of the second grid may be smaller than a cell size of the first grid in response to the zoom input indicating to zoom out from the focus asset in the first view. Conversely, the cell size of the second grid may be larger than the cell size of the first grid in response to the zoom input indicating to zoom in on the focus asset in the first view.

According to one approach, the focus asset may change size to produce the resized focus asset, while maintaining an aspect ratio thereof, by shrinking or expanding the focus asset about a center or center point of the zoom input, which acts as an anchor point for the change in size, as described in more detail previously.

In operation 2112, the computing device may determine a cell position for the resized focus asset within the second grid. The cell position may be based on, among other factors, the number of columns in the second grid and a position of the zoom input. The position of the zoom input may be a center or anchor point of the zoom input, as discussed previously, and may be used to determine a centerline of an intermediate cell for choosing which cell position within the second grid to place the resized focus asset.

In one approach, the cell position for the resized focus asset within the second grid may be determined based on a number of assets that will precede the resized focus asset according to the first order. For example, if the resized focus asset is near a beginning of a set of assets that will be displayed in the second view, then it is desirable to have a clean front or top edge of the grid with no whitespace or unoccupied cells in the first row. Therefore, the cell position for the resized focus asset may be selected to ensure that assets from the media library are positioned in all cells in the first row of the second grid in the first order. Any method or technique of ensuring that the first row of the second grid is completely filled with assets may be used, such as those described herein, and others that would be apparent to one of skill in the art. In several examples, assets may be shifted to fill the first row, assets may be skipped in a portion of the set of assets not currently displayed, assets may be repeated in a portion of the set of assets not currently displayed, etc.

According to one approach, the cell position for the resized focus asset within the second grid may be determined by selecting the cell position to be in a particular column of the second grid. The particular column may be chosen based on a determination that a vertical centerline of the resized focus asset, prior to movement into the grid, intersects with the chosen column (the centerline will only intersect with a single column of the second grid, as described previously. Then, the resized focus asset is placed in the determined cell position upon termination of the zoom input. Further, other assets around the resized focus asset will also be resized to the cell size of the second grid and placed into appropriate cells of the second grid, based on a sorting order (e.g., chronologically, alphabetically, by curation score or determined interest, etc.)

In operation 2114, the computing device may place the resized focus asset in the determined cell position. Thereafter, or coincidentally to placing the resized focus asset, other assets may be placed into unoccupied cells of the second grid in the first order before and after the resized focus asset.

For example, when chronological ordering is used, pictures and/or videos taken before the focus asset was captured may be placed to the left of the same row as the focus asset and in rows above the focus asset, while pictures and/or videos taken after the focus asset was captured may be placed to the right in the same row as the focus asset and in rows below the focus asset in one example. Of course, any other sorting criteria may be used for determining an order of the various assets shown in the second view, and most recent or oldest assets may be shown first at a top of the view, in several approaches.

In one example, process 2100 may include the computing device modifying the size of the focus asset to match the resized focus asset determined based on the cell size of the second grid, and snapping the resized focus asset to the determined cell position of the second grid upon termination of the zoom input.

In operation 2116, the computing device may display the second view of the GUI. This second view includes the resized focus asset shown in the determined cell position of the second grid at the appropriate second zoom level. Now, the user is able to scroll, select assets, and zoom in or out again from this second view.

Process 2100, in an example, may also include the computing device showing a zooming in transition effect that increases a size of the focus asset while the zoom input indicates to zoom in. This transition effect may include blurring of edges of assets as the size of the focus asset is increased, moving or shifting of assets to account for the larger focus asset, snapping of the focus asset to the determined cell position in the new grid after the zoom input is terminated, etc.

Process 2100, in another example, may also include the computing device showing a zooming out transition effect that decreases the size of the focus asset while the zoom input indicates to zoom out. This transition effect may include blurring of edges of assets as the size of the focus asset is decreased, moving or shifting of assets to account for the smaller focus asset, snapping of the focus asset to the determined cell position in the new grid after the zoom input is terminated, etc.

Figure 22:
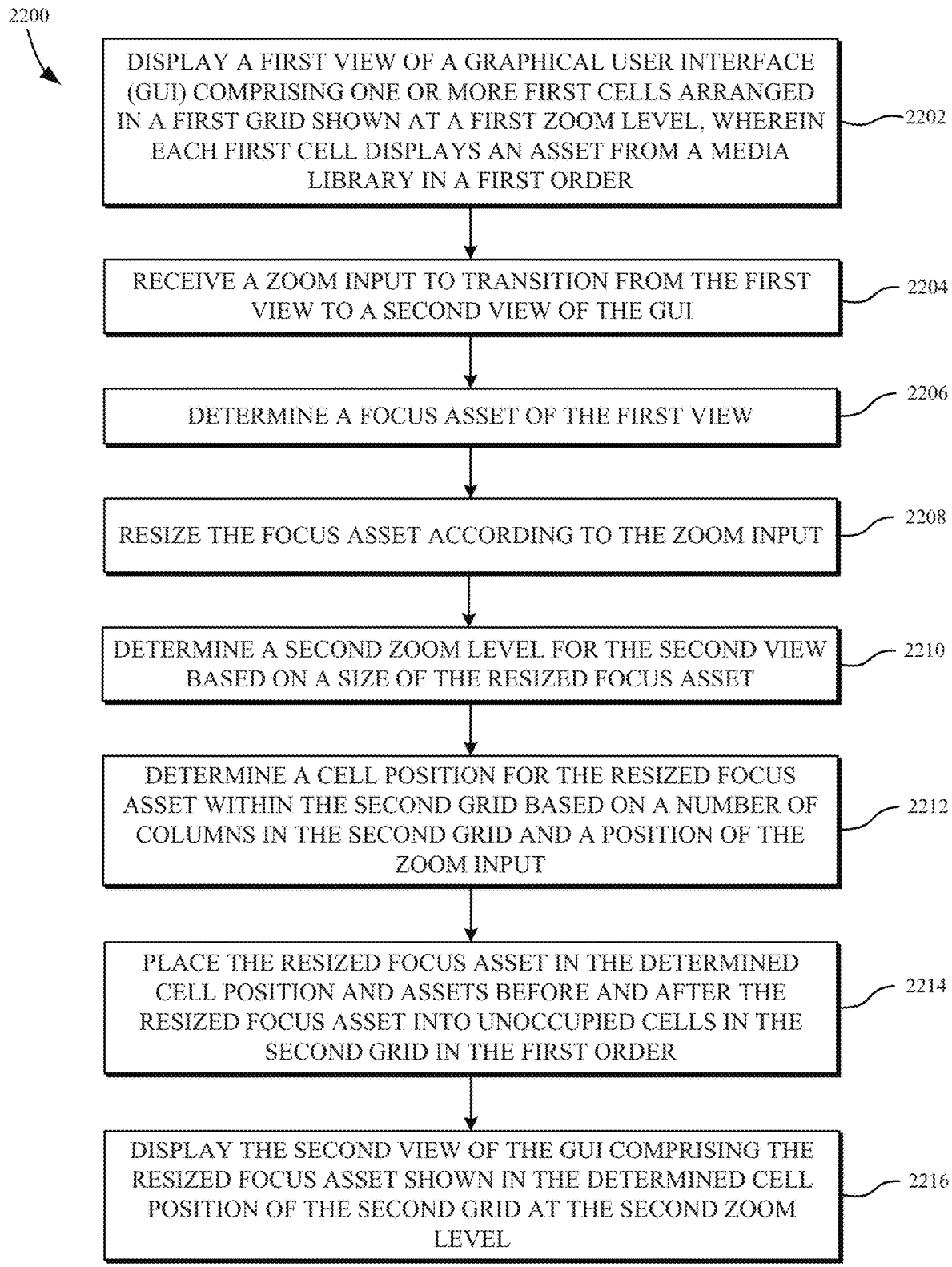
FIG. 22 is a flow diagram of an example process for presenting assets of a media library.

FIG. 22 is a flow diagram of an example process 2200 for presenting assets of a media library. Assets of the media library may be selected and displayed using process 2200 for any of the example views described in FIGS. 2-10D. In an approach, example assets that may be included in the media library include, but are not limited to, still images, videos, animated images, composite presentations, panoramic images, etc.

Referring again to FIG. 22, in operation 2202, a computing device may display a first view of a GUI. The first view may include one or more first cells arranged in a first grid shown at a first zoom level. This first view may include a single cell showing a single asset that occupies substantially all of the view, or may show a plurality of assets situated in a corresponding number of cells. Each first cell is configured to display an asset from the media library in a first order.

The first order may include chronological ordering, alphabetical ordering, size ordering, alphabetical ordering by asset name or location, ordering by curation score, ordering by aesthetic score, etc., or some combination thereof.

One or more cells in the first grid may be unoccupied upon displaying the first grid, for example, based on the cells appearing at an edge of a set of assets being displayed in the particular view.

In operation 2204, the computing device may receive a zoom input to transition from the first view to a second view of the GUI. This zoom input may be a touch input, mouse selection and/or scroll, keyboard entry, etc. Moreover, the zoom input may be centered on a particular asset in the first view, and may have a specific amount of zoom indicated by the zoom input (e.g., an amount to zoom in or zoom out).

In an example, the zoom input may include a pinch gesture having multiple points of touch contact (received via a touchscreen of the computing device) that move closer together to zoom out, or move farther apart to zoom in. In another example, the zoom input may include a click and drag input from a mouse or trackpad that manipulates a slider element that controls a zoom level for the display. In one approach, this slider element may include indications or hash marks that denote each zoom level available for the all assets view of the media library.

In operation 2206, the computing device may determine a focus asset of the first view. The focus asset may be the particular asset on which the zoom input is centered in one approach. In other approaches, the focus asset may be determined based on a center-most asset in the first view, a previously selected asset in the first view, etc. Any method or technique for determining the focus asset may be used, as would be understood by one of skill in the art upon reading the present descriptions.

In an example, the focus asset of the first view may be determined in response to receiving user input selecting the focus asset from the first view. In another example, the focus asset of the first view may be determined in response to determining that the position of the zoom input is situated or centered closer to the focus asset than any other asset in the first view.

In operation 2208, the computing device may resize the focus asset according to the zoom input. According to one approach, the focus asset may change size to produce the resized focus asset, while maintaining an aspect ratio thereof, by shrinking or expanding the focus asset about a center or center point of the zoom input, which acts as an anchor point for the change in size, as described in more detail previously.

In an example, the focus asset may be resized proportionally to the zoom input (e.g., an amount or degree of the input, e.g., movement distance of multiple points of contact in a pinch gesture, amount of movement of a mouse wheel, distance of movement of a displayed zoom element, etc. In each of these examples, when proportionally zooming the focus asset to the zoom input, the smallest and largest sizes available for the focus asset may be used as a minimum and a maximum, respectively, and a predetermined number of intermediate levels may be possible between the minimum and maximum based on the input device (e.g., mouse, trackpad, touchscreen display, etc.). Each intermediate level is able to be achieved based on a smallest amount of detectable input change (one wheel stroke, one hash mark of movement of a slider element, etc.) in one embodiment, or some constant multiple of the smallest amount of detectable input change.

In another example, the focus asset may be resized non-linearly (e.g., exponentially, integrally, etc.) to the zoom input, to cause greater or less change in size of the focus asset relative to the amount of zoom input received in comparison to a proportional relationship.

In one approach, a predetermined number of zoom levels may be available (e.g., 10 different zoom levels, 20 different zoom levels, 40 different zoom levels, etc.), and when the zoom input indicates to resize the focus asset more or less than one of the zoom levels, the focus asset may be "snapped" to the predetermined zoom level upon termination or release of the zoom input, which may or may not be noticeable by the user. In this way, the user may assume that the focus asset is being enlarged or reduced in size exactly by an mount indicated by the zoom input, but actually is being matched to a predetermined zoom level that most closely matches the resizing indicated by the zoom input. This saves on processing required to configure and display the various zoom levels (each zoom level having an associated grid with predetermined cell sizes) in the associated views.

In operation 2210, the computing device may determine a second zoom level for the second view based on the resized focus asset. The second view may include one or more second cells of a size determined from the second zoom level arranged in a second grid (e.g., the second cells are arranged in rows and columns). The second cells may be sized differently than the first cells of the first grid in the first view, which is appropriate since the zoom input is configured to change a size of the displayed assets. Moreover, each second cell displays an asset from the media library.

In one approach, the second zoom level for the second view may be determined based on the size of the resized focus asset. In this way, the second grid of the second view is dynamically generated upon determination of the zoom input, which adjusts the size of the focus asset, and therefore allows for determination of a number of rows and columns that are possible to be displayed in the second grid.

In another approach, the second zoom level may be selected from a plurality of predetermined zoom levels available in the GUI, with the selection of which zoom level to show in the second view being based on some aspect of the resized focus asset and/or the zoom input (e.g., an amount of zoom specified by the zoom input, which may be determined based on a duration of the zoom input, an amount movement of one or more touch inputs received, an amount movement of one or more mouse click and drag inputs received, etc.).

In one approach, the plurality of predetermined zoom levels available in the GUI may include at least five different zoom levels. Each of these zoom levels may be associated with a grid particular to the specific zoom level, with each grid including a different number of columns for display of assets therein. In an example, the five zoom levels may correspond to grids (denoted as rows x columns) of 1×1, 4×3, 7×5, 10×7, and 15×9.

In an example, the plurality of predetermined zoom levels available in the GUI may include a single asset zoom level associated with a grid (e.g., 1×1) that displays a single asset from the media library in a cell sized to substantially fill a display of the computing device in at least one direction (e.g., either the width of the display, or the height of the display, depending on an aspect ratio of the displayed asset—portrait, landscape, square).

The second view may include a number of columns different than a number of columns of the first grid, e.g., more columns or less columns than the first grid. In an example, one or more second cells in the second grid may be unoccupied upon displaying the second grid, for example, based on the cells appearing at an edge of a set of assets being displayed in the particular view.

In an example, the cell size of the second grid may be smaller than a cell size of the first grid in response to the zoom input indicating to zoom out from the focus asset in the first view. Conversely, the cell size of the second grid may be larger than the cell size of the first grid in response to the zoom input indicating to zoom in on the focus asset in the first view.

In operation 2212, the computing device may determine a cell position for the resized focus asset within the second grid. The cell position may be based on, among other factors, the number of columns in the second grid and a position of the zoom input. The position of the zoom input may be a center or anchor point of the zoom input, as discussed previously, and may be used to determine a centerline of an intermediate cell for choosing which cell position within the second grid to place the resized focus asset.

In one approach, the cell position for the resized focus asset within the second grid may be determined based on a number of assets that will precede the resized focus asset according to the first order. For example, if the resized focus asset is near a beginning of a set of assets that will be displayed in the second view, then it is desirable to have a clean front or top edge of the grid with no whitespace or unoccupied cells in the first row. Therefore, the cell position for the resized focus asset may be selected to ensure that assets from the media library are positioned in all cells in the first row of the second grid in the first order. Any method or technique of ensuring that the first row of the second grid is completely filled with assets may be used, such as those described herein, and others that would be apparent to one of skill in the art. In several examples, assets may be shifted to fill the first row, assets may be skipped in a portion of the set of assets not currently displayed, assets may be repeated in a portion of the set of assets not currently displayed, etc.

According to one approach, the cell position for the resized focus asset within the second grid may be determined by selecting the cell position to be in a particular column of the second grid. The particular column may be chosen based on a determination that a vertical centerline of the resized focus asset, prior to movement into the grid, intersects with the chosen column (the centerline will only intersect with a single column of the second grid, as described previously. Then, the resized focus asset is placed in the determined cell position upon termination of the zoom input. Further, other assets around the resized focus asset will also be resized to the cell size of the second grid and placed into appropriate cells of the second grid, based on a sorting order (e.g., chronologically, alphabetically, by curation score or determined interest, etc.)

In operation 2214, the computing device may place the resized focus asset in the determined cell position. Thereafter, or coincidentally to placing the resized focus asset, other assets may be placed into unoccupied cells of the second grid before and after the resized focus asset in the first order.

For example, when chronological ordering is used, pictures and/or videos taken before the focus asset was captured may be placed to the left of the same row as the focus asset and in rows above the focus asset, while pictures and/or videos taken after the focus asset was captured may be placed to the right in the same row as the focus asset and in rows below the focus asset in one example. Of course, any other sorting criteria may be used for determining an order of the various assets shown in the second view, and most recent or oldest assets may be shown first at a top of the view, in several approaches.

In one example, process 2200 may include the computing device modifying the size of the focus asset to match the resized focus asset determined based on the cell size of the second grid, and snapping the resized focus asset to the determined cell position of the second grid upon termination of the zoom input.

In operation 2216, the computing device may display the second view of the GUI. This second view includes the resized focus asset shown in the determined cell position of the second grid at the appropriate second zoom level. Now, the user is able to scroll, select assets, and zoom in or out again from this second view.

Process 2200, in an example, may also include the computing device showing a zooming in transition effect that increases a size of the focus asset while the zoom input indicates to zoom in. This transition effect may include blurring of edges of assets as the size of the focus asset is increased, moving or shifting of assets to account for the larger focus asset, snapping of the focus asset to the determined cell position in the new grid after the zoom input is terminated, etc.

Process 2200, in another example, may also include the computing device showing a zooming out transition effect that decreases the size of the focus asset while the zoom input indicates to zoom out. This transition effect may include blurring of edges of assets as the size of the focus asset is decreased, moving or shifting of assets to account for the smaller focus asset, snapping of the focus asset to the determined cell position in the new grid after the zoom input is terminated, etc.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to select and display on a GUI assets from a media library that may be of interest to a user. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to select images, videos, and other assets from the media library that will be of greater interest to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, for asset selection and display from the media library, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, images, videos, and other assets of a media library may be selected and displayed to a user by inferring preferences based on non-personal information data or a bare minimum amount of personal information, such as the content being requested by the device associated with a user, other non-personal information available to the media library application, or publicly available information.

Example System Architecture

Figure 23:
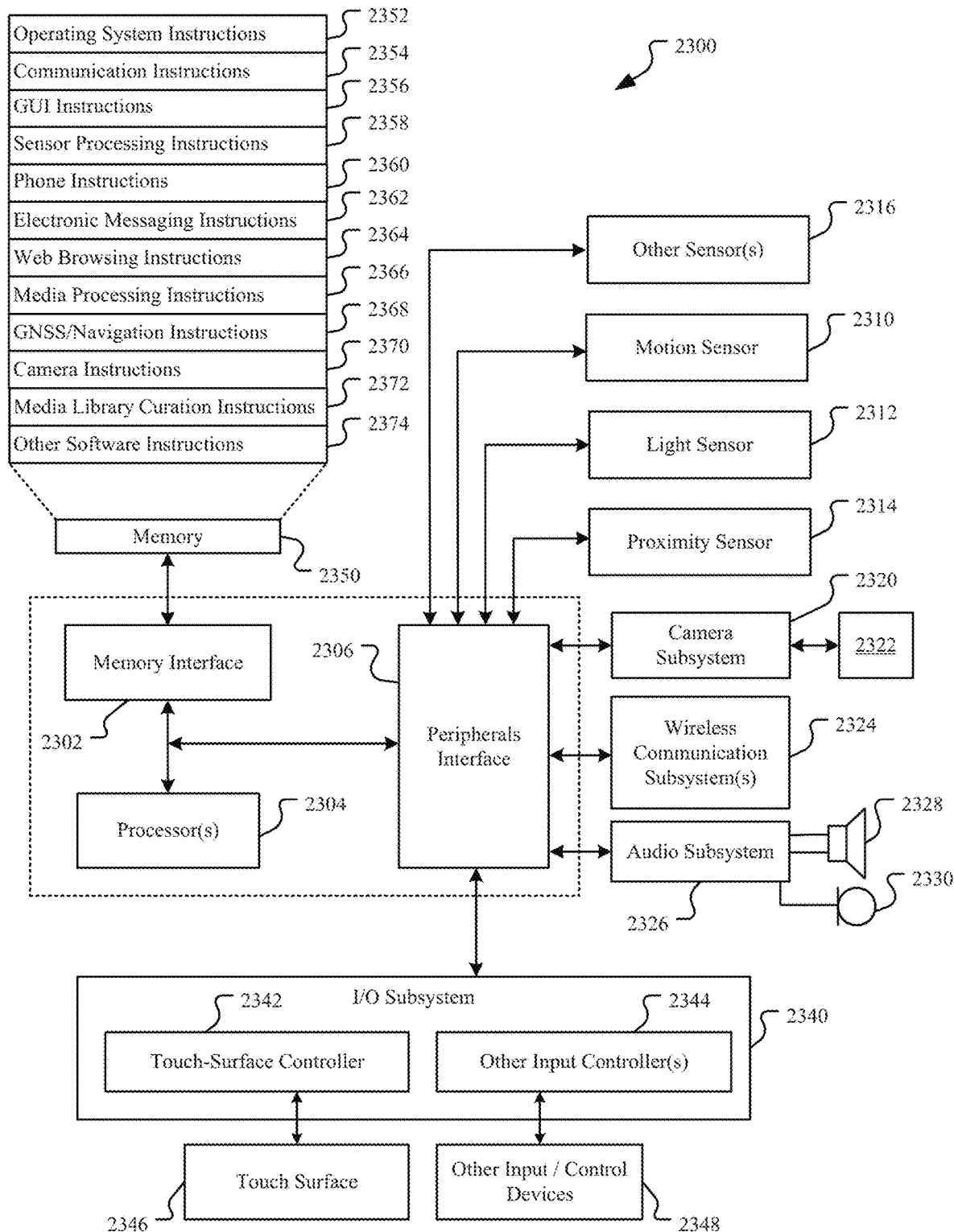
FIG. 23 is a block diagram of an example computing device that may implement the features and processes of FIGS. 1-22.

FIG. 23 is a block diagram of an example computing device 2300 that may implement the features and processes of FIGS. 1-22. The computing device 2300 may include a memory interface 2302, one or more data processors, image processors and/or central processing units 2304, and a peripherals interface 2306. The memory interface 2302, the one or more processors 2304 and/or the peripherals interface 2306 may be separate components or may be integrated in one or more integrated circuits. The various components in the computing device 2300 may be coupled by one or more communication buses or signal lines.

Sensors, devices, and subsystems may be coupled to the peripherals interface 2306 to facilitate multiple functionalities. For example, a motion sensor 2310, a light sensor 2312, and a proximity sensor 2314 may be coupled to the peripherals interface 2306 to facilitate orientation, lighting, and proximity functions. Other sensors 2316 may also be connected to the peripherals interface 2306, such as a global navigation satellite system (GNSS) (e.g., GPS receiver), a temperature sensor, a biometric sensor, magnetometer or other sensing device, to facilitate related functionalities.

A camera subsystem 2320 and an optical sensor 2322, e.g., a charged coupled device (CCD) or a complementary metal-oxide semiconductor (CMOS) optical sensor, may be utilized to facilitate camera functions, such as recording photographs and video clips. The camera subsystem 2320 and the optical sensor 2322 may be used to collect images of a user to be used during authentication of a user, e.g., by performing facial recognition analysis.

Communication functions may be facilitated through one or more wireless communication subsystems 2324, which may include radio frequency receivers and transmitters and/or optical (e.g., infrared) receivers and transmitters. The specific design and implementation of the communication subsystem 2324 may depend on the communication network(s) over which the computing device 2300 is intended to operate. For example, the computing device 2300 may include communication subsystems 2324 designed to operate over a GSM network, a GPRS network, an EDGE network, a Wi-Fi or WiMax network, and a Bluetooth™ network. In particular, the wireless communication subsystems 2324 may include hosting protocols such that the device 100 may be configured as a base station for other wireless devices.

An audio subsystem 2326 may be coupled to a speaker 2328 and a microphone 2330 to facilitate voice-enabled functions, such as speaker recognition, voice replication, digital recording, and telephony functions. The audio subsystem 2326 may be configured to facilitate processing voice commands, voiceprinting and voice authentication, for example.

The I/O subsystem 2340 may include a touch-surface controller 2342 and/or other input controller(s) 2344. The touch-surface controller 2342 may be coupled to a touch surface 2346. The touch surface 2346 and touch-surface controller 2342 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 2346.

The other input controller(s) 2344 may be coupled to other input/control devices 2348, such as one or more buttons, rocker switches, thumb-wheel, infrared port, USB port, and/or a pointer device such as a stylus. The one or more buttons (not shown) may include an up/down button for volume control of the speaker 2328 and/or the microphone 2330.

In one implementation, a pressing of the button for a first duration may disengage a lock of the touch surface 2346; and a pressing of the button for a second duration that is longer than the first duration may turn power to the computing device 2300 on or off. Pressing the button for a third duration may activate a voice control, or voice command, module that enables the user to speak commands into the microphone 2330 to cause the device to execute the spoken command. The user may customize a functionality of one or more of the buttons. The touch surface 2346 may, for example, also be used to implement virtual or soft buttons and/or a keyboard.

In some implementations, the computing device 2300 may present recorded audio and/or video files, such as MP3, AAC, and MPEG files. In some implementations, the computing device 2300 may include the functionality of an MP3 player, such as an iPod™.

The memory interface 2302 may be coupled to memory 2350. The memory 2350 may include high-speed random-access memory and/or non-volatile memory, such as one or more magnetic disk storage devices, one or more optical storage devices, and/or flash memory (e.g., NAND, NOR). The memory 2350 may store an operating system 2352, such as Darwin, RTXC, LINUX, UNIX, OS X, WINDOWS, or an embedded operating system such as VxWorks.

The operating system 2352 may include instructions for handling basic system services and for performing hardware dependent tasks. In some implementations, the operating system 2352 may be a kernel (e.g., UNIX kernel). In some implementations, the operating system 2352 may include instructions for performing voice authentication. For example, operating system 2352 may implement the asset curation and display features as described with reference to FIGS. 1-22.

The memory 2350 may also store communication instructions 2354 to facilitate communicating with one or more additional devices, one or more computers and/or one or more servers. The memory 2350 may include graphical user interface instructions 2356 to facilitate graphic user interface processing; sensor processing instructions 2358 to facilitate sensor-related processing and functions; phone instructions 2360 to facilitate phone-related processes and functions; electronic messaging instructions 2362 to facilitate electronic-messaging related processes and functions; web browsing instructions 2364 to facilitate web browsing-related processes and functions; media processing instructions 2366 to facilitate media processing-related processes and functions; GNSS/Navigation instructions 2368 to facilitate GNSS and navigation-related processes and instructions; and/or camera instructions 2370 to facilitate camera-related processes and functions.

The memory 2350 may store software instructions 2372 to facilitate other processes and functions, such as the asset curation and display processes and functions as described with reference to FIGS. 1-22.

The memory 2350 may also store other software instructions 2374, such as web video instructions to facilitate web video-related processes and functions; and/or web shopping instructions to facilitate web shopping-related processes and functions. In some implementations, the media processing instructions 2366 are divided into audio processing instructions and video processing instructions to facilitate audio processing-related processes and functions and video processing-related processes and functions, respectively.

Each of the above identified instructions and applications may correspond to a set of instructions for performing one or more functions described above. These instructions need not be implemented as separate software programs, procedures, or modules. The memory 2350 may include additional instructions or fewer instructions. Furthermore, various functions of the computing device 2300 may be implemented in hardware and/or in software, including in one or more signal processing and/or application specific integrated circuits.

What is claimed is:

1. A method comprising:
    displaying, by a computing device, a first view of a graphical user interface (GUI) comprising one or more first cells arranged in a first grid shown at a first zoom level, wherein each first cell displays an asset from a media library, and wherein a first set of assets are displayed in the one or more first cells in a first order;
    receiving, by the computing device, a zoom input to transition from the first view to a second view of the GUI that selects a focus asset from the first set of assets;
    determining, by the computing device, a second zoom level for the second view based on the zoom input, the second view comprising one or more second cells arranged in a second grid, wherein the second grid comprises a number of columns different than a number of columns of the first grid;
    determining, by the computing device, a cell position for the focus asset within a particular row and a particular column of the second grid, the particular column being intersected by a vertical centerline of the focus asset when resized for the second grid responsive to the zoom input, wherein the cell position is based on:
        the number of columns in the second grid;
        a cell size of the second grid; and
        a position of the zoom input relative to the focus asset in the first grid; and
    displaying, by the computing device, the second view of the GUI comprising at least the focus asset shown in the determined cell position of the second grid at the second zoom level,
    wherein the focus asset is resized according to the cell size of the second grid, and
    wherein responsive to the second grid comprising more than one second cell, a second set of assets are displayed in the one or more second cells before and after the determined cell position to maintain the first order.

2. The method as recited in claim 1, wherein the first order is chronological, wherein determining the cell position for the focus asset within the second grid is further based on a number of assets that will chronologically precede the focus asset, and wherein the cell position for the focus asset is selected to ensure that the second set of assets from the media library are positioned in all second cells in a first row of the second grid in chronological order.

3. The method as recited in claim 1, further comprising determining the focus asset of the first view based on: receiving user input selecting the focus asset from the first view, or determining that the position of the zoom input is situated closer to the focus asset than any other asset in the first view.

4. The method as recited in claim 1, wherein the zoom input comprises a pinch gesture having multiple points of touch contact that move closer together to zoom out or move farther apart to zoom in.

5. The method as recited in claim 1, wherein the second zoom level for the second view is selected from a plurality of predetermined zoom levels available in the GUI comprising at least five different zoom levels, each zoom level being associated with a grid that comprises a different number of columns for display of assets, and wherein the second set of assets comprises an uninterrupted sequence of assets from the first set of assets in the first order.

6. The method as recited in claim 1, wherein determining the cell position for the focus asset within the second grid further comprises:
    determining whether the second set of assets displayed in the one or more second cells before and after the determined cell position complete the particular row in the second grid; and
    responsive to determining that one or more cells in the particular row will not include an asset from the second set of assets based on the determined cell position for the focus asset, shifting the assets displayed in the particular row to fill each cell of the particular row with an asset from the second set of assets.

7. The method as recited in claim 1, wherein the cell size of the second grid is smaller than a cell size of the first grid in response to the zoom input indicating to zoom out, and wherein the cell size of the second grid is larger than the cell size of the first grid in response to the zoom input indicating to zoom in.

8. The method as recited in claim 1, further comprising:
    showing a zooming in transition effect that increases a size of the focus asset while the zoom input indicates to zoom in;
    showing a zooming out transition effect that decreases the size of the focus asset while the zoom input indicates to zoom out; and
    snapping, in a single movement, the focus asset to the determined cell position of the second grid upon termination of the zoom input.

9. The method as recited in claim 1, wherein the focus asset is snapped into place in the determined cell position upon termination of the zoom input.

10. The method as recited in claim 1, further comprising resizing the focus asset using a center of the zoom input as an anchor point, wherein responsive to the zoom input indicating to zoom out, a cell of the focus asset is pulled inward toward the anchor point to become smaller in size to match the cell size of the second grid, and wherein responsive to the zoom input indicating to zoom in, the cell of the focus asset is pushed outward from the anchor point to become larger in size to match the cell size of the second grid.

11. A system comprising:
    one or more processors; and
    a non-transitory computer-readable medium including one or more sequences of instructions that, when executed by the one or more processors, cause the one or more processors to perform operations comprising:
        displaying a first view of a graphical user interface (GUI) comprising one or more first cells arranged in a first grid shown at a first zoom level, wherein each first cell displays an asset from a media library, and wherein a first set of assets are displayed in the one or more first cells in a first order;
receiving a zoom input to transition from the first view to a second view of the GUI that selects a focus asset from the first set of assets;
determining a second zoom level for the second view based on the zoom input, the second view comprising one or more second cells arranged in a second grid, wherein the second grid comprises a number of columns different than a number of columns of the first grid;
determining a cell position for the focus asset within a particular row and a particular column of the second grid, the particular column being intersected by a vertical centerline of the focus asset when resized for the second grid responsive to the zoom input, wherein the cell position is based on:
the number of columns in the second grid;
a cell size of the second grid; and
a position of the zoom input relative to the focus asset in the first grid; and
displaying, by the computing device, the second view of the GUI comprising at least the focus asset shown in the determined cell position of the second grid at the second zoom level,
wherein the focus asset is resized according to the cell size of the second grid, and
wherein responsive to the second grid comprising more than one second cell, a second set of assets are displayed in the one or more second cells before and after the determined cell position to maintain the first order.

12. The system as recited in claim 11, wherein the first order is chronological, wherein determining the cell position for the focus asset within the second grid is further based on a number of assets that will chronologically precede the focus asset, and wherein the cell position for the focus asset is selected to ensure that the second set of assets from the media library are positioned in all second cells in a first row of the second grid in chronological order.

13. The system as recited in claim 11, further comprising determining the focus asset of the first view based on: receiving user input selecting the focus asset from the first view, or determining that the position of the zoom input is situated closer to the focus asset than any other asset in the first view.

14. The system as recited in claim 11, wherein the zoom input comprises a pinch gesture having multiple points of touch contact that move closer together to zoom out or move farther apart to zoom in.

15. The system as recited in claim 11, wherein the second zoom level for the second view is selected from a plurality of predetermined zoom levels available in the GUI comprising at least five different zoom levels, each zoom level being associated with a grid that comprises a different number of columns for display of assets, and wherein the second set of assets comprises an uninterrupted sequence of assets from the first set of assets in the first order.

16. The system as recited in claim 11, wherein determining the cell position for the focus asset within the second grid further comprises:
determining whether the second set of assets displayed in the one or more second cells before and after the determined cell position complete the particular row in the second grid; and
responsive to determining that one or more cells in the particular row will not include an asset from the second set of assets based on the determined cell position for the focus asset, shifting the assets displayed in the particular row to fill each cell of the particular row with an asset from the second set of assets.

17. The system as recited in claim 11, wherein the cell size of the second grid is smaller than a cell size of the first grid in response to the zoom input indicating to zoom out, and wherein the cell size of the second grid is larger than the cell size of the first grid in response to the zoom input indicating to zoom in.

18. The system as recited in claim 11, wherein the operations further comprise:
showing a zooming in transition effect that increases a size of the focus asset while the zoom input indicates to zoom in;
showing a zooming out transition effect that decreases the size of the focus asset while the zoom input indicates to zoom out; and
snapping the focus asset to the determined cell position of the second grid upon termination of the zoom input.

19. The system as recited in claim 11, wherein the focus asset is snapped into place in the determined cell position upon termination of the zoom input.

20. A non-transitory computer-readable medium including one or more sequences of instructions that, when executed by one or more processors, cause the one or more processors to perform operations comprising:
displaying a first view of a graphical user interface (GUI) comprising one or more first cells arranged in a first grid shown at a first zoom level, wherein each first cell displays an asset from a media library in a first order;
receiving a zoom input to transition from the first view to a second view of the GUI that selects a focus asset from the first set of assets;
determining a second zoom level for the second view based on the zoom input, the second view comprising one or more second cells arranged in a second grid, wherein the second grid comprises a number of columns different than a number of columns of the first grid;
determining a cell position for the focus asset within a particular row and a particular column of the second grid, the particular column being intersected by a vertical centerline of the focus asset when resized for the second grid responsive to the zoom input, wherein the cell position is based on:
the number of columns in the second grid;
a cell size of the second grid; and
a position of the zoom input relative to the focus asset in the first grid; and
displaying the second view of the GUI comprising at least the focus asset shown in the determined cell position of the second grid at the second zoom level,
wherein the focus asset is resized according to the cell size of the second grid, and
wherein responsive to the second grid comprising more than one second cell, a second set of assets are displayed in the one or more second cells before and after the determined cell position to maintain the first order.

* * * * *